US012520997B2

(12) United States Patent
Tarke et al.

(10) Patent No.: US 12,520,997 B2
(45) Date of Patent: Jan. 13, 2026

(54) FLEXIBLE SENSOR ASSEMBLY FOR ENT INSTRUMENT

(71) Applicants: Acclarent, Inc., Irvine, CA (US); Biosense Webster (Israel) Ltd., Yokneam (IL)

(72) Inventors: Franklin D. Tarke, Costa Mesa, CA (US); Meir Bar-Tal, Haifa (IL); Vadim Gliner, Haifa (IL); Babak Ebrahimi, Irvine, CA (US); Uriel Hod, Haifa (IL); Shubhayu Basu, Anaheim, CA (US); Alison D. Wright, Newport Beach, CA (US); Cesar Fuentes-Ortega, Pasadena, CA (US); Henry F. Salazar, Pico Rivera, CA (US); Jetmir Palushi, Irvine, CA (US)

(73) Assignees: Acclarent, Inc., Irvine, CA (US); Biosense Webster (Israel) Ltd., Yokneam (IL)

( * ) Notice: Subject to any disclaimer, the term of this patent is extended or adjusted under 35 U.S.C. 154(b) by 206 days.

(21) Appl. No.: 17/584,693

(22) Filed: Jan. 26, 2022

(65) Prior Publication Data
US 2022/0257093 A1    Aug. 18, 2022

Related U.S. Application Data

(60) Provisional application No. 63/288,014, filed on Dec. 10, 2021, provisional application No. 63/150,776, filed on Feb. 18, 2021.

(51) Int. Cl.
*A61B 1/00* (2006.01)
*A61B 1/227* (2006.01)
(Continued)

(52) U.S. Cl.
CPC .......... *A61B 1/00097* (2022.02); *A61B 1/227* (2013.01); *A61B 1/233* (2013.01);
(Continued)

(58) Field of Classification Search
CPC ..... A61B 1/00097; A61B 1/227; A61B 1/233; A61B 1/24; A61B 1/32; A61B 34/20;
(Continued)

(56) References Cited

U.S. PATENT DOCUMENTS 5,318,025 A * 6/1994 Dumoulin ............... A61B 5/055
600/417
5,354,518 A   10/1994 Okada et al.
(Continued)

FOREIGN PATENT DOCUMENTS

WO   WO 2008/028149 A2   3/2008
WO   WO 2008/119118 A1   10/2008
(Continued)

OTHER PUBLICATIONS

Partial European Search Report and Written Opinion dated Jul. 30, 2019, for Application No. 19163211.6, 14 pages.
(Continued)

*Primary Examiner* — Anh Tuan T Nguyen
*Assistant Examiner* — Shankar Raj Ghimire
(74) *Attorney, Agent, or Firm* — Barnes & Thornburg LLP

(57) ABSTRACT

An ENT surgical instrument includes a shaft assembly, a flexible substrate, and at least at least one electrically-conductive sensor trace formed on the flexible substrate. The shaft assembly has a distal end sized and configured to fit in an anatomical passageway in an ear, nose, or throat of a patient. The flexible substrate extends along at least a portion of the shaft. The at least one sensor trace includes at least one concentric loop portion, wherein the at least one (Continued)

concentric loop portion defines at least one navigation sensor.

10 Claims, 32 Drawing Sheets

(51) Int. Cl.
 *A61B 1/233*  (2006.01)
 *A61B 1/24*  (2006.01)
 *A61B 1/32*  (2006.01)
 *A61B 34/20*  (2016.01)

(52) U.S. Cl.
 CPC ............... *A61B 1/24* (2013.01); *A61B 1/32* (2013.01); *A61B 34/20* (2016.02); *A61B 2034/2051* (2016.02)

(58) Field of Classification Search
 CPC .... A61B 2034/2051; A61B 2034/2072; A61B 2562/164
 See application file for complete search history.

(56) References Cited

U.S. PATENT DOCUMENTS

| | | | |
|---|---|---|---|
| 5,728,044 A * | 3/1998 | Shan | A61B 1/31 600/117 |
| 5,993,445 A | 11/1999 | Issa | |
| 6,193,715 B1 | 2/2001 | Wrublewski et al. | |
| 6,203,493 B1 * | 3/2001 | Ben-Haim | A61B 5/065 600/117 |
| 6,304,769 B1 * | 10/2001 | Arenson | A61M 25/0127 604/528 |
| 6,366,206 B1 | 4/2002 | Ishikawa et al. | |
| 6,663,628 B2 | 12/2003 | Peters | |
| 6,846,286 B2 * | 1/2005 | Suzuki | A61B 8/4488 600/117 |
| 7,720,521 B2 | 5/2010 | Chang et al. | |
| 8,320,711 B2 | 11/2012 | Altmann et al. | |
| 8,543,190 B2 | 9/2013 | Wasson et al. | |
| 8,702,626 B1 | 4/2014 | Kim et al. | |
| 8,702,702 B1 | 4/2014 | Edwards et al. | |
| 9,226,689 B2 | 1/2016 | Jacobsen et al. | |
| 9,333,031 B2 | 5/2016 | Salahieh et al. | |
| 9,636,040 B2 | 5/2017 | Duindam et al. | |
| 9,895,187 B2 | 2/2018 | Livneh | |
| 9,995,600 B2 | 6/2018 | Nagarkar et al. | |
| 10,188,456 B2 | 1/2019 | Prisco et al. | |
| 10,349,819 B2 * | 7/2019 | Ikeda | A61B 1/00006 |
| 10,376,302 B2 | 8/2019 | Prisco et al. | |
| 10,426,555 B2 * | 10/2019 | Crowley | A61B 34/20 |
| 10,463,242 B2 | 11/2019 | Kesten et al. | |
| 10,478,245 B2 | 11/2019 | Townsend et al. | |
| 10,492,667 B2 * | 12/2019 | Karaki | A61B 1/042 |
| 10,561,370 B2 | 2/2020 | Salazar et al. | |
| 10,595,738 B2 | 3/2020 | Sterrett et al. | |
| 10,736,693 B2 | 8/2020 | Lepak et al. | |
| 10,758,302 B2 | 9/2020 | Schultz et al. | |
| 10,828,090 B2 | 11/2020 | Haverkost et al. | |
| 10,835,151 B2 | 11/2020 | Blood et al. | |
| 11,116,449 B2 | 9/2021 | Sterrett et al. | |
| 11,375,978 B2 * | 7/2022 | Irie | A61B 1/0011 |
| 11,730,342 B2 * | 8/2023 | Ries | A61B 1/00135 600/104 |
| 2002/0183592 A1 * | 12/2002 | Suzuki | A61B 8/4466 600/117 |
| 2003/0187347 A1 * | 10/2003 | Nevo | A61B 1/00006 600/424 |
| 2010/0016757 A1 * | 1/2010 | Greenburg | A61B 1/00096 600/7 |
| 2010/0030057 A1 | 2/2010 | Gavriely et al. | |
| 2011/0060214 A1 | 3/2011 | Makower | |
| 2013/0200268 A1 * | 8/2013 | Rafferty | H04Q 9/00 250/206 |
| 2014/0364725 A1 | 12/2014 | Makower | |
| 2015/0094570 A1 * | 4/2015 | Fojtik | A61B 5/01 606/1 |
| 2016/0008083 A1 | 1/2016 | Kesten et al. | |
| 2016/0235469 A1 | 8/2016 | Prisco et al. | |
| 2016/0250455 A1 | 9/2016 | Ahn | |
| 2016/0256230 A1 * | 9/2016 | Kowshik | A61B 34/30 |
| 2016/0310042 A1 | 10/2016 | Kesten et al. | |
| 2016/0354160 A1 * | 12/2016 | Crowley | A61B 10/04 |
| 2017/0042410 A1 * | 2/2017 | Hasegawa | A61B 1/00165 |
| 2017/0151022 A1 | 6/2017 | Jascob et al. | |
| 2017/0215762 A1 * | 8/2017 | Burnside | A61B 5/6848 |
| 2018/0015252 A1 | 1/2018 | Pfenniger | |
| 2018/0071017 A1 * | 3/2018 | Bar-Tal | A61B 18/1492 |
| 2018/0160936 A1 | 6/2018 | Govari et al. | |
| 2018/0193052 A1 | 7/2018 | Govari et al. | |
| 2018/0207400 A1 * | 7/2018 | Birchard | A61B 5/062 |
| 2018/0235571 A1 | 8/2018 | Moore et al. | |
| 2019/0282305 A1 | 9/2019 | Shameli et al. | |
| 2019/0388117 A1 | 12/2019 | Akbarian et al. | |
| 2020/0015693 A1 * | 1/2020 | Beeckler | G01L 1/14 |
| 2020/0375617 A1 | 12/2020 | Govari | |
| 2021/0059700 A1 * | 3/2021 | Algawi | A61B 8/445 |
| 2022/0008011 A1 | 1/2022 | Olson | |
| 2022/0095947 A1 * | 3/2022 | Highsmith | A61B 5/367 |

FOREIGN PATENT DOCUMENTS

| | | |
|---|---|---|
| WO | WO 2017/127722 A1 | 7/2017 |
| WO | WO 2018/067540 A1 | 4/2018 |
| WO | WO 2020/172659 A1 | 8/2020 |

OTHER PUBLICATIONS

Extended European Search Report and Written Opinion dated Oct. 31, 2019, for Application No. 19163211.6, 12 pages.

U.S. Appl. No. 62/555,824, entitled "Apparatus to Secure Field Generating Device to Chair," filed Sep. 8, 2017.

U.S. Appl. No. 63,028,609, entitled "Shaft Deflection Control Assembly for ENT Guide Instrument," filed May 22, 2020.

U.S. Appl. No. 63,142,098, entitled "ENT Instrument with Ablation Loop and Ablation Needles," filed Jan. 27, 2021.

* cited by examiner

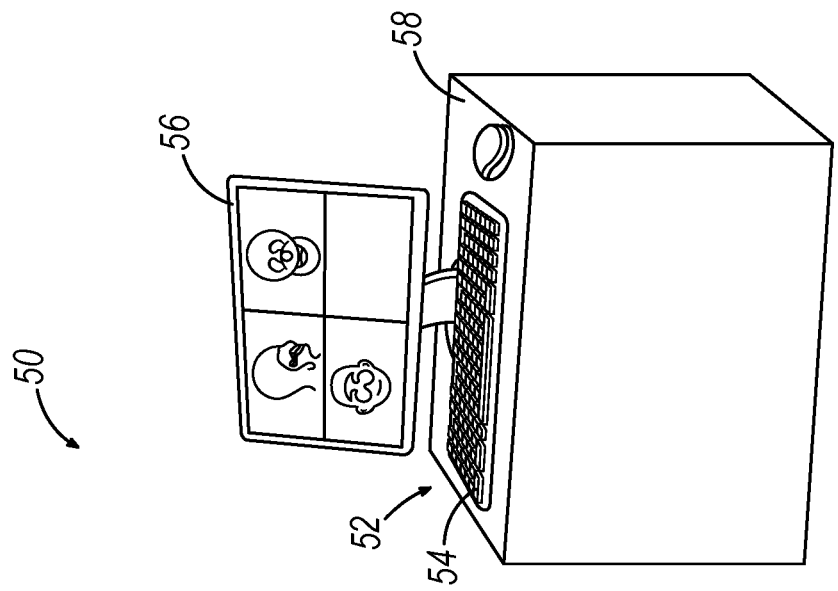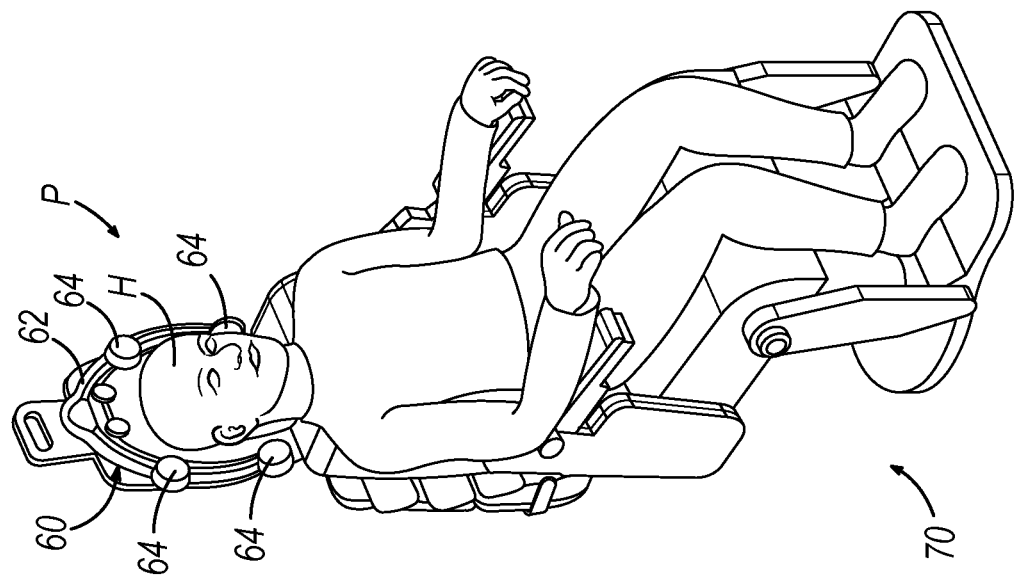
FIG. 1

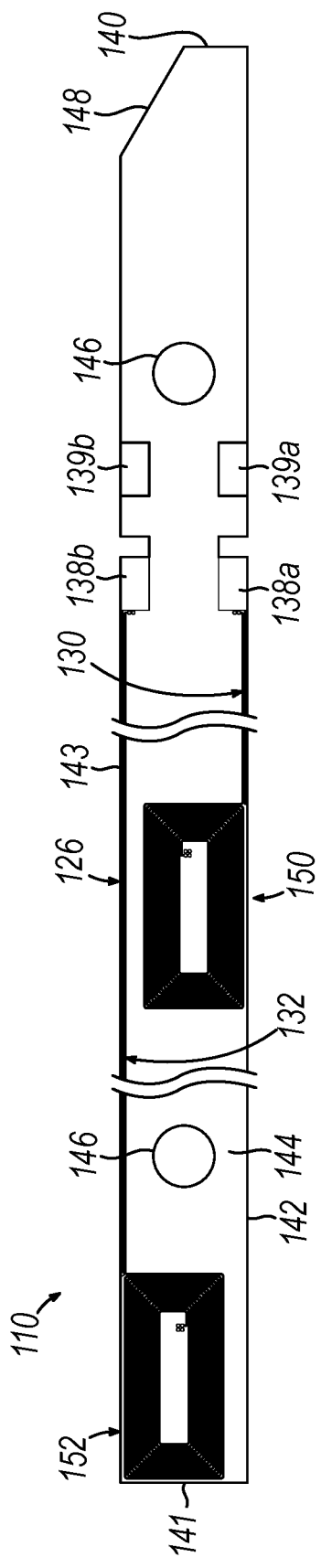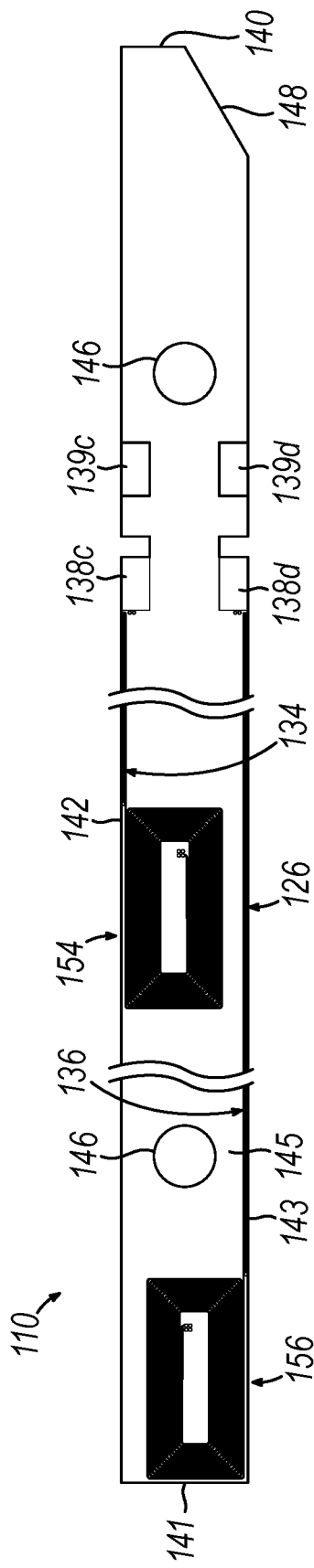
FIG. 4
FIG. 5

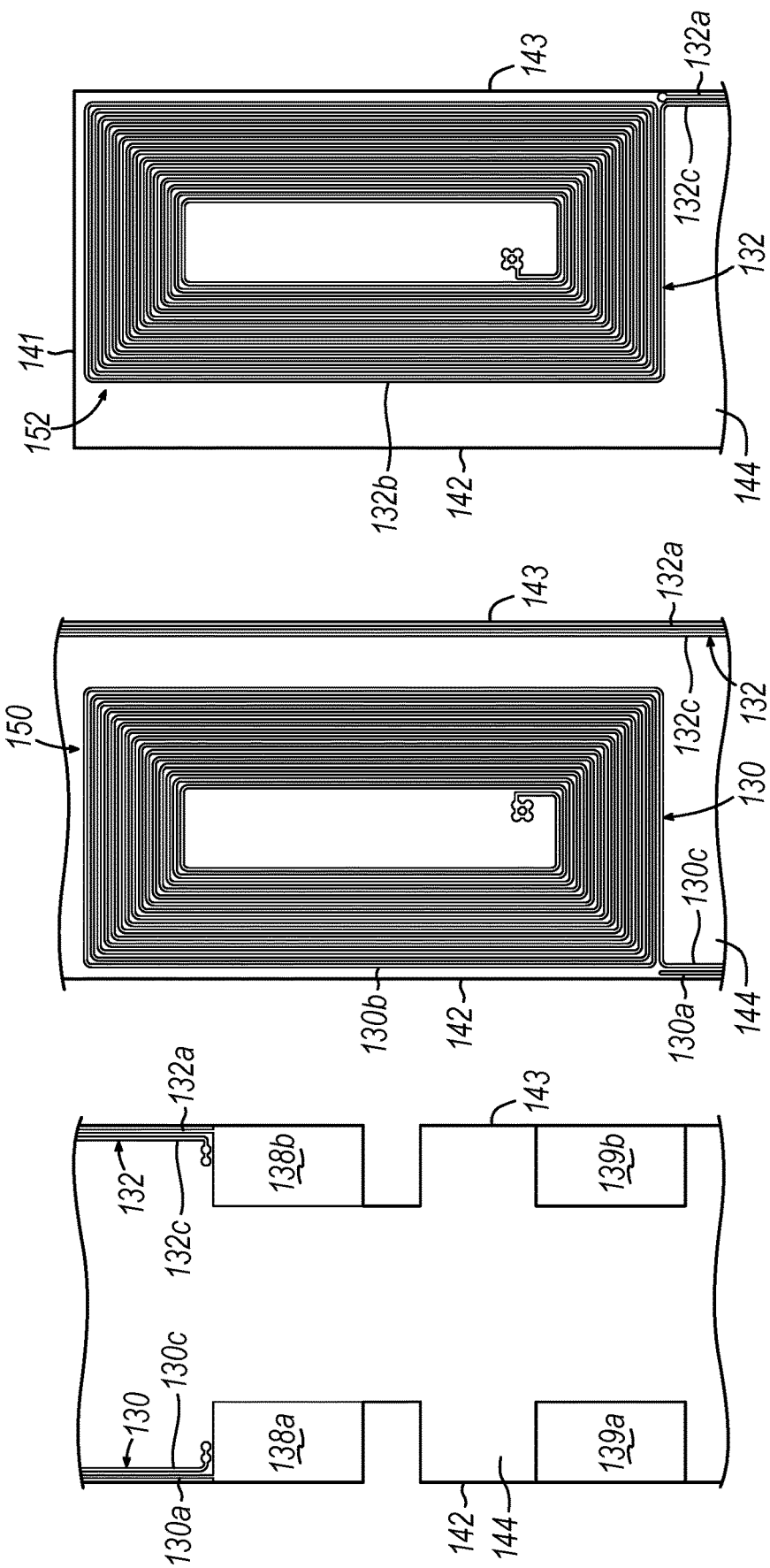

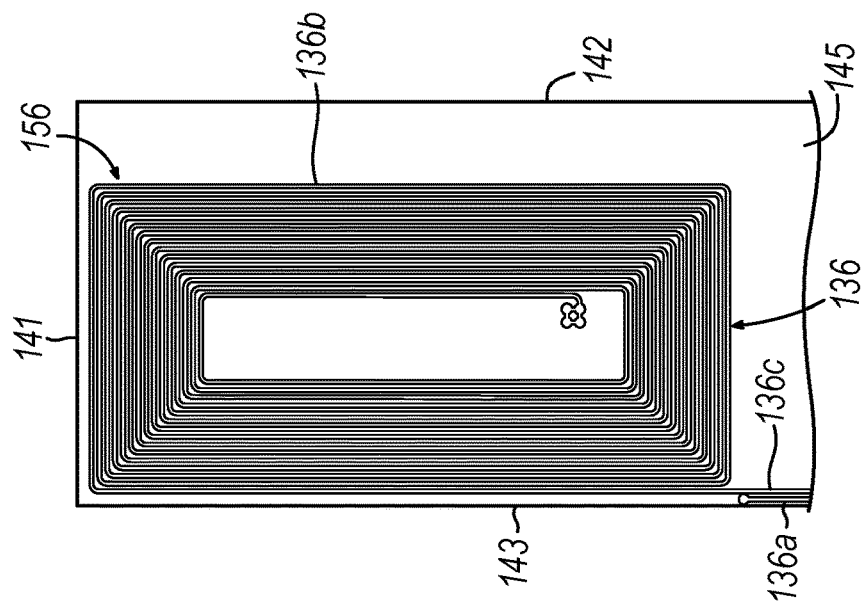
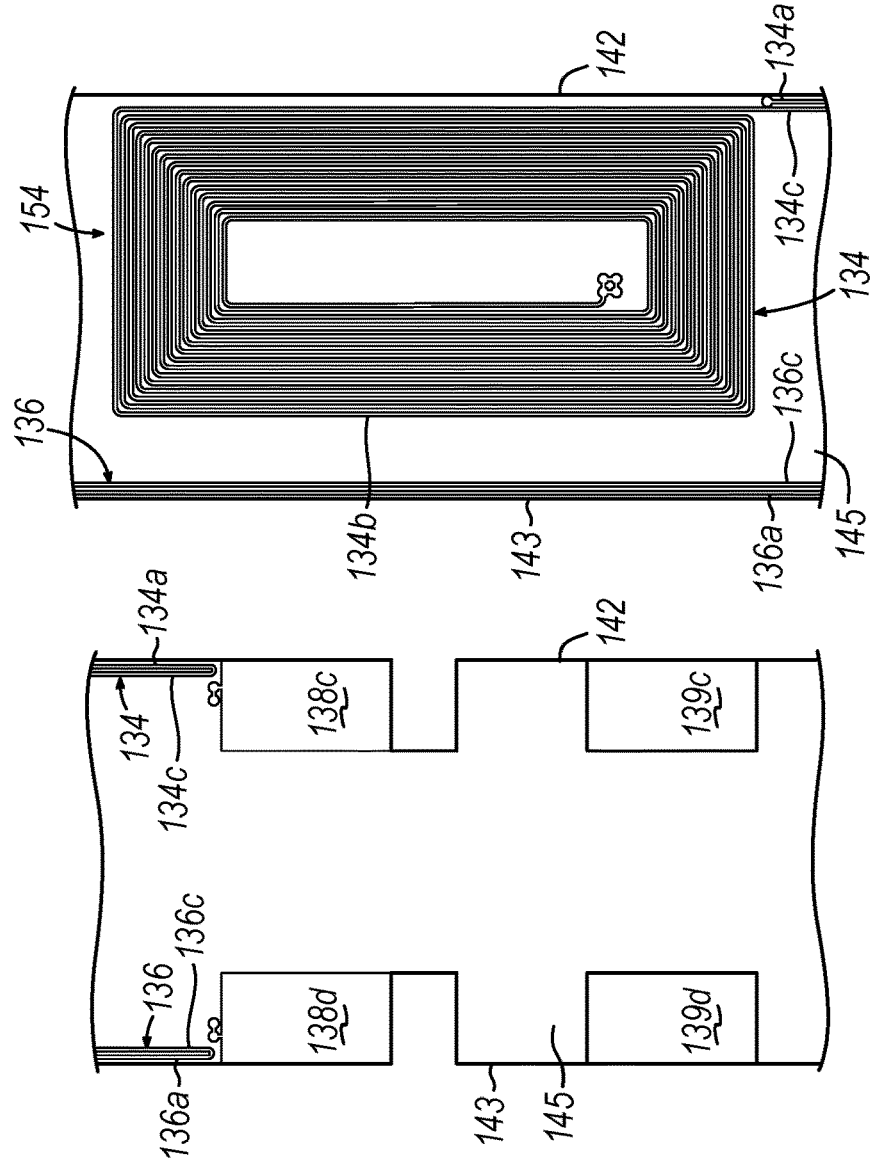
FIG. 11
FIG. 10
FIG. 9

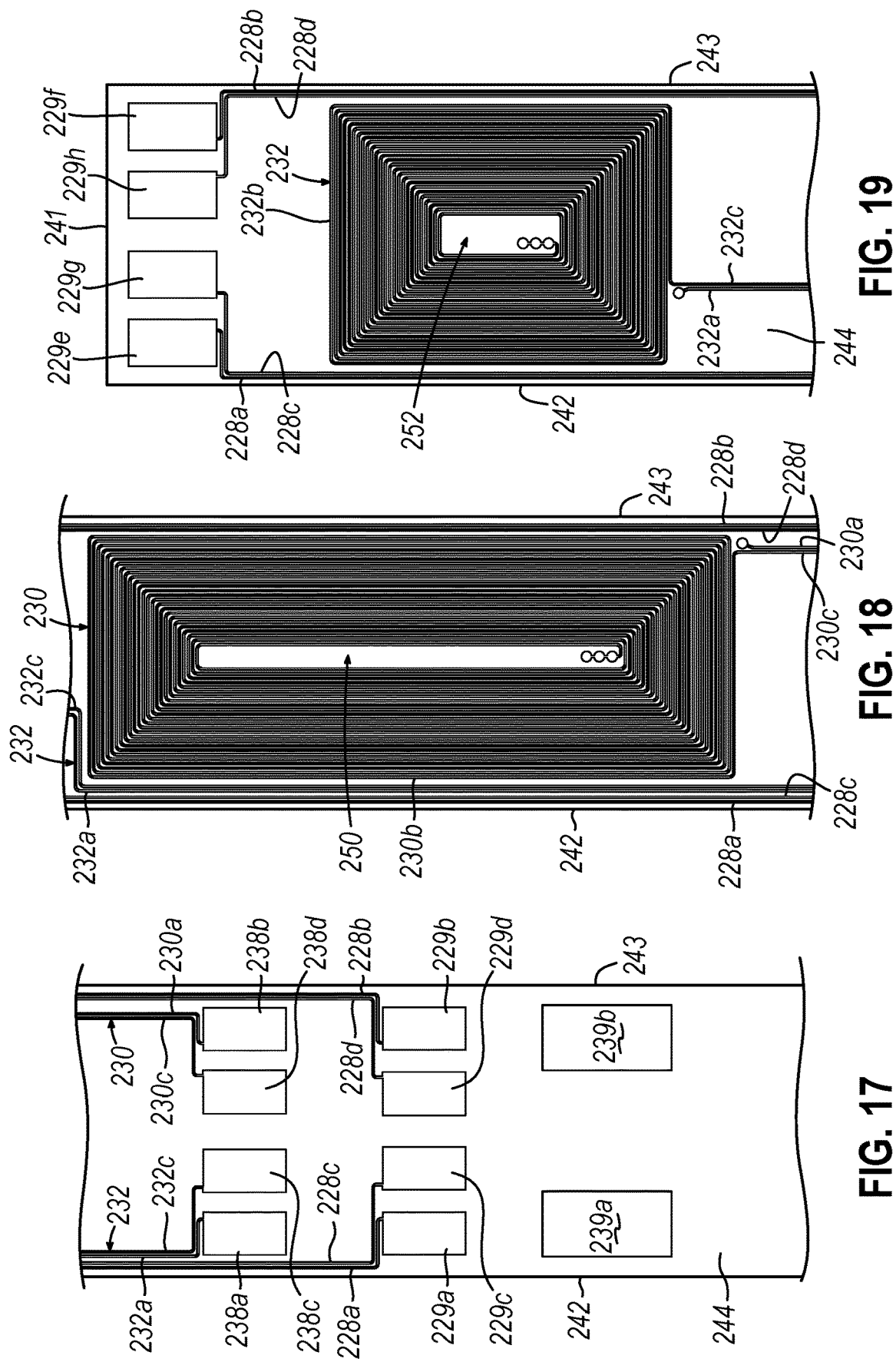

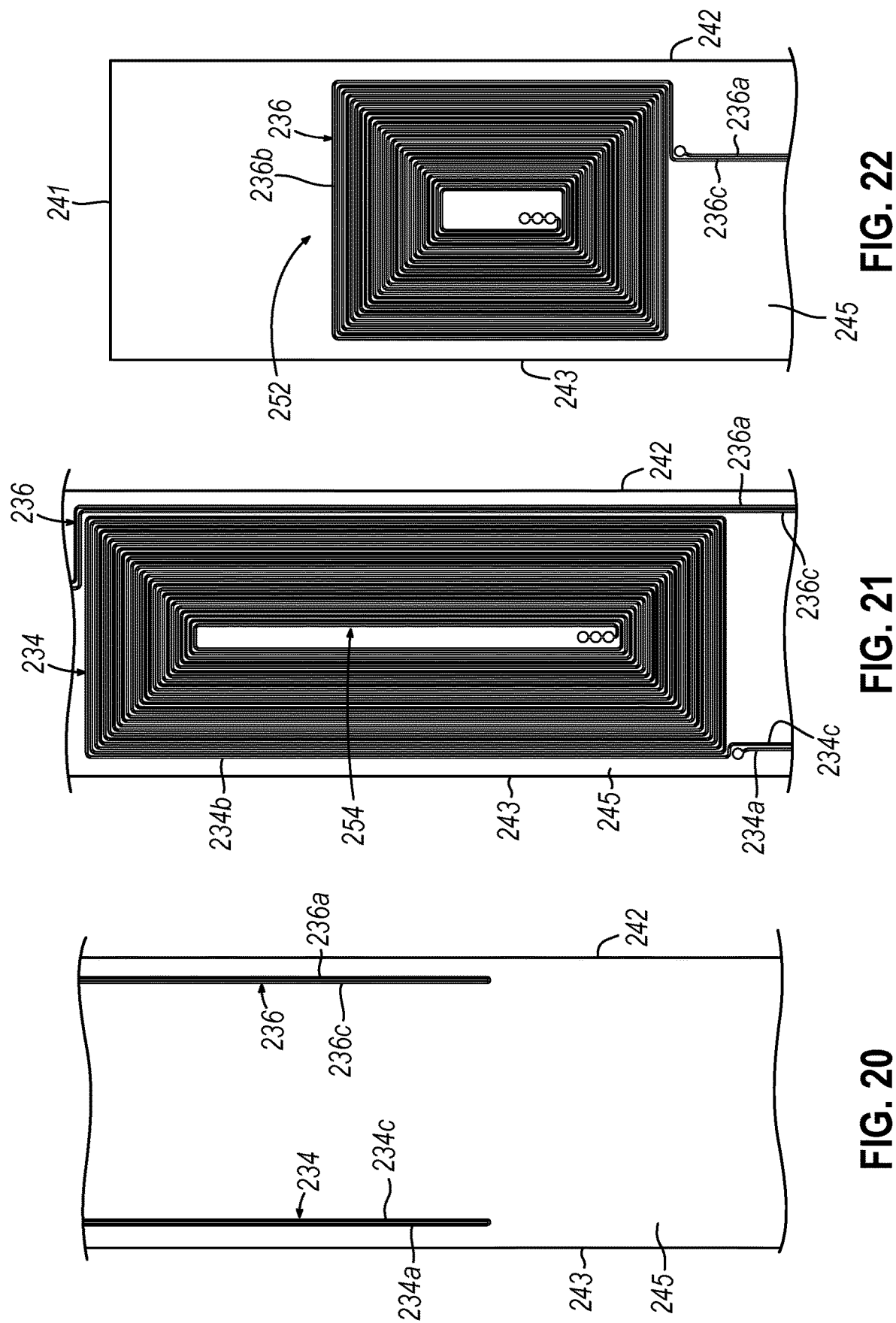

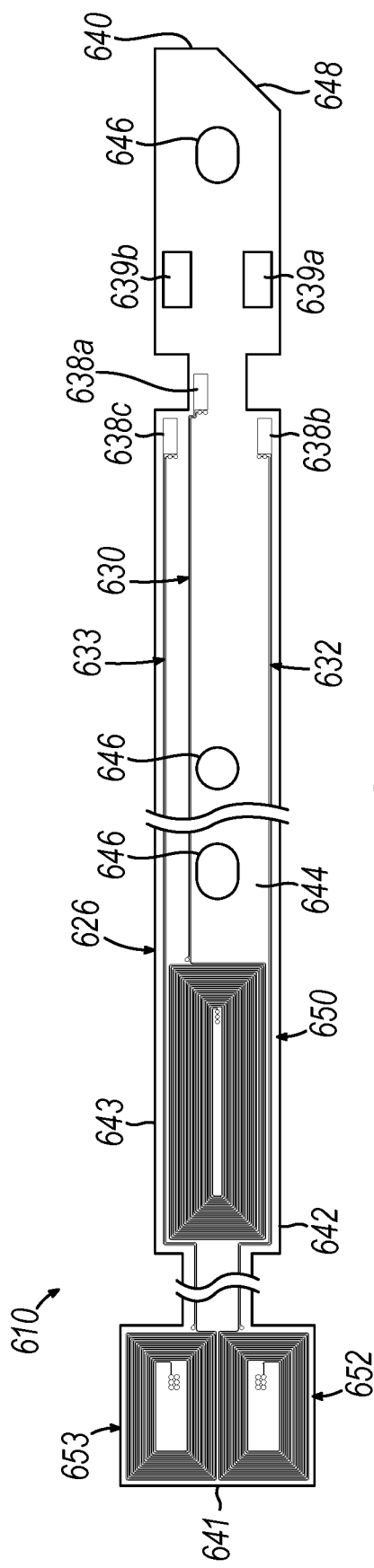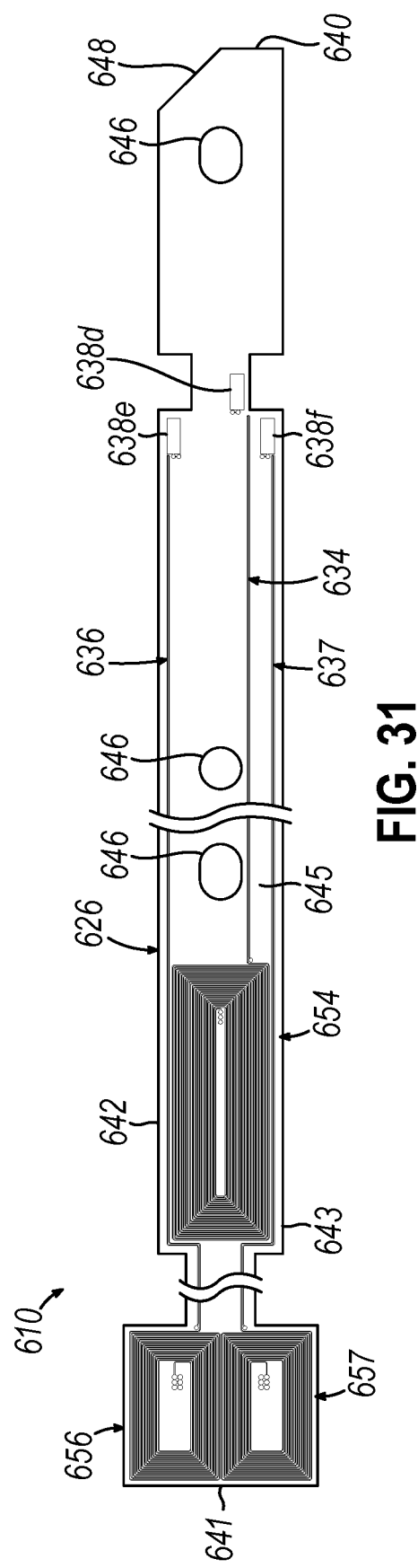
FIG. 30
FIG. 31

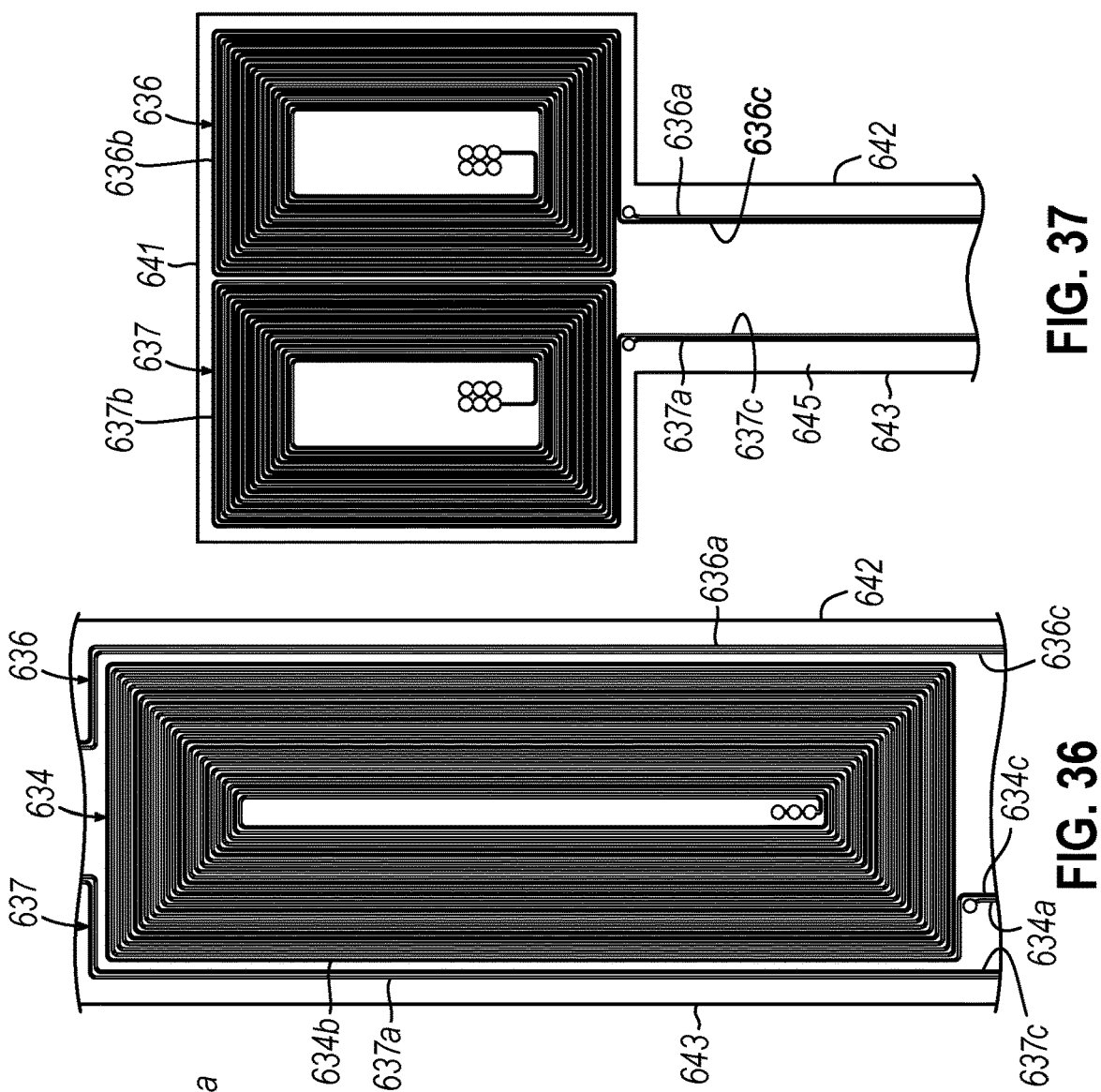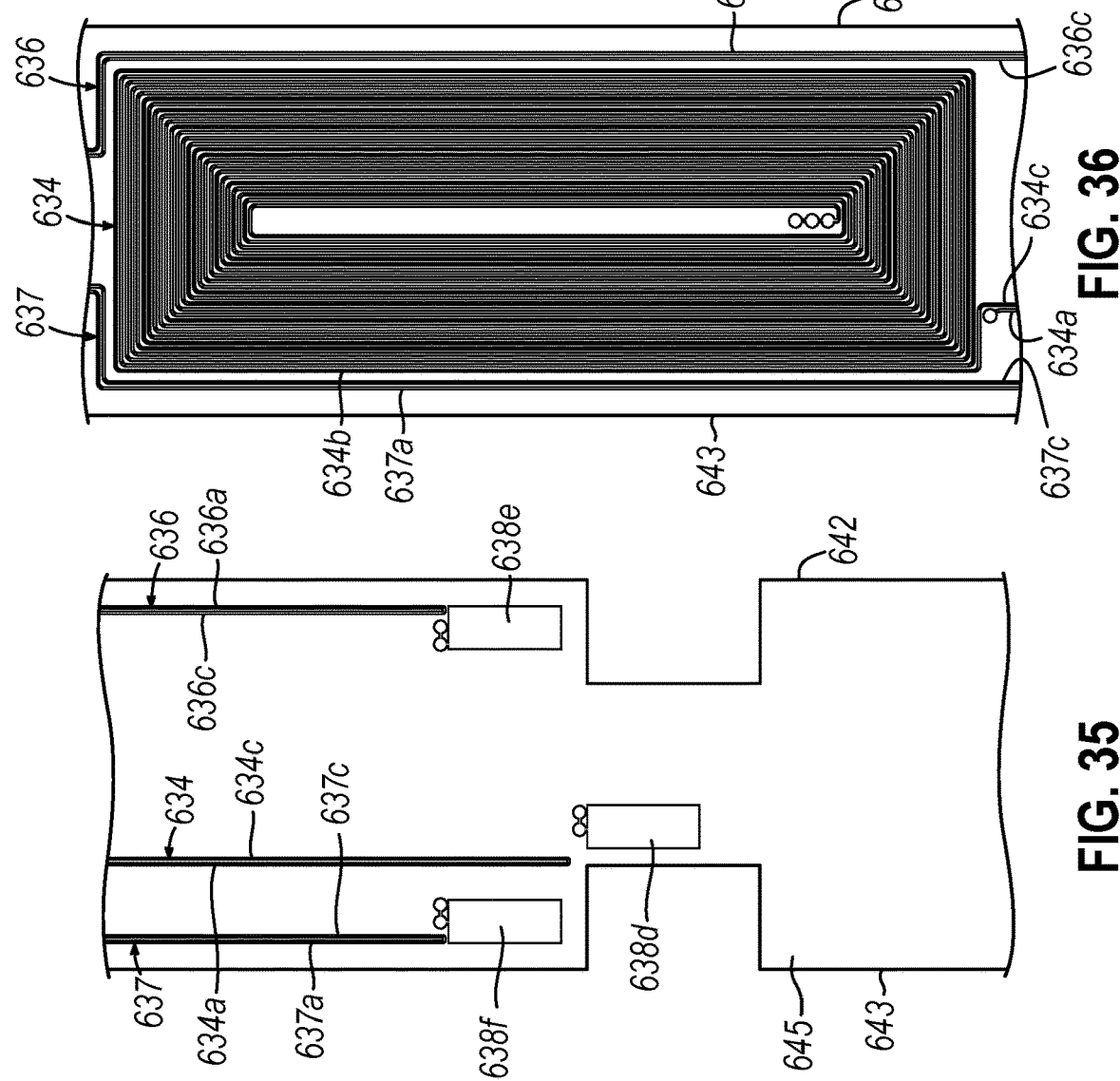

FLEXIBLE SENSOR ASSEMBLY FOR ENT INSTRUMENT

PRIORITY

This application claims priority to U.S. Provisional Pat. App. No. 63/150,776, entitled "Flexible Sensor Assembly for ENT Instrument," filed Feb. 18, 2021, the disclosure of which is incorporated by reference herein, in its entirety.

This application also claims priority to U.S. Provisional Pat. App. No. 63/288,014, entitled "Flexible Sensor Assembly for ENT Instrument," filed Dec. 10, 2021, the disclosure of which is incorporated by reference herein, in its entirety.

BACKGROUND

Image-guided surgery (IGS) is a technique where a computer is used to obtain a real-time correlation of the location of an instrument that has been inserted into a patient's body to a set of preoperatively obtained images (e.g., a CT or MRI scan, 3-D map, etc.), such that the computer system may superimpose the current location of the instrument on the preoperatively obtained images. An example of an electromagnetic IGS navigation system that may be used in IGS procedures is the CARTO® 3 System by Biosense-Webster, Inc., of Irvine, California. In some IGS procedures, a digital tomographic scan (e.g., CT or MRI, 3-D map, etc.) of the operative field is obtained prior to surgery. A specially programmed computer is then used to convert the digital tomographic scan data into a digital map. During surgery, special instruments having sensors (e.g., electromagnetic coils that emit electromagnetic fields and/or are responsive to externally generated electromagnetic fields) are used to perform the procedure while the sensors send data to the computer indicating the current position of each surgical instrument. The computer correlates the data it receives from the sensors with the digital map that was created from the preoperative tomographic scan. The tomographic scan images are displayed on a video monitor along with an indicator (e.g., crosshairs or an illuminated dot, etc.) showing the real-time position of each surgical instrument relative to the anatomical structures shown in the scan images. The surgeon is thus able to know the precise position of each sensor-equipped instrument by viewing the video monitor even if the surgeon is unable to directly visualize the instrument itself at its current location within the body.

In some instances, it may be desirable to dilate an anatomical passageway in a patient. This may include dilation of ostia of paranasal sinuses (e.g., to treat sinusitis), dilation of the larynx, dilation of the Eustachian tube, dilation of other passageways within the ear, nose, or throat, etc. One method of dilating anatomical passageways includes using a guide wire and catheter to position an inflatable balloon within the anatomical passageway, then inflating the balloon with a fluid (e.g., saline) to dilate the anatomical passageway. For instance, the expandable balloon may be positioned within an ostium at a paranasal sinus and then be inflated, to thereby dilate the ostium by remodeling the bone adjacent to the ostium, without requiring incision of the mucosa or removal of any bone. The dilated ostium may then allow for improved drainage from and ventilation of the affected paranasal sinus.

In the context of Eustachian tube dilation, a dilation catheter or other dilation instrument may be inserted into the Eustachian tube and then be inflated or otherwise expanded to thereby dilate the Eustachian tube. The dilated Eustachian tube may provide improved ventilation from the nasopharynx to the middle ear and further provide improved drainage from the middle ear to the nasopharynx.

It may be desirable to provide easily controlled placement of a dilation catheter or other ENT instrument in an anatomical passageway, including in procedures that will be performed only by a single operator. While several systems and methods have been made and used to position a dilation catheter or other ENT instrument in an anatomical passageway, it is believed that no one prior to the inventors has made or used the invention described in the appended claims.

BRIEF DESCRIPTION OF THE DRAWINGS

The drawings and detailed description that follow are intended to be merely illustrative and are not intended to limit the scope of the invention as contemplated by the inventors.

FIG. 1 depicts a schematic view of an exemplary surgery navigation system being used on a patient seated in an exemplary medical procedure chair;

FIG. 4 depicts a top plan view of the flexible navigation sensor assembly of FIG. 3;

FIG. 5 depicts a bottom plan view of the flexible navigation sensor assembly of FIG. 3;

FIG. 6 depicts a top plan view of a proximal portion of the flexible navigation sensor assembly of FIG. 3;

FIG. 7 depicts a top plan view of an intermediate portion of the flexible navigation sensor assembly of FIG. 3;

FIG. 8 depicts a top plan view of a distal portion of the flexible navigation sensor assembly of FIG. 3;

FIG. 9 depicts a bottom plan view of a proximal portion of the flexible navigation sensor assembly of FIG. 3;

FIG. 10 depicts a bottom plan view of an intermediate portion of the flexible navigation sensor assembly of FIG. 3;

FIG. 11 depicts a bottom plan view of a distal portion of the flexible navigation sensor assembly of FIG. 3;

FIG. 17 depicts a top plan view of a proximal portion of the flexible navigation sensor assembly of FIG. 14;

FIG. 18 depicts a top plan view of an intermediate portion of the flexible navigation sensor assembly of FIG. 14;

FIG. 19 depicts a top plan view of a distal portion of the flexible navigation sensor assembly of FIG. 14;

FIG. 20 depicts a bottom plan view of a proximal portion of the flexible navigation sensor assembly of FIG. 14;

FIG. 21 depicts a bottom plan view of an intermediate portion of the flexible navigation sensor assembly of FIG. 14;

FIG. 22 depicts a bottom plan view of a distal portion of the flexible navigation sensor assembly of FIG. 14;

FIG. 30 depicts a top plan view of the flexible navigation sensor assembly of FIG. 29 in a flat configuration;

FIG. 31 depicts a bottom plan view of the flexible navigation sensor assembly of FIG. 29 in the flat configuration;

FIG. 35 depicts a bottom plan view of a proximal portion of the flexible navigation sensor assembly of FIG. 29 in the flat configuration;

FIG. 36 depicts a bottom plan view of an intermediate portion of the flexible navigation sensor assembly of FIG. 29 in the flat configuration;

FIG. 37 depicts a bottom plan view of a distal portion of the flexible navigation sensor assembly of FIG. 29 in the flat configuration;

DETAILED DESCRIPTION

Figure 2:
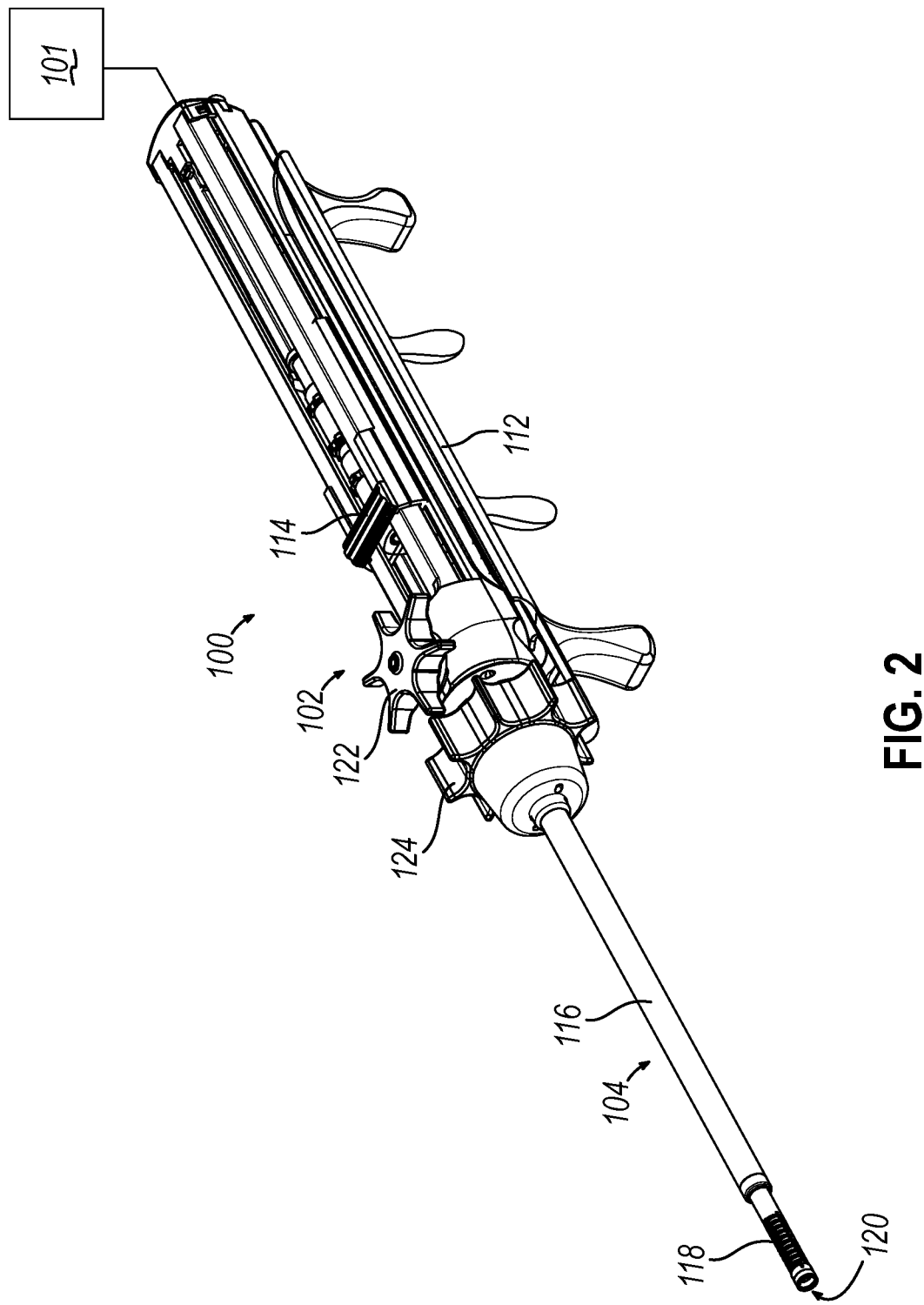
FIG. 2 depicts a perspective view of an exemplary instrument having a flexible navigation sensor assembly.

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

For clarity of disclosure, the terms "proximal" and "distal" are defined herein relative to a surgeon, or other operator, grasping a surgical instrument having a distal surgical end effector. The term "proximal" refers to the position of an element arranged closer to the surgeon, and the term "distal" refers to the position of an element arranged closer to the surgical end effector of the surgical instrument and further away from the surgeon. Moreover, to the extent that spatial terms such as "upper," "lower," "vertical," "horizontal," or the like are used herein with reference to the drawings, it will be appreciated that such terms are used for exemplary description purposes only and are not intended to be limiting or absolute. In that regard, it will be understood that surgical instruments such as those disclosed herein may be used in a variety of orientations and positions not limited to those shown and described herein.

As used herein, the terms "about" and "approximately" for any numerical values or ranges indicate a suitable dimensional tolerance that allows the part or collection of components to function for its intended purpose as described herein.

I. EXEMPLARY IMAGE GUIDED SURGERY NAVIGATION SYSTEM

When performing a medical procedure within a head (H) of a patient (P), it may be desirable to have information regarding the position of an instrument within the head (H) of the patient (P), particularly when the instrument is in a location where it is difficult or impossible to obtain an endoscopic view of a working element of the instrument within the head (H) of the patient (P). FIG. 1 shows an exemplary IGS navigation system (50) enabling an ENT procedure to be performed using image guidance. In addition to or in lieu of having the components and operability described herein IGS navigation system (50) may be constructed and operable in accordance with at least some of the teachings of U.S. Pat. No. 7,720,521, entitled "Methods and Devices for Performing Procedures within the Ear, Nose, Throat and Paranasal Sinuses," issued May 18, 2010, the disclosure of which is incorporated by reference herein, in its entirety; and U.S. Pat. Pub. No. 2014/0364725, entitled "Systems and Methods for Performing Image Guided Procedures within the Ear, Nose, Throat and Paranasal Sinuses," published Dec. 11, 2014, now abandoned, the disclosure of which is incorporated by reference herein, in its entirety.

IGS navigation system (50) of the present example comprises a field generator assembly (60), which comprises set of magnetic field generators (64) that are integrated into a horseshoe-shaped frame (62). Field generators (64) are operable to generate alternating magnetic fields of different frequencies around the head (H) of the patient (P). An instrument, such as any of the instruments described below, may be inserted into the head (H) of the patient (P). Such an instrument may be a standalone device or may be positioned on an end effector. In the present example, frame (62) is mounted to a chair (70), with the patient (P) being seated in the chair (70) such that frame (62) is located adjacent to the head (H) of the patient (P). By way of example only, chair (70) and/or field generator assembly (60) may be configured and operable in accordance with at least some of the teachings of U.S. Pat. No. 10,561,370, entitled "Apparatus to Secure Field Generating Device to Chair," Issued Feb. 18, 2020, the disclosure of which is incorporated by reference herein, in its entirety.

IGS navigation system (50) of the present example further comprises a processor (52), which controls field generators (64) and other elements of IGS navigation system (50). For instance, processor (52) is operable to drive field generators (64) to generate alternating electromagnetic fields; and process signals from the instrument to determine the location of a navigation sensor or position sensor in the instrument within the head (H) of the patient (P). Processor (52) comprises a processing unit (e.g., a set of electronic circuits arranged to evaluate and execute software instructions using combinational logic circuitry or other similar circuitry) communicating with one or more memories. Processor (52) of the present example is mounted in a console (58), which comprises operating controls (54) that include a keypad and/or a pointing device such as a mouse or trackball. A physician uses operating controls (54) to interact with processor (52) while performing the surgical procedure.

While not shown, the instrument may include a navigation sensor or position sensor that is responsive to positioning within the alternating magnetic fields generated by field generators (64). A coupling unit (not shown) may be secured to the proximal end of the instrument and may be configured to provide communication of data and other signals between console (58) and the instrument. The coupling unit may provide wired or wireless communication of data and other signals.

In some versions, the navigation sensor or position sensor of the instrument may comprise at least one coil at or near the distal end of the instrument. When such a coil is positioned within an alternating electromagnetic field generated by field generators (64), the alternating magnetic field may generate electrical current in the coil, and this electrical current may be communicated along the electrical conduit(s) in the instrument and further to processor (52) via the coupling unit. This phenomenon may enable IGS navigation system (50) to determine the location of the distal end of the instrument within a three-dimensional space (i.e., within the head (H) of the patient (P), etc.). To accomplish this, processor (52) executes an algorithm to calculate location coordinates of the distal end of the instrument from the position related signals of the coil(s) in the instrument. Thus, a navigation sensor may serve as a position sensor by generating signals indicating the real-time position of the sensor within three-dimensional space.

Processor (52) uses software stored in a memory of processor (52) to calibrate and operate IGS navigation system (50). Such operation includes driving field generators (64), processing data from the instrument, processing data from operating controls (54), and driving display screen (56). In some implementations, operation may also include monitoring and enforcement of one or more safety features or functions of IGS navigation system (50). Processor (52) is further operable to provide video in real time via display screen (56), showing the position of the distal end of the instrument in relation to a video camera image of the patient's head (H), a CT scan image of the patient's head (H), and/or a computer-generated three-dimensional model of the anatomy within and adjacent to the patient's nasal cavity. Display screen (56) may display such images simultaneously and/or superimposed on each other during the surgical procedure. Such displayed images may also include graphical representations of instruments that are inserted in the patient's head (H), such that the operator may view the virtual rendering of the instrument at its actual location in real time. By way of example only, display screen (56) may provide images in accordance with at least some of the teachings of U.S. Pat. No. 10,463,242, entitled "Guidewire Navigation for Sinuplasty," issued Nov. 5, 2019, the disclosure of which is incorporated by reference herein, in its entirety. In the event that the operator is also using an endoscope, the endoscopic image may also be provided on display screen (56).

The images provided through display screen (56) may help guide the operator in maneuvering and otherwise manipulating instruments within the patient's head (H). It should also be understood that other components of a surgical instrument and other kinds of surgical instruments, as described below, may incorporate a navigation sensor like the navigation sensor described above.

II. EXEMPLARY ENT INSTRUMENTS WITH FLEXIBLE NAVIGATION SENSOR ASSEMBLIES

In some instances, it may be desirable to provide a flexible navigation sensor assembly (e.g., printed circuit board) for ENT instruments as an alternative to traditional coil sensors to facilitate simplified and/or less expensive sensor manufacturing and calibration, reduced sensor sizes and/or profiles, and/or improved sensor integration with a variety of different types of ENT instruments. Each of the exemplary flexible navigation sensor assemblies (110, 210, 410, 510, 610) described below may function in such a manner. While the examples provided below are discussed in the context of various particular ENT instruments (100, 400, 500, 600, 700), flexible navigation sensor assemblies (110, 210, 410, 510, 610) may be used to provide navigation capabilities to any other suitable ENT instruments. Other suitable ways in which flexible navigation sensor assemblies (110, 210, 410, 510, 610) may be used will be apparent to those skilled in the art in view of the teachings herein. It should also be understood that all of the flexible circuit printed circuit boards (PCBs) and other flex circuit features described below may include just one single layer or a plurality of layers.

A. Exemplary Instrument with Rectangular, Dual-Layer Flexible Navigation Sensor Assembly FIGS. 2-13 show an example of an instrument (100) that may be used to guide a dilation catheter into an anatomical passageway to thereby dilate the anatomical passageway, guide other instruments into anatomical passageways, and/ or to deliver RF energy to tissue in or near anatomical passageways. For instance, instrument (100) may be used for dilation of ostia of paranasal sinuses (e.g., to treat sinusitis), dilation of the larynx, dilation of the Eustachian tube, dilation of other passageways within the ear, nose, or throat, etc. In addition, or alternatively, instrument (100) may be used to ablate a nerve (e.g., a posterior nasal neve); ablate a turbinate; or ablate, electroporate (e.g., to promote absorption of therapeutic agents, etc.), or apply resistive heating to any other kind of anatomical structure in the head of a patient.

Instrument (100) of this example includes a handle assembly (102), a shaft assembly (104), and a navigation, visualization, and irrigation assembly (106) having a visualization and irrigation assembly (108) and a navigation sensor assembly (110). Instrument (100) may be coupled with an inflation fluid source (not shown), which may be operable to selectively supply an inflation fluid to a balloon of a dilation catheter (not shown) disposed in instrument (100), for inflating the balloon to thereby dilate the anatomical passageway. In addition, or alternatively, instrument (100) may be coupled with an RF generator (101), which may be operable to generate RF electrosurgical energy for delivery to tissue via electrodes (121, 122) at a distal end of shaft assembly (104) to thereby ablate, electroporate, or apply resistive heating to the tissue.

Handle assembly (102) of this example includes a body (112) and at least one slider (114). Body (112) is sized and configured to be grasped and operated by a single hand of an operator, such as via a power grip, a pencil grip, or any other suitable kind of grip. Slider (114) is operable to translate longitudinally relative to body (112). Slider (114) is coupled with at least one of a guidewire or a catheter (e.g., a dilation catheter or an energy catheter) (not shown) and is thus operable to translate such a guidewire or catheter longitudinally. In some versions, another slider (not shown) may be operable to translate the other of a guidewire or catheter longitudinally.

Shaft assembly (104) of the present example includes a rigid portion (116), a flexible portion (118) distal to rigid portion (116), and an open distal end (120). A pull-wire (not shown) is coupled with flexible portion (118) and with a deflection control knob (122) of handle assembly (102). Deflection control knob (122) is rotatable relative to body (112), about an axis that is perpendicular to the longitudinal axis of shaft assembly (104), to selectively retract the pull-wire proximally. As the pull-wire is retracted proximally, flexible portion (118) bends and thereby deflects distal end (120) laterally away from the longitudinal axis of rigid portion (116). Deflection control knob (122), the pull-wire, and flexible portion (118) thus cooperate to impart steerability to shaft assembly (104). By way of example only, such steerability of shaft assembly (104) may be provided in accordance with at least some of the teachings of U.S. Pat. App. No. 63/028,609, entitled "Shaft Deflection Control Assembly for ENT Guide Instrument," filed May 22, 2020, the disclosure of which is incorporated by reference herein, in its entirety. Other versions may provide some other kind of user input feature to drive steering of flexible portion (118), instead of deflection control knob (122). In some alternative versions, deflection control knob (122) is omitted, and flexible portion (118) is malleable. In still other versions, the entire length of shaft assembly (104) is rigid.

Shaft assembly (104) is also rotatable relative to handle assembly (102), about the longitudinal axis of rigid portion (116). Such rotation may be driven via rotation control knob (124), which is rotatably coupled with body (112) of handle assembly (102). Alternatively, shaft assembly (104) may be rotated via some other form of user input; or may be non-rotatable relative to handle assembly (102). It should also be understood that the example of handle assembly (102) described herein is merely an illustrative example. Shaft assembly (104) may instead be coupled with any other suitable kind of handle assembly or other supporting body.

Figure 3:
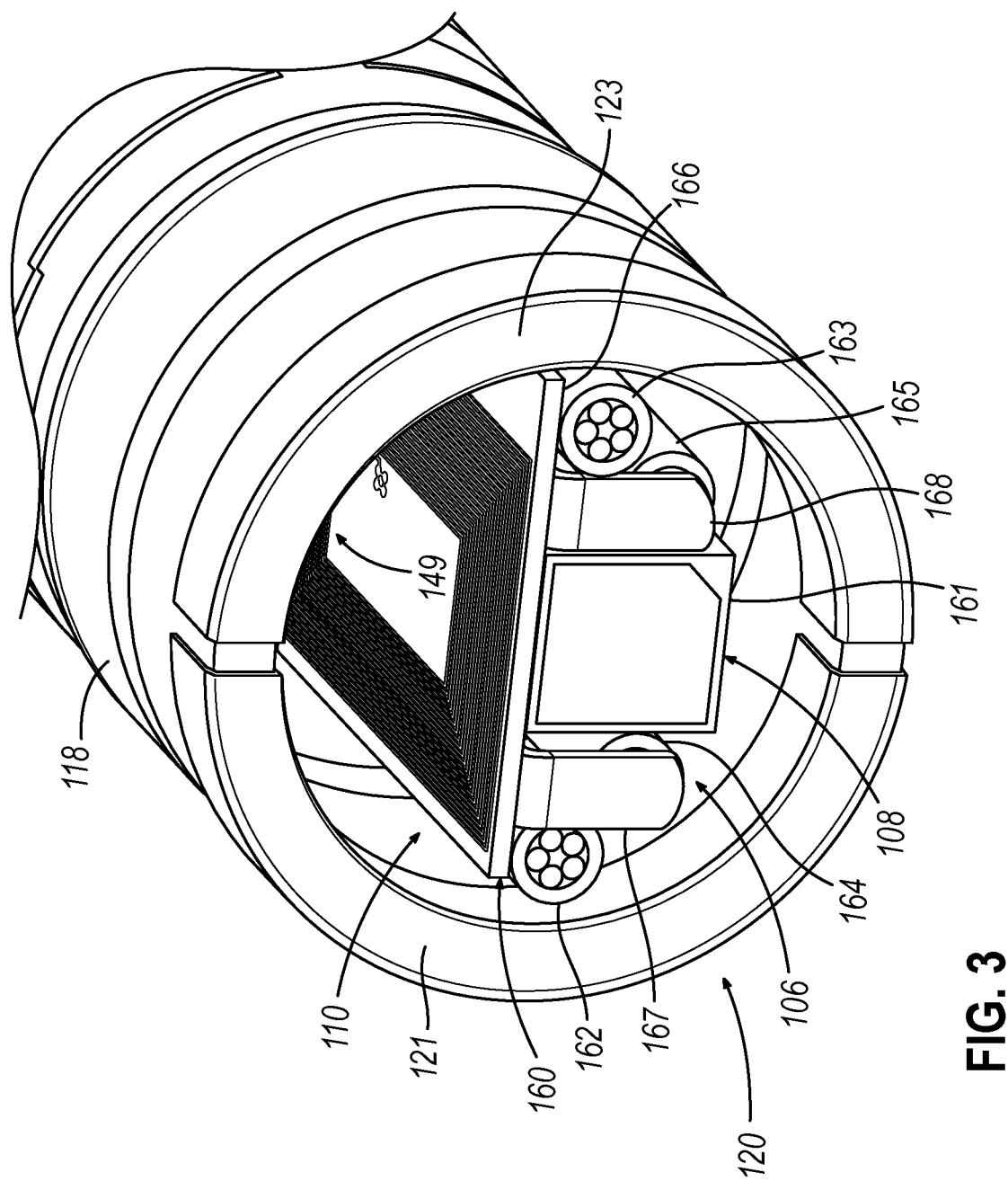
FIG. 3 depicts a perspective view of a distal portion of the instrument of FIG. 2, showing the flexible navigation sensor assembly extending across an internal diameter of the shaft in a flat configuration.

As best shown in FIG. 3, navigation, visualization, and irrigation assembly (106) is disposed within shaft assembly (104) and is operable to provide navigation capabilities to shaft assembly (104), and to provide visualization and irrigation at a target tissue site distal to distal end (120) of shaft assembly (104).

In this regard, navigation sensor assembly (110) of navigation, visualization, and irrigation assembly (106) is disposed within shaft assembly (104) and is operable to provide navigation capabilities to shaft assembly (104). More particularly, navigation sensor assembly (110) extends generally horizontally through a center of flexible portion (118) of shaft assembly (104) across an internal diameter thereof and has a generally flat (e.g., planar) configuration.

Referring now to FIGS. 4-11, navigation sensor assembly (110) of this example is provided in the form of a flexible printed circuit board (PCB) and includes an elongate, generally rectangular flex circuit substrate (126) with a plurality of traces (130, 132, 134, 136), a plurality of corresponding trace leads (e.g., pads) (138a, 138b, 138c, 138d), and a plurality of ground leads (139a, 139b, 139c, 139d) formed (e.g., printed and/or embedded) thereon. As shown, substrate (126) extends longitudinally between proximal and distal ends (140, 141), laterally between first and second sides (142, 143), and vertically between top and bottom surfaces (144, 145). Substrate (126) of the present example includes a pair of through bores (146) extending between top and bottom surfaces (144, 145). Through bores (146) may be configured to receive respective pins (not shown) or other suitable fasteners for securing navigation sensor assembly (110) to flexible portion (118) of shaft assembly (104) and/or to any other component of instrument (100), such as visualization and irrigation assembly (108). In the version shown, substrate (126) also includes a proximal bevel (148) extending between proximal end (140) and second side (143). Proximal bevel (148) may be configured to assist in locating proximal end (140) at a desired position relative to flexible portion (118) of shaft assembly (104) and/or relative to any other component of instrument (100), such as visualization and irrigation assembly (108).

Substrate (126) may be formed of an electrically-insulative, flexible plastic material such as polyimide or liquid crystal polymer (LCP). For example, substrate (126) may be formed of polyimide in cases where maintaining a relatively flat configuration of substrate (126) is desired since such a substrate (126) formed of polyimide may be resiliently biased toward a naturally flat configuration. Alternatively, substrate (126) may be formed of LCP in cases where a more complex geometrical configuration and/or increased flexibility of substrate (126) is desired since a substrate (126) formed of LCP may be thermoformed to accommodate such complex geometries and/or provide increased flexibility, as described below. In any event, traces (130, 132, 134, 136), leads (138a, 138b, 138c, 138d), and ground leads (139a, 139b, 139c, 139d) may each be formed of an electrically-conductive, metallic material such as copper. Navigation sensor assembly (110) is suitably sized to fit within shaft assembly (104) while still permitting space for a working channel (149) to extend along shaft assembly (104) (e.g., above navigation sensor assembly (110)), thereby permitting additional instrumentation (e.g., a dilation catheter and/or an energy catheter), suction, fluids, etc. to pass through open distal end (120) adjacent to navigation sensor assembly (110). In this regard, navigation sensor assembly (110) may have a relatively low profile, at least by comparison to traditional coil sensors. In some versions, navigation sensor assembly (110) may have a thickness of approximately 50 microns.

As shown in FIGS. 4 and 5, traces (130, 132, 134, 136) include a proximal top trace (130) and a distal top trace (132) each formed on top surface (144) of substrate (126), and a proximal bottom trace (134) and a distal bottom trace (136) each formed on bottom surface (145) of substrate (126) opposite and/or parallel to a corresponding top trace (130, 132). Similarly, leads (138a, 138b, 138c, 138d) include first and second top leads (138a, 138b) each formed on top surface (144) of substrate (126), and first and second bottom leads (138c, 138d) each formed on bottom surface (145) of substrate (126) opposite and/or parallel to a corresponding top lead (138a, 138b). Ground leads (139a, 139b, 139c, 139d) include first and second top ground leads (139a, 139b) each formed on top surface (144) of substrate (126), and first and second bottom ground leads (139c, 139d) each formed on bottom surface (145) of substrate (126). Top traces (130, 132), top leads (138a, 138b), and top ground leads (139a, 139b) collectively define a top flex circuit layer of navigation sensor assembly (110), while bottom traces (134, 136), bottom leads (138c, 138d), and bottom ground leads (139c, 139d) collectively define a bottom flex circuit layer of navigation sensor assembly (110).

Referring now to FIGS. 6-11, traces (130, 132, 134, 136) each include a respective first longitudinal portion (130a, 132a, 134a, 136a), concentric loop portion (130b, 132b, 134b, 136b), and second longitudinal portion (130c, 132c, 134c, 136c). As shown, concentric loop portions (132b, 136b) of distal traces (132, 136) are positioned distally relative to concentric loop portions (130b, 134b) of the respective proximal traces (130, 134).

First top lead (138a) is electrically coupled to a proximal end of first longitudinal portion (130a) of proximal top trace (130). First longitudinal portion (130a) of proximal top trace (130) extends distally from its proximal end and is electrically coupled at its distal end to a distal end of first longitudinal portion (134a) of proximal bottom trace (134) by a corresponding via. First longitudinal portion (134a) of proximal bottom trace (134) extends proximally from its distal end toward first bottom lead (138c) and is electrically coupled at its proximal end to a proximal end of second longitudinal portion (134c) of proximal bottom trace (134). Second longitudinal portion (134c) of proximal bottom trace (134) extends distally from its proximal end and is electrically coupled at its distal end to a radially outer end of concentric loop portion (134b) of proximal bottom trace (134). Concentric loop portion (134b) of proximal bottom trace (134) spirals radially inwardly from its radially outer end and is electrically coupled at its radially inner end to a radially inner end of concentric loop portion (130b) of proximal top trace (130) by a corresponding via. Concentric loop portion (130b) of proximal top trace (130) spirals radially outwardly from its radially inner end and is electrically coupled at its radially outer end to a distal end of second longitudinal portion (130c) of proximal top trace (130). Second longitudinal portion (130c) of proximal top trace (130) extends proximally from its distal end toward first top lead (138b) and is electrically coupled at its proximal end to first bottom lead (138c) by a corresponding via.

Second top lead (138b) is electrically coupled to a proximal end of first longitudinal portion (132a) of distal top trace (132). First longitudinal portion (132a) of distal top trace (132) extends distally from its proximal end and is electrically coupled at its distal end to a distal end of first longitudinal portion (136a) of distal bottom trace (136) by a corresponding via. First longitudinal portion (136a) of distal bottom trace (136) extends proximally from its distal end toward second bottom lead (138d) and is electrically coupled at its proximal end to a proximal end of second longitudinal portion (136c) of distal bottom trace (136). Second longitudinal portion (136c) of distal bottom trace (136) extends distally from its proximal end and is electrically coupled at its distal end to a radially outer end of concentric loop portion (136b) of distal bottom trace (136). Concentric loop portion (136b) of distal bottom trace (136) spirals radially inwardly from its radially outer end and is electrically coupled at its radially inner end to a radially inner end of concentric loop portion (132b) of distal top trace (132) by a corresponding via. Concentric loop portion (132b) of distal top trace (132) spirals radially outwardly from its radially inner end and is electrically coupled at its radially outer end to a distal end of second longitudinal portion (132c) of distal top trace (132). Second longitudinal portion (132c) of distal top trace (132) extends proximally from its distal end toward second top lead (138*b*) and is electrically coupled at its proximal end to second bottom lead (138*d*) by a corresponding via.

Thus, current may generally flow along first top lead (138*a*) to first longitudinal portion (130*a*) of proximal top trace (130), to first longitudinal portion (134*a*) of proximal bottom trace (134), to second longitudinal portion (134*c*) of proximal bottom trace (134), to concentric loop portion (134*b*) of proximal bottom trace (134), to concentric loop portion (130*b*) of proximal top trace (130), to second longitudinal portion (130*c*) of proximal top trace (130), to first bottom lead (138*c*). Alternatively, current may generally flow along first bottom lead (138*c*) to second longitudinal portion (130*c*) of proximal top trace (130), to concentric loop portion (130*b*) of proximal top trace (130), to concentric loop portion (134*b*) of proximal bottom trace (134), to second longitudinal portion (134*c*) of proximal bottom trace (134), to first longitudinal portion (134*a*) of proximal bottom trace (134), to first longitudinal portion (130*a*) of proximal top trace (130), to first top lead (138*a*).

Likewise, current may generally flow along second top lead (138*b*) to first longitudinal portion (132*a*) of distal top trace (132), to first longitudinal portion (136*a*) of distal bottom trace (136), to second longitudinal portion (136*c*) of distal bottom trace (136), to concentric loop portion (136*b*) of distal bottom trace (136), to concentric loop portion (132*b*) of distal top trace (132), to second longitudinal portion (132*c*) of distal top trace (132), to second bottom lead (138*d*). Alternatively, current may generally along second bottom lead (138*d*) to second longitudinal portion (132*c*) of distal top trace (132), to concentric loop portion (132*b*) of distal top trace (132), to concentric loop portion (136*b*) of distal bottom trace (136), to second longitudinal portion (136*c*) of distal bottom trace (136), to first longitudinal portion (136*a*) of distal bottom trace (136), to first longitudinal portion (132*a*) of distal top trace (132), to second top lead (138*b*).

When concentric loop portions (130*b*, 132*b*, 134*b*, 136*b*) are positioned within an alternating electromagnetic field generated by field generators (64), the alternating magnetic field may generate electrical current in concentric loop portions (130*b*, 132*b*, 134*b*, 136*b*), and this electrical current may be communicated along the respective longitudinal portions (130*a*, 132*a*, 134*a*, 136*a*, 130*c*, 132*c*, 134*c*, 136*c*) to processor (52), such as via a coupling unit (not shown) electrically coupled to leads (138*a*, 138*b*, 138*c*, 138*d*). In this manner, each concentric loop portion (130*b*, 132*b*, 134*b*, 136*b*) defines a respective navigation sensor (150, 152, 154, 156) that is operable to generate signals indicative of the position of the respective navigation sensor (150, 152, 154, 156) and thereby indicative of the position of at least a portion (e.g., flexible portion (118) of shaft assembly (104)) of instrument (100) in three-dimensional space. The position data generated by such position related signals may be processed by processor (52) for providing a visual indication to the operator to show the operator where shaft assembly (104) of instrument (100) is located within the patient (P) in real time. Such a visual indication may be provided as an overlay on one or more preoperatively obtained images (e.g., CT scans) of the patient's anatomy.

In the example shown, distal navigation sensors (152, 156) are positioned at or near distal end (120) of shaft assembly (104) for facilitating navigation of distal end (120), while proximal navigation sensors (150, 154) may be positioned at or near a proximal end of flexible portion (118) for assisting in identifying the direction and/or orientation of flexible portion (118), for example. By way of further example only, distal navigation sensors (152, 156) may be positioned in the distal region of flexible portion (118) such that distal navigation sensors (152, 156) deflect laterally away from the longitudinal axis of rigid portion (116) as distal end (120) is deflected laterally away from the longitudinal axis of rigid portion (116). Conversely, proximal navigation sensors (150, 154) may be positioned proximal to flexible portion (118) such that proximal navigation sensors (150, 154) do not deflect laterally away from the longitudinal axis of rigid portion (116) as distal end (120) is deflected laterally away from the longitudinal axis of rigid portion (116). In such scenarios, the position data from proximal navigation sensors (150, 154) may be compared with the position data from distal navigation sensors (152, 156) to precisely determine the degree of lateral deflection of distal end (120) in relation to the frame of reference of IGS navigation system (50). Of course, navigation sensors (150, 152, 154, 156) may be positioned at any other suitable locations relative to components of instrument (100) for which navigation is desired; and may be used in any other suitable ways.

In some versions, a length of navigation sensor assembly (110) defined between proximal and distal ends (140, 141) of substrate (126) may be sufficiently great to position distal navigation sensors (152, 156) at or near distal end (120) of shaft assembly (104) for facilitating navigation of distal end (120) while also positioning leads (138*a*, 138*b*, 138*c*, 138*d*) at a sufficiently proximal location whereat leads (138*a*, 138*b*, 138*c*, 138*d*) may be directly electrically coupled to the coupling unit (e.g., without intervening electrical wires or cables). In this regard, navigation sensor assembly (110) may have a length substantially equal to or greater than a length of shaft assembly (104), such that leads (138*a*, 138*b*, 138*c*, 138*d*) may be positioned within or even proximally relative to body (112) of handle assembly (110). For example, navigation sensor assembly (110) may have a length on the order of multiple meters. In this manner, navigation sensor assembly (110) may both generate the position related signals and transmit the position related signals to the coupling unit without requiring electrical wires or cables to be routed therebetween.

It will be appreciated that navigation sensors (150, 152, 154, 156) may each be configured in any other suitable manner for generating electrical current when positioned within an alternating electromagnetic field. For example, the number of concentric loops of each concentric loop portion (130*b*, 132*b*, 134*b*, 136*b*) defining navigation sensors (150, 152, 154, 156) may be more or less than the number shown. In addition or alternatively, any one or more dimensions (e.g., height, width, length, and/or thickness) of each concentric loop portion (130*b*, 132*b*, 134*b*, 136*b*) may be greater or less than the dimension shown. While the illustrated concentric loop portions (130*b*, 132*b*, 134*b*, 136*b*) are each generally rectangular, concentric loop portions (130*b*, 132*b*, 134*b*, 136*b*) may each have any other suitable shape. For example, concentric loop portions (130*b*, 132*b*, 134*b*, 136*b*) may each be generally circular, and may have any suitable diameter.

It will be appreciated that either top traces (130, 132) or bottom traces (134, 136) alone may be capable of communicating position related signals to processor (52), and that the position related signals communicated to processor (52) by bottom traces (134, 136) may therefore be redundant to those communicated by top traces (130, 132). Such redundancy may improve the reliability of the position related signals provided by top traces (130, 132) by verifying the position data generated by the position related signals communicated by top traces (130, 132). In addition, or alternatively, the position related signals communicated by top traces (130, 132) and bottom traces (134, 136) may be used to determine an orientation of flexible portion (118) of shaft assembly (104).

Figure 12:
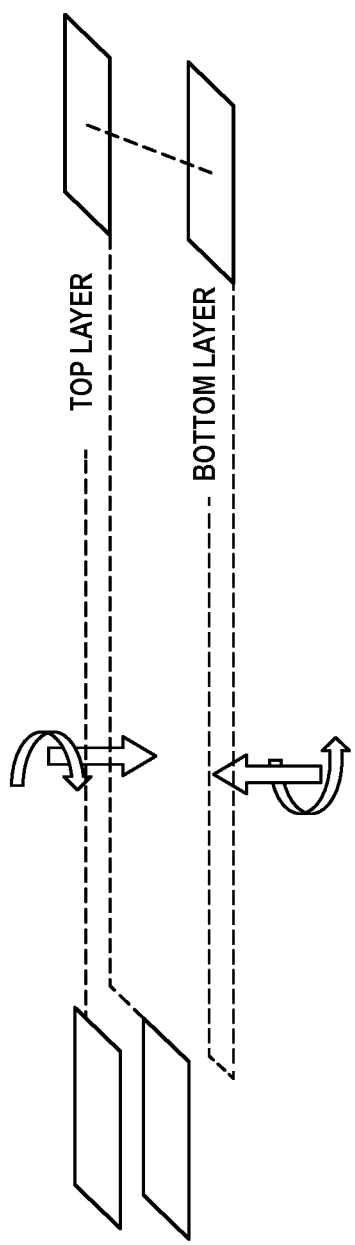
FIG. 12 depicts a schematic circuit diagram of the flexible navigation sensor assembly of FIG. 3.

In some versions, the opposing arrangement of top traces (130, 132) relative to the corresponding bottom traces (134, 136) may assist in substantially reducing or eliminating electromagnetic interference or "noise" (which may otherwise be caused by current flowing in traces (130, 132, 134, 136) due to the absence of twisted pair wires for leads (138*a*, 138*b*, 138*c*, 138*d*) that are typically present in traditional coil sensor arrangements) to thereby improve the accuracy and reliability of the position related signals communicated to processor (52). As schematically shown in FIG. 12, current may flow in a first direction in a top trace (130, 132), and may flow in a second direction opposite and parallel to the first direction in the corresponding bottom trace (134, 136). For example, current may flow in a first direction (e.g., one of clockwise or counterclockwise) in a top concentric loop portion (130*b*, 132*b*), and may flow in a second direction opposite and parallel to the first direction (e.g., the other of clockwise or counterclockwise) in the corresponding bottom concentric loop portion (134*b*, 136*b*). Likewise, current may flow in a first direction (e.g., one of proximal or distal) in a top longitudinal portion (130*a*, 132*a*, 130*c*, 132*c*), and may flow in a second direction opposite and parallel to the first direction (e.g., the other of proximal or distal) in the corresponding bottom longitudinal portion (134*a*, 136*a*, 134*c*, 136*c*). The current flowing in the first direction in top trace (130, 132) and the current flowing in the second direction in the corresponding bottom trace (134, 136) may have substantially the same magnitude as each other. Thus, the magnetic field noise caused by the current in top trace (130, 132) and the magnetic field noise caused by the current in the corresponding bottom trace (134, 136) may be substantially equal and opposite to each other, such that the magnetic field noises cancel each other and are thereby both substantially reduced or eliminated. Therefore, while either the top or bottom flex circuit layer alone may be capable of providing position related signals, the redundancy of having both layers may provide noise reduction benefits. In some versions, more or less flex circuit layers may be provided. For example, either the top or bottom flex circuit layer may be omitted.

In some other versions, the opposing arrangement of top leads (138*a*, 138*b*) relative to the corresponding bottom leads (138*c*, 138*d*) may assist in substantially reducing or eliminating electromagnetic noise picked up at the proximal terminations of traces (130, 132, 134, 136). For example, the polarity of first top lead (138*a*) may be opposite that of first bottom lead (138*c*), such that any pickup noise from the proximal termination of proximal top trace (130) and any pickup noise from the proximal terminal of proximal bottom trace (134) cancel each other and are thereby both substantially reduced or eliminated. Likewise, the polarity of second top lead (138*b*) may be opposite that of second bottom lead (138*d*), such that any pickup noise from the proximal termination of distal top trace (132) and any pickup noise from the proximal termination of distal bottom trace (136) cancel each other and are thereby both substantially reduced or eliminated.

While navigation sensor assembly (110) of the present example includes a single distal top navigation sensor (152) and a single distal bottom navigation sensor (156), navigation sensor assembly (110) may alternatively include a plurality of distal top navigation sensors (152) and/or distal bottom navigation sensors (156). For example, navigation sensor assembly (110) may include a pair of laterally-adjacent distal top navigation sensors (152) and/or a pair of laterally-adjacent distal bottom navigation sensors (156). Such a pair of distal top and/or bottom navigation sensors (152, 156) may assist in improving the accuracy of location coordinates of flexible portion (118) of shaft assembly (104) calculated by processor (52) from the position related signals of navigation sensors (150, 152, 154, 156). In some cases, navigation sensor assembly (110) may be disposed along a generally cylindrical surface of flexible portion (118) of shaft assembly (104) as described below, such that one distal top and/or bottom navigation sensor (152, 156) of such a pair may be disposed on a first lateral side of flexible portion (118) of shaft assembly (104) and the other distal top and/or bottom navigation sensor (152, 156) of such a pair may be disposed on a second lateral side of flexible portion (118) of shaft assembly (104). In this manner, the pair of distal top and/or bottom navigation sensors (152, 156) may provide position related signals indicative of locations of both lateral sides of flexible portion (118), which may improve the accuracy of the location coordinates calculated by processor (52), such as when flexible portion (118) is in a bent configuration.

While navigation sensor assembly (110) of the present example is disposed within shaft assembly (104) such that navigation sensors (150, 152, 154, 156) are operable to generate signals indicative of the position of shaft assembly (104), navigation sensor assembly (110) may alternatively be positioned on any other component of instrument (100) for generating signals indicative of the position of such other component. Moreover, while navigation sensor assembly (110) of the present example extends generally horizontally through a center of flexible portion (118) of shaft assembly (104) across an internal diameter thereof and has a generally flat configuration, navigation sensor assembly (110) may alternatively be disposed at any other suitable location on or within shaft assembly (104) and may have any other suitable configuration. For example, navigation sensor assembly (110) may extend across any suitable chord of flexible portion (118) of shaft assembly (104).

Figure 13:
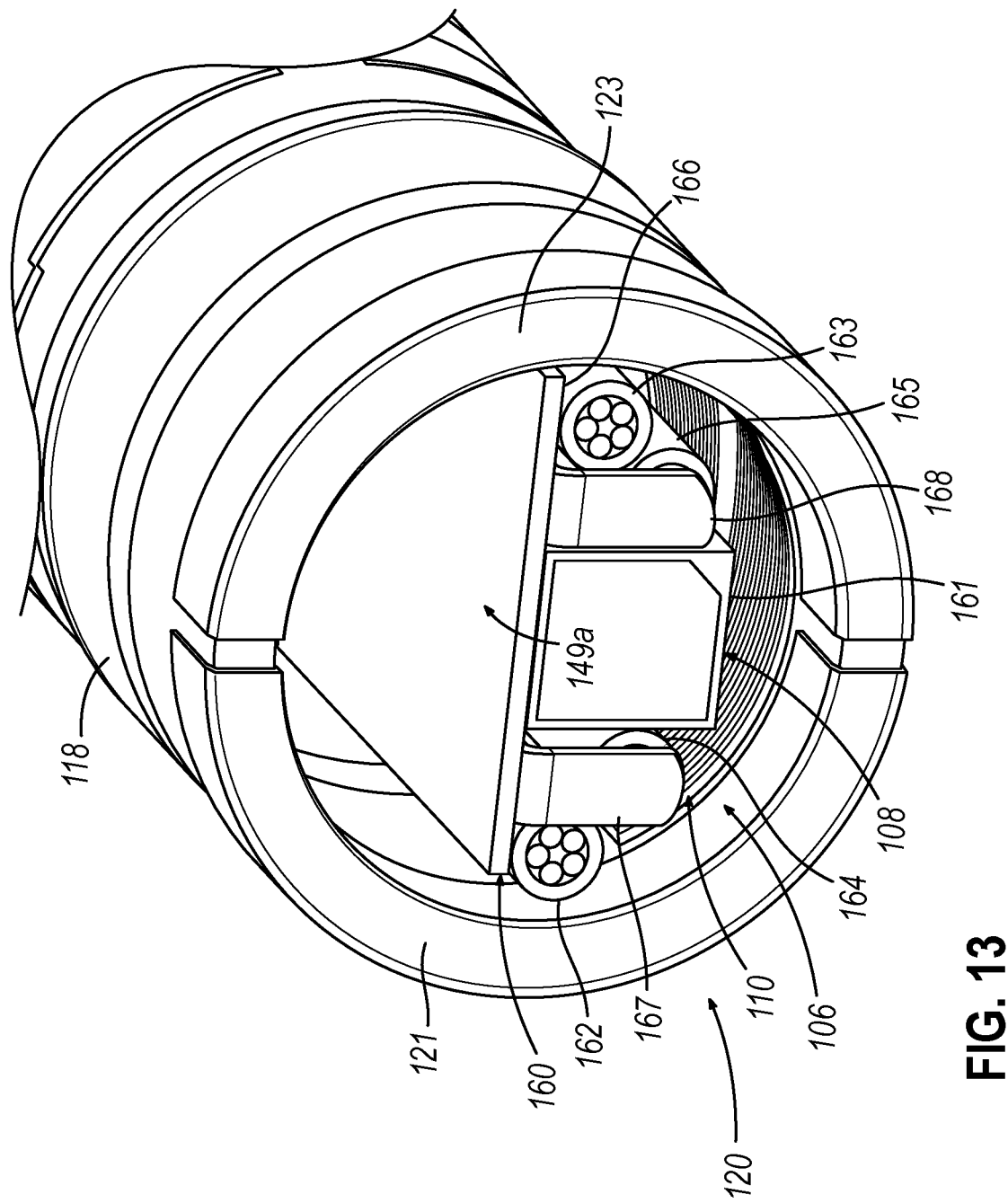
FIG. 13 depicts a perspective view of a distal portion of the instrument of FIG. 2, showing the flexible navigation sensor assembly disposed along an inner cylindrical surface of the shaft in a curved configuration.
Figure 14:
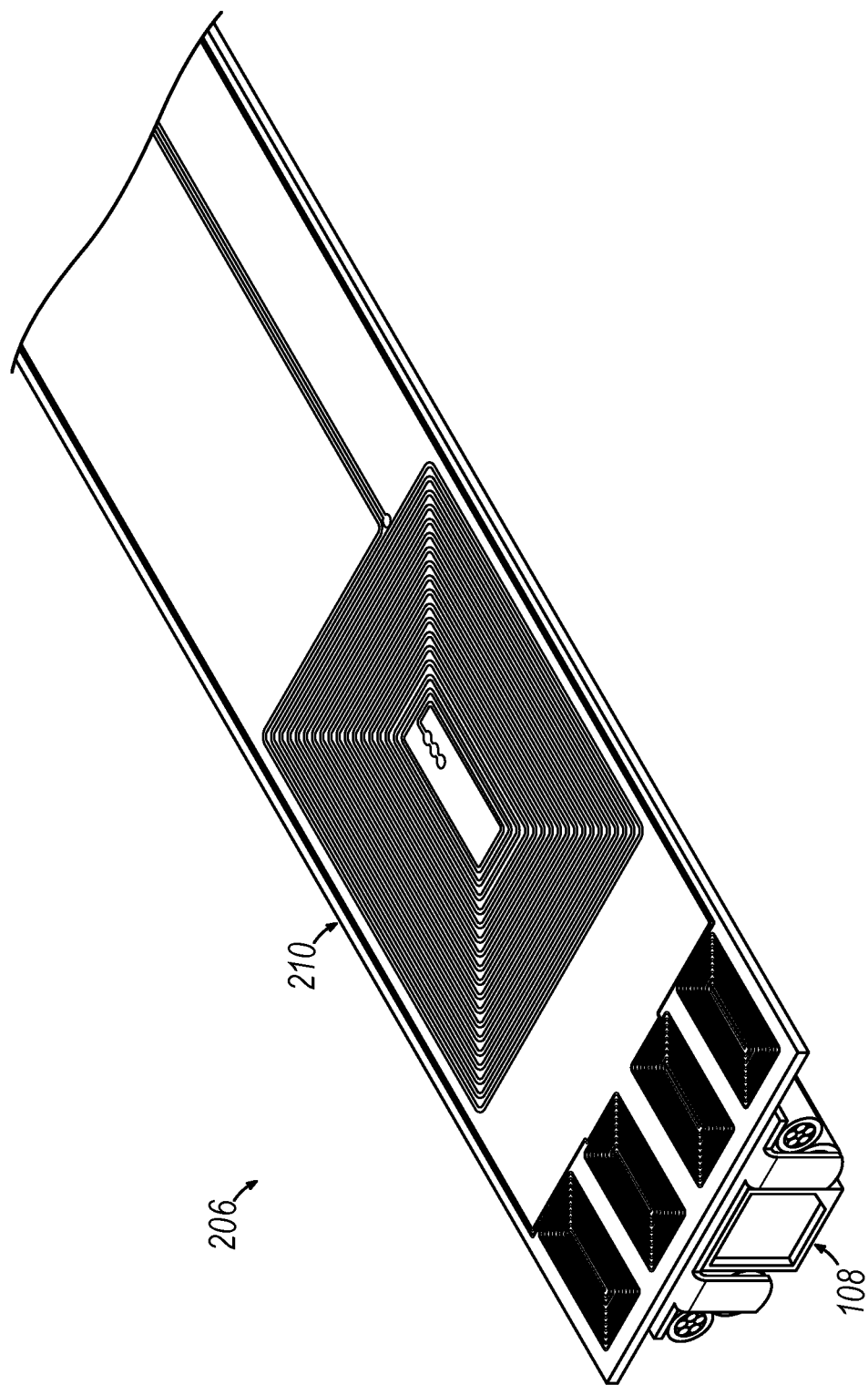
FIG. 14 depicts a perspective view of a distal portion of the visualization and irrigation assembly of the instrument of FIG. 2 coupled to another exemplary flexible navigation sensor assembly.

As shown in FIG. 13, navigation sensor assembly (110) may be disposed along a generally cylindrical inner surface of flexible portion (118) of shaft assembly (104) below visualization and irrigation assembly (108) and may have a generally curved configuration such that navigation sensor assembly (110) is curved about the longitudinal axis of flexible portion (118) of shaft assembly (104) with a radius of curvature corresponding to that of the cylindrical inner surface to thereby conform to an inner circumference of flexible portion (118). In this configuration, navigation sensor assembly (110) may permit relatively more space for a larger working channel (149*a*) to extend along shaft assembly (104) (e.g., above visualization and irrigation assembly (108)). Alternatively, navigation sensor assembly (110) may be disposed along a generally cylindrical outer surface of flexible portion (118) of shaft assembly (104) and may have a generally curved configuration such that navigation sensor assembly (110) is curved about the longitudinal axis of flexible portion (118) of shaft assembly (104) with a radius of curvature corresponding to that of the cylindrical outer surface to thereby conform to an outer circumference of flexible portion (118).

In any event, navigation sensor assembly (110) may permit space for working channel (149, 149*a*) to extend along shaft assembly (104) as described above, such that navigation sensor assembly (110) may continuously communicate position related signals to processor (52) during advancement of a catheter (e.g., a dilation catheter or an energy catheter) distally through working channel (149, 149*a*) and/or while such a catheter remains positioned within working channel (149, 149*a*), such as during inflation of a balloon of a dilation catheter to dilate an anatomical passageway and/or during delivery of RF energy to tissue via electrodes of an energy catheter. In other words, navigation of flexible portion (118) may be performed concurrently with dilation of an anatomical passageway and/or concurrently with delivery of RF energy to tissue, without interfering with each other.

As noted above, navigation, visualization, and irrigation assembly (106) of the present example further includes visualization and irrigation assembly (108), which is disposed within shaft assembly (104) directly below navigation sensor assembly (110). Visualization and irrigation assembly (108) is operable to provide visualization and irrigation at a target tissue site distal to distal end (120) of shaft assembly (104). Referring again to FIG. 3, visualization and irrigation assembly (108) of this example includes a plate member (160), a camera (161), a pair of illuminating elements (162, 163), and a pair of fluid conduits (164, 165). Camera (161) may be in the form of a camera that is suitably sized to fit within shaft assembly (104) while still permitting space for working channel (149) to extend along shaft assembly (104), thereby permitting additional instrumentation, suction, fluids, etc. to pass through open distal end (120) adjacent to camera (161).

Illuminating elements (162, 163) are configured and operable to illuminate the field of view of camera (161). Illuminating element (162) is positioned at one lateral side of camera (161) while illuminating element (163) is positioned at the other lateral side of camera (161). While two illuminating elements (162, 163) are used in the present example, other versions may employ just one illuminating element (162, 163) or more than two illuminating elements (162, 163). In the present example, illuminating elements (162, 163) include LEDs. In some other versions, illuminating elements (162, 163) include fiber optic components. For instance, each illuminating element (162, 163) may include a lens that is optically coupled with one or more respective optical fibers or optical fiber bundles. Such optical fibers or optical fiber bundles may extend along shaft assembly (104) and be optically coupled with a source of light that is either integrated into handle assembly (110) (or some other body from which shaft assembly (104) extends) or otherwise provided.

Conduits (164, 165) laterally flank camera (161) in this example. In particular, conduit (164) is positioned outboard relative to camera (161) while being positioned inboard relative to illuminating element (162). Conduit (165) is positioned outboard relative to camera (161) while being positioned inboard relative to illuminating element (163). In some versions, both conduits (164, 165) are in fluid communication with a source of liquid (e.g., saline, etc.). In some other versions, both conduits (164, 165) are in fluid communication with a source of suction. In some other versions, one conduit (164 or 165) is in fluid communication with a source of liquid while the other conduit (165 or 164) is in fluid communication with a source of suction. In still other versions, one or both of conduits (164, 165) may be in fluid communication with a valve assembly, where the valve assembly is coupled with a source of liquid and a source of suction. In such versions, the valve assembly may be used to selectively couple one or both of conduits (164, 165) with the source of liquid or the source of suction. Various suitable ways in which either or both of conduits (164, 165) may be coupled with a source of liquid and/or a source of suction will be apparent to those skilled in the art in view of the teachings herein. In versions where at least one of conduits (164, 165) is in communication with a source of liquid, such conduit(s) (164, 165) may be used to deliver such liquid to a distal end of camera (161). By flushing the distal end of camera (161) with liquid, conduits (164, 165) may be used to keep the distal end of camera (161) clear of debris and thereby maintain appropriate visualization via camera (161). In versions where at least one of conduits (164, 165) is in communication with a source of suction, such conduit(s) (164, 165) may be used to draw away excess liquids (e.g., liquid expelled via the other conduit (164), etc.).

Plate member (160) of this example includes a plate (166) and a pair of transversely extending tabs (167, 168). Plate (166) is positioned over camera (161) and may thus serve to shield camera (161) from getting snagged and perhaps damaged by other instruments that are advanced along working channel (149). In the embodiment shown, navigation sensor assembly (110) is further positioned over plate (166) and thus may likewise serve to shield camera (161) from getting snagged by such instruments. Tabs (167, 168) are positioned to correspond with the locations of respective distal ends of conduits (164, 165). In particular, tab (167) is positioned just distal to the distal end of conduit (164); while tab (168) is positioned just distal to the distal end of conduit (165). Tab (167) may be further positioned to leave a gap (not shown) between the proximal face of tab (167) and the distal end of conduit (164), and a similar gap may be left between the proximal face of tab (168) and the distal end of conduit (165). These gaps may be sized to allow liquid to escape from the distal ends of conduits (164, 165); and to allow suction to be applied via the distal ends of conduits (164, 165). However, the presence of tabs (167, 168) may assist in diverting liquid expelled via the distal ends of conduits (164, 165) toward the distal end of camera (161). In other words, when liquid is conveyed along either or both of conduits (164, 165), and such liquid exits the distal end(s) of such conduit(s) (164, 165), the corresponding tab(s) (167, 168) may divert the expelled liquid toward the distal end of camera (161) and thereby assist in flushing debris away from camera (161). In some other versions, tabs (167, 168) are omitted. Plate member (160) is merely optional.

In addition to the foregoing, at least part of visualization and irrigation assembly (108) and/or other components of instrument (100) may be configured and operable in accordance with at least some of the teachings of U.S. Provisional Pat. App. No. 63/037,640, entitled "ENT Guide with Advanceable Instrument and Advanceable Endoscope Shaft," filed Jun. 11, 2020, the disclosure of which is incorporated by reference herein, in its entirety; U.S. Provisional Pat. App. No. 63/142,098, entitled "ENT Instrument with Ablation Loop and Ablation Needles," filed Jan. 27, 2021, the disclosure of which is incorporated by reference herein, in its entirety.

In some versions, visualization and irrigation assembly (108) may be omitted, such that a second working channel (not shown) may be provided opposite working channel (149) relative to navigation sensor assembly (110) (e.g., below navigation sensor assembly (110)) in cases where navigation sensor assembly (110) is in its flat configuration extending across an internal diameter or other chord of flexible portion (118) of shaft assembly (104) (see FIG. 3), or such that an internal cross dimension of working channel (149) may be enlarged in cases where navigation sensor assembly (110) is in its curved configuration disposed along a cylindrical inner surface of flexible portion (118) of shaft assembly (104) (see FIG. 13).

While instrument (100) has been described for dilating an anatomical passageway and/or for delivering RF energy to tissue within the ear, nose, or throat of a patient, it will be appreciated that instrument (100) may be adapted to perform other surgical functions including, for example, diagnostic procedures, electrophysiology mapping, electrophysiology directed catheter guided surgery, and/or cardiac ablation procedures.

B. Exemplary Navigation, Visualization, and Irrigation Assembly with Camera Circuitry and Temperature Sensors Integrated onto Navigation Sensor Assembly In some instances, it may be desirable to provide a navigation, visualization, and irrigation assembly having circuitry for camera (161) of visualization and irrigation assembly (108) integrated onto the navigation sensor assembly thereof, such as for eliminating the need to route wires or cables to camera (161) along shaft assembly (104). Integrating the circuitry for camera (161) into a flex circuit that is already being used for other purposes (e.g., for navigation sensor assembly circuitry, etc.) may provide an increase in flexibility and/or a reduction in size as compared to navigation, visualization, and irrigation assembly (106). As a result, the internal cross dimension of working channel (149) may be enlarged, and/or the external cross dimension(s) of shaft assembly (104) may be reduced. In addition, or alternatively, it may be desirable to monitor a temperature associated with such a navigation sensor assembly, such as for improving the accuracy of location coordinates determined via the navigation sensor assembly, which may otherwise be adversely affected by temperature changes. FIGS. 14-23 show an example of a navigation, visualization, and irrigation assembly (206) having such functionalities, and which may be incorporated into instrument (100) in place of navigation, visualization, and irrigation assembly (106). Navigation, visualization, and irrigation assembly (206) has a navigation sensor assembly (210) and visualization and irrigation assembly (108) disposed directly below navigation sensor assembly (210), and may be similar to navigation, visualization, and irrigation assembly (106) except as otherwise described.

Referring now to FIGS. 15-22, navigation sensor assembly (210) of this example is provided in the form of a flexible printed circuit board (PCB) and includes an elongate, generally rectangular flex circuit substrate (226) with a plurality of thermocouples (227a, 227b, 227c, 227d), camera traces (228a, 228b, 228c, 228d), corresponding camera trace leads (229a, 229b, 229c, 229d, 229e, 229f, 229g, 229h), sensor traces (230, 232, 234, 236), corresponding sensor trace leads (238a, 238, 238c, 238d), and ground leads (239a, 239b) formed (e.g., printed and/or embedded) thereon. As shown, substrate (226) extends longitudinally between proximal and distal ends (240, 241), laterally between first and second sides (242, 243), and vertically between top and bottom surfaces (244, 245). Substrate (226) of the present example includes a through bore (246) extending between top and bottom surfaces (244, 245). Through bore (246) may be configured to receive a pin (not shown) or other suitable fastener for securing navigation sensor assembly (210) to flexible portion (118) of shaft assembly (104) and/or to any other component of instrument (100), such as visualization and irrigation assembly (108). In the version shown, substrate (226) also includes a proximal bevel (248) extending between proximal end (240) and first side (242). Proximal bevel (248) may be configured to assist in locating proximal end (240) at a desired position relative to flexible portion (118) of shaft assembly (104) and/or relative to any other component of instrument (100), such as visualization and irrigation assembly (108).

Substrate (226) may be formed of an electrically-insulative, flexible plastic material such as polyimide or liquid crystal polymer (LCP). For example, substrate (226) may be formed of polyimide in cases where maintaining a relatively flat configuration of substrate (226) is desired since such a substrate (226) formed of polyimide may be resiliently biased toward a naturally flat configuration. Alternatively, substrate (226) may be formed of LCP in cases where a more complex geometrical configuration and/or increased flexibility of substrate (226) is desired since a substrate (226) formed of LCP may be thermoformed to accommodate such complex geometries and/or provide increased flexibility, as described below. In any event, sensor traces (230, 232, 234, 236), sensor leads (238a, 238b, 238c, 238d), camera traces (228a, 228b, 228c, 228d), and camera leads (229a, 229b, 229c, 229d, 229e, 229f, 229g, 229h) may each be formed of an electrically-conductive, metallic material such as copper. Navigation sensor assembly (210) is suitably sized to fit within shaft assembly (104) while still permitting space for working channel (149) to extend along shaft assembly (104) (e.g., above navigation sensor assembly (210)), thereby permitting additional instrumentation (e.g., a dilation catheter and/or an energy catheter), suction, fluids, etc. to pass through open distal end (120) adjacent to navigation sensor assembly (210). In this regard, navigation sensor assembly (210) may have a relatively low profile, at least by comparison to traditional coil sensors. In some versions, navigation sensor assembly (210) may have a thickness of approximately 50 microns.

Figure 15:
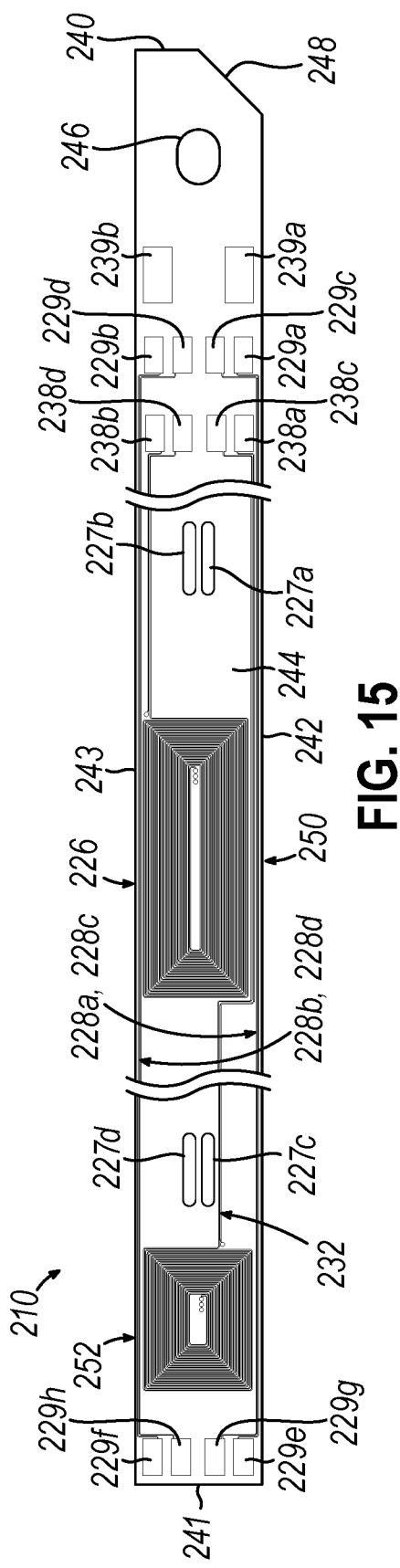
FIG. 15 depicts a top plan view of the flexible navigation sensor assembly of FIG. 14.
Figure 16:
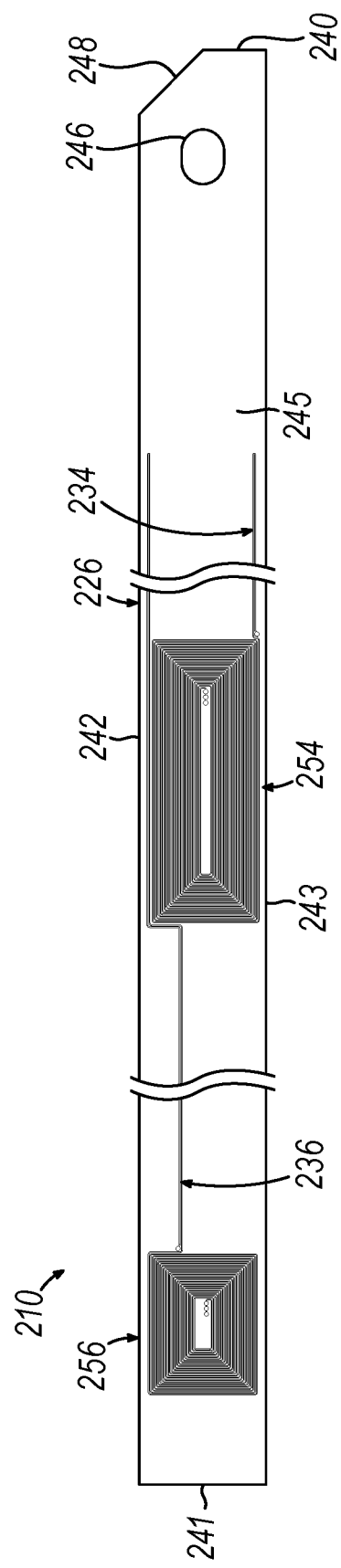
FIG. 16 depicts a bottom plan view of the flexible navigation sensor assembly of FIG. 14.

As shown in FIGS. 15 and 16, sensor traces (230, 232, 234, 236) include a proximal top sensor trace (230) and a distal top sensor trace (232) each formed on top surface (244) of substrate (226), and a proximal bottom sensor trace (234) and a distal bottom sensor trace (236) each formed on bottom surface (245) of substrate (226) opposite and/or parallel to a corresponding top sensor trace (230, 232). Sensor leads (238a, 238b, 238c, 238d) include first and second outer sensor leads (238a, 238b) and first and second inner sensor leads (238c, 238d) each formed on top surface (244) of substrate (226). Camera traces (228a, 228b, 228c, 228d) include first and second outer camera traces (228a, 228b) and first and second inner camera traces (228c, 228d) each formed on top surface (244) of substrate (226). Camera leads (229a, 229b, 229c, 229d, 229e, 229f, 229g, 229h) include first and second proximal outer camera leads (229a, 229b), first and second proximal inner camera leads (229c, 229d) first and second distal outer camera leads (229e, 229f), and first and second distal inner camera leads (229g, 229h) each formed on top surface (244) of substrate (226). Ground leads (239a, 239b) include first and second proximal ground leads (239a, 239b) each formed on top surface (244) of substrate (226). Thermocouples (227a, 227b, 227c, 227d) include first and second proximal thermocouples (227a, 227b) and first and second distal thermocouples (227c, 227d) each formed on top surface (244) of substrate (226). Top sensor traces (230, 232), sensor leads (238a, 238b, 238c, 238d), camera traces (228a, 228b, 228c, 228d), camera leads (229a, 229b, 229c, 229d, 229e, 229f, 229g, 229h), ground leads (239a, 239b), and thermocouples (227a, 227b, 227c, 227d) collectively define a top flex circuit layer of navigation sensor assembly (210), while bottom sensor traces (234, 236) collectively define a bottom flex circuit layer of navigation sensor assembly (210).

Referring now to FIGS. 17-22, sensor traces (230, 232, 234, 236) each include a respective first longitudinal portion (230a, 232a, 234a, 236a), concentric loop portion (230b, 232b, 234b, 236b), and second longitudinal portion (230c, 232c, 234c, 236c). As shown, concentric loop portions (232b, 236b) of distal traces (232, 236) are positioned distally relative to concentric loop portions (230b, 234b) of the respective proximal traces (230, 234). Moreover, concentric loop portions (230b, 232b, 234b, 236b) are each laterally flanked by camera traces (228a, 228b, 228c, 228d).

First outer sensor lead (238a) is electrically coupled to a proximal end of first longitudinal portion (232a) of distal top trace (232). First longitudinal portion (232a) of distal top trace (232) extends distally from its proximal end and is electrically coupled at its distal end to a distal end of first longitudinal portion (236a) of distal bottom trace (236). First longitudinal portion (236a) of distal bottom trace (236) extends proximally from its distal end toward a location on bottom surface (245) opposite first outer sensor lead (238a) and is electrically coupled at its proximal end to a proximal end of second longitudinal portion (236c) of distal bottom trace (236). Second longitudinal portion (236c) of distal bottom trace (236) extends distally from its proximal end and is electrically coupled at its distal end to a radially outer end of concentric loop portion (236b) of distal bottom trace (236). Concentric loop portion (236b) of distal bottom trace (236) spirals radially inwardly from its radially outer end and is electrically coupled at its radially inner end to a radially inner end of concentric loop portion (232b) of distal top trace (232). Concentric loop portion (232b) of distal top trace (232) spirals radially outwardly from its radially inner end and is electrically coupled at its radially outer end to a distal end of second longitudinal portion (232c) of distal top trace (232). Second longitudinal portion (232c) of distal top trace (232) extends proximally from its distal end to first inner sensor lead (238c) and is electrically coupled thereto at its proximal end.

Second outer sensor lead (238b) is electrically coupled to a proximal end of first longitudinal portion (230a) of proximal top trace (230). First longitudinal portion (230a) of proximal top trace (230) extends distally from its proximal end and is electrically coupled at its distal end to a distal end of first longitudinal portion (234a) of proximal bottom trace (234). First longitudinal portion (234a) of proximal bottom trace (234) extends proximally from its distal end toward a location on bottom surface (245) opposite second outer sensor lead (238b) and is electrically coupled at its proximal end to a proximal end of second longitudinal portion (234c) of proximal bottom trace (234). Second longitudinal portion (234c) of proximal bottom trace (234) extends distally from its proximal end and is electrically coupled at its distal end to a radially outer end of concentric loop portion (234b) of proximal bottom trace (234). Concentric loop portion (234b) of proximal bottom trace (234) spirals radially inwardly from its radially outer end and is electrically coupled at its radially inner end to a radially inner end of concentric loop portion (230b) of proximal top trace (230). Concentric loop portion (230b) of proximal top trace (230) spirals radially outwardly from its radially inner end and is electrically coupled at its radially outer end to a distal end of second longitudinal portion (230c) of proximal top trace (230). Second longitudinal portion (230c) of proximal top trace (230) extends proximally from its distal end to second inner sensor lead (238d) and is electrically coupled thereto at its proximal end.

In a manner similar to that described above, each concentric loop portion (230, 232, 234, 236) defines a respective navigation sensor (250, 252, 254, 256) that is operable to generate signals indicative of the position of the respective navigation sensor (250, 252, 254, 256) and thereby indicative of the position of at least a portion (e.g., flexible portion (118) of shaft assembly (104)) of instrument (100) in three-dimensional space. The position data generated by such position related signals may be processed by processor (52) for providing a visual indication to the operator to show the operator where shaft assembly (104) of instrument (100) is located within the patient (P) in real time. Such a visual indication may be provided as an overlay on one or more preoperatively obtained images (e.g., CT scans) of the patient's anatomy.

First proximal outer camera lead (229a) is electrically coupled to a proximal end of first outer camera trace (228a), which extends distally from its proximal end to first distal outer camera lead (229e) and is electrically coupled thereto at its distal end. Second proximal outer camera lead (229b) is electrically coupled to a proximal end of second outer camera trace (228b), which extends distally from its proximal end to second distal outer camera lead (229f) and is electrically coupled thereto at its distal end. First proximal inner camera lead (229c) is electrically coupled to a proximal end of first inner camera trace (228c), which extends distally from its proximal end to first distal inner camera lead (229g) and is electrically coupled thereto at its distal end. Second proximal inner camera lead (229d) is electrically coupled to a proximal end of second inner camera trace (228d), which extends distally from its proximal end to second distal inner camera lead (229h) and is electrically coupled thereto at its distal end.

Thus, current and/or image signals may generally flow between first proximal and distal outer camera leads (229a, 229e) via first outer camera trace (228a), between second proximal and distal outer camera leads (229b, 229f) via second outer camera trace (228b), between first proximal and distal inner camera leads (229e, 229g) via first inner camera trace (228c), and/or between second proximal and distal inner camera leads (229d, 229h) via second inner camera trace (228d). In this manner, camera traces (228a, 228b, 228c, 228d) and camera leads (229a, 229b, 229c, 229d, 229e, 229f, 229g, 229h) may be used to operatively couple camera (161) of visualization and irrigation assembly (108) to processor (52) for transmitting image signals from camera (161) to processor (52) (which may thereby provide video in real time via display screen (56)), and/or may operatively couple camera (161) to a power source (not shown) for supplying power to camera (161).

In some versions, a length of navigation sensor assembly (210) defined between proximal and distal ends (240, 241) of substrate (226) may be sufficiently great to position distal navigation sensors (252, 256) at or near distal end (120) of shaft assembly (104) for facilitating navigation of distal end (120) while also positioning sensor leads (238a, 238b, 238c, 238d) at a sufficiently proximal location whereat sensor leads (238a, 238b, 238c, 238d) may be directly electrically coupled to the coupling unit (e.g., without intervening electrical wires or cables). Likewise, the length of navigation sensor assembly (210) may be sufficiently great to position distal camera leads (229e, 229f, 229g, 229h) at a sufficiently distal location whereat distal camera leads (229e, 229f, 229g, 229h) may be directly electrically coupled to camera (161) (e.g., without intervening electrical wires or cables) while also positioning proximal camera leads (229a, 229b, 229c, 229d) at a sufficiently proximal location whereat proximal camera leads (229a, 229b, 229c, 229d) may be directly electrically coupled to the coupling unit (e.g., without intervening electrical wires or cables). In this regard, navigation sensor assembly (210) may have a length substantially equal to or greater than a length of shaft assembly (104), such that sensor leads (238a, 238b, 238c, 238d) and/or proximal camera leads (229a, 229b, 229c, 229d) may be positioned within or even proximally relative to body (112) of handle assembly (110). For example, navigation sensor assembly (210) may have a length on the order of multiple meters. In this manner, navigation sensor assembly (210) may both generate the position related signals and transmit the position related signals to the coupling unit without requiring electrical wires or cables to be routed therebetween; and may also both supply power to camera (161) and transmit image signals therefrom to the coupling unit without requiring electrical wires or cables to be routed therebetween.

As noted above, navigation sensor assembly (210) of the present example further includes a plurality of temperature sensors in the form of thermocouples (227a, 227b, 227c, 227d) positioned on top surface (244) of substrate (226). Referring again to FIG. 15, proximal thermocouples (227a, 227b) are each positioned relatively near to proximal top navigation sensor (250), and distal thermocouples (227c, 227d) are each positioned relatively near to distal top navigation sensor (252). Thus, proximal thermocouples (227a, 227b) may be operative to detect a temperature of substrate (226) and/or the surrounding environment at or near proximal top navigation sensor (250), and distal thermocouples (227c, 227d) may be operative to detect a temperature of substrate (226) and/or the surrounding environment at or near distal top navigation sensor (252). Each thermocouple (227a, 227b, 227c, 227d) is operable to generate signals indicative of the respective detected temperature and thereby indicative of the temperature of the respective navigation sensor (250, 252). The temperature data generated by such temperature related signals may be processed by processor (52) for improving the accuracy of the location coordinates calculated by processor (52) from the position related signals of navigation sensors (250, 252, 254, 256).

In this regard, it will be appreciated that a change (e.g., an increase) in the temperature of a navigation sensor (250, 252, 254, 256) may cause a corresponding change in the resistance of the respective concentric loop portion (230b, 232b, 234b, 236b), which may in turn cause a corresponding change in the induced current generated therein by an alternating electromagnetic field such that the accuracy of the location coordinates calculated by processor (52) from the resulting position related signals may be adversely affected. Such temperature changes may be directly correlated to their corresponding resistance changes, such that processor (52) may adjust the calculation of the location coordinates based on the temperature data to correct for any resistance changes caused by changes in temperature.

Figure 23:
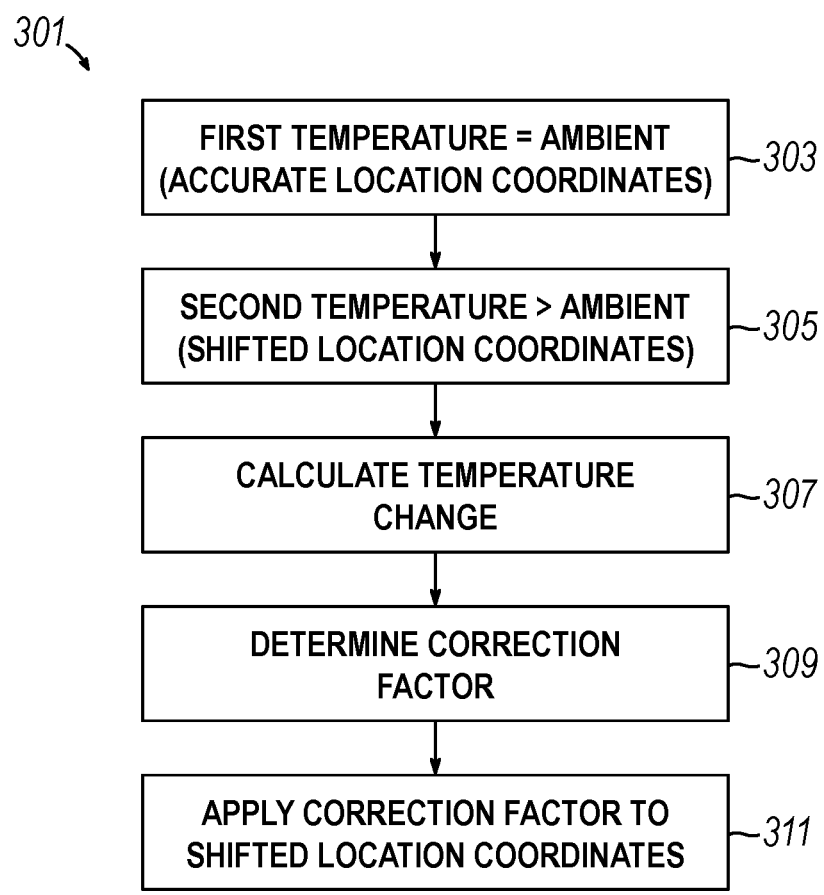
FIG. 23 depicts a flow diagram of an exemplary method for determining location coordinates of a portion of an ENT instrument from signals received from the flexible navigation sensor assembly of FIG. 14.
Figure 24:
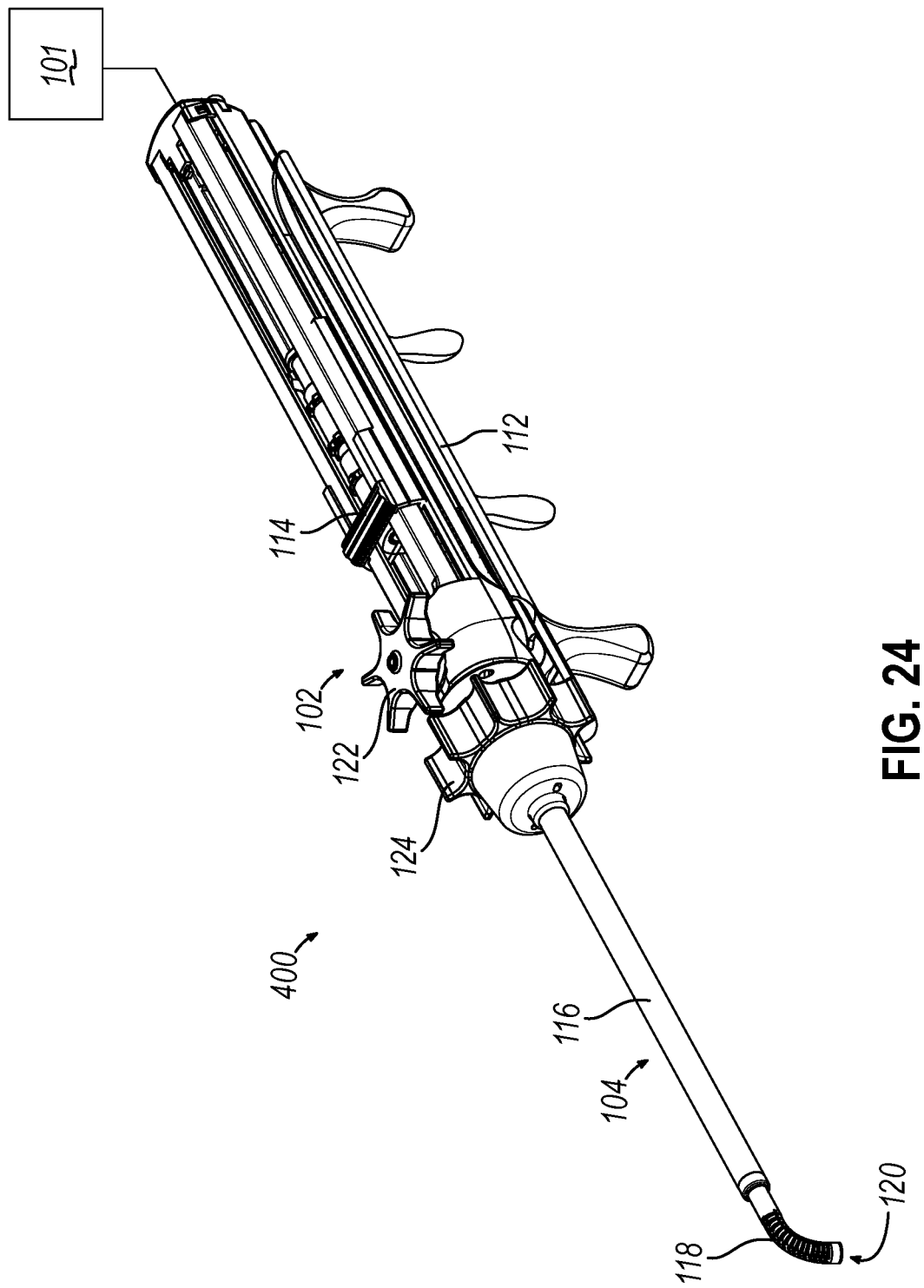
FIG. 24 depicts a perspective view of another exemplary instrument having a flexible navigation sensor assembly.

Referring now to FIG. 23, a method (301) for determining location coordinates based on the position related signals received by processor (52) from navigation sensors (250, 252, 254, 256) and further based on the temperature related signals received by processor (52) from thermocouples (227a, 227b, 227c, 227d) is provided. Method (301) begins with step (303), at which the temperature related signals indicate that a first temperature of navigation sensors (250, 252, 254, 256) is equal to the ambient temperature such that there are no temperature change-induced resistance changes in navigation sensors (250, 252, 254, 256) to be accounted for, and processor (52) calculates accurate location coordinates based on the position related signals received from navigation sensors (250, 252, 254, 256).

Method (301) proceeds from step (303) to step (305), at which the temperature related signals indicate that a second temperature of navigation sensors (250, 252, 254, 256) is greater than the ambient temperature such that temperature change-induced resistance changes in navigation sensors (250, 252, 254, 256) may need to be accounted for; and processor (52) calculates resistance change-shifted location coordinates based on the position related signals received from navigation sensors (250, 252, 254, 256). Such a temperature increase may be caused by operating powered instrumentation (e.g., an energy catheter, a surgical shaver, etc.) within working channel (149), for example. In any event, method (301) proceeds from step (305) to step (307), at which processor (52) calculates the temperature change from (e.g., the difference between) the first temperature to the second temperature.

Method (301) proceeds from step (307) to step (309), at which processor (52) determines a correction factor based on the temperature change via stored navigation shift model correlating temperature changes to respective correction factors for accounting for resistance changes induced by such temperature changes. Method (301) proceeds from step (309) to step (311), at which processor (52) applies the correction factor to the resistance change-shifted location coordinates to thereby determine the accurate location coordinates accounting for the resistance change induced by the temperature change between the first and second temperatures.

While temperature sensors in the form of thermocouples (227a, 227b, 227c, 227d) are shown, any other suitable types of temperature sensors may be used, such as thermistors. In some versions, thermocouples (227a, 227b, 227c, 227d) may be omitted, such as in cases where temperature changes are not typical (e.g., when operating non-powered instrumentation within working channel (149)). In other versions, changes in the temperatures of navigation sensors (250, 252, 254, 256) may be determined by detecting changes in the impedances of the respective concentric loop portions (230b, 232b, 234b, 236b). For example, it will be appreciated that copper has a relatively large coefficient of thermal expansion, such that impedance changes may be directly correlated to their corresponding temperature changes. Thus, processor (52) may adjust the calculation of the location coordinates based on the impedance data to correct for any resistance changes caused by changes in temperature in a manner similar to that described above.

C. Exemplary Instrument with Serpentine Flexible Navigation Sensor Assembly

FIGS. 24-26C show another example of an instrument (400) that may be used to dilate an anatomical passageway and/or to deliver RF energy to tissue. For instance, instrument (400) may be used for dilation of ostia of paranasal sinuses (e.g., to treat sinusitis), dilation of the larynx, dilation of the Eustachian tube, dilation of other passageways within the ear, nose, or throat, etc. In addition, or alternatively, instrument (400) may be used to ablate a nerve (e.g., a posterior nasal neve); ablate a turbinate; or ablate, electroporate (e.g., to promote absorption of therapeutic agents, etc.), or apply resistive heating to any other kind of anatomical structure in the head of a patient. Instrument (400) of this example includes handle assembly (102), shaft assembly (104), and a navigation sensor assembly (410) which may be similar to navigation sensor assembly (110) except as otherwise described.

Instrument (400) may be coupled with an inflation fluid source (not shown), which may be operable to selectively supply an inflation fluid to a balloon of a dilation catheter (not shown) of instrument (400) for inflating the balloon to thereby dilate the anatomical passageway. In addition, or alternatively, instrument (400) may be coupled with an RF generator (101), which may be operable to generate RF electrosurgical energy for delivery to tissue via electrodes (121, 122) at a distal end of shaft assembly (104) to thereby ablate, electroporate, or apply resistive heating to the tissue. The transition from FIG. 25A to FIG. 25B shows flexible portion (118) of shaft assembly (104) bending from a straight configuration (FIG. 25A) to a bent configuration (FIG. 25B) and thereby deflecting distal end (120) laterally away from the longitudinal axis of rigid portion (116).

Figure 25B:
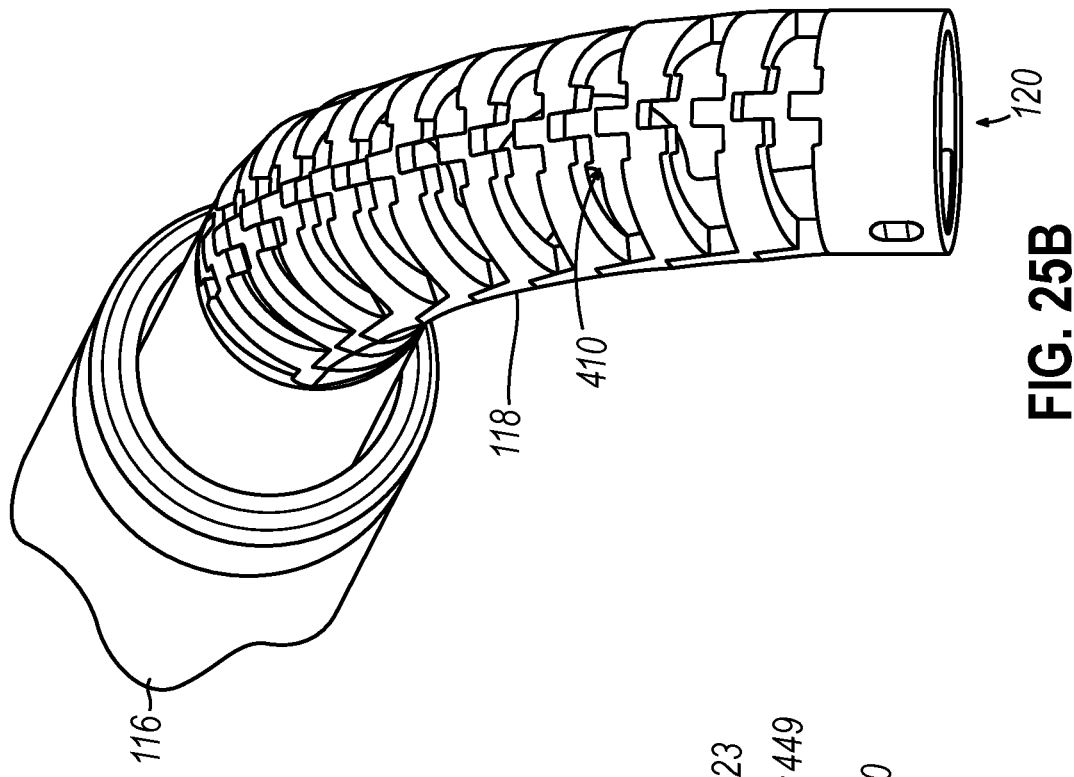
FIG. 25B depicts a perspective view of a distal portion of the instrument of FIG. 24, showing the flexible distal shaft portion of the instrument in a bent configuration and further showing the flexible navigation sensor assembly disposed along the inner cylindrical surface of the flexible distal portion in a second curved configuration.
Figure 25A:
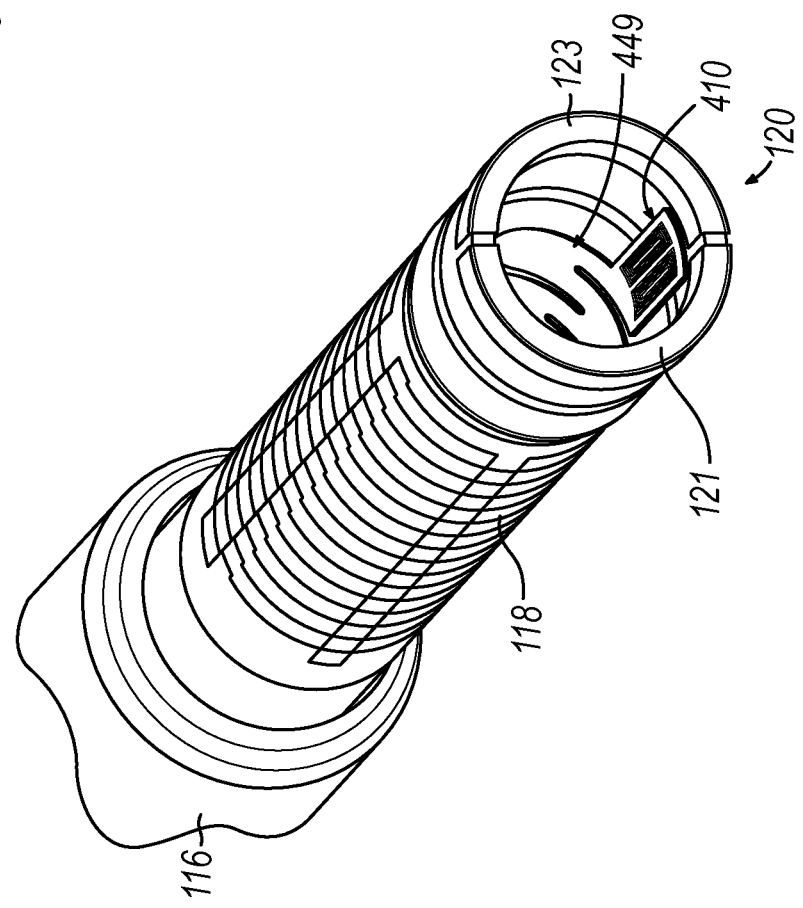
FIG. 25A depicts a perspective view of a distal portion of the instrument of FIG. 24, showing a flexible distal shaft portion of the instrument in a straight configuration, and further showing the flexible navigation sensor assembly disposed along an inner cylindrical surface of the flexible distal portion in a first curved configuration.

As best shown in FIGS. 25A and 25B, navigation sensor assembly (410) is disposed within shaft assembly (104) and is operable to provide navigation capabilities to shaft assembly (104). More particularly, navigation sensor assembly (410) is disposed along a generally cylindrical inner surface of flexible portion (118) of shaft assembly (104) in at least one generally curved configuration in which navigation sensor assembly (410) is curved about the longitudinal axis of flexible portion (118) of shaft assembly (104) with a radius of curvature corresponding to that of the cylindrical inner surface of flexible portion (118) to thereby conform to an inner circumference of flexible portion (118).

Figure 26A:
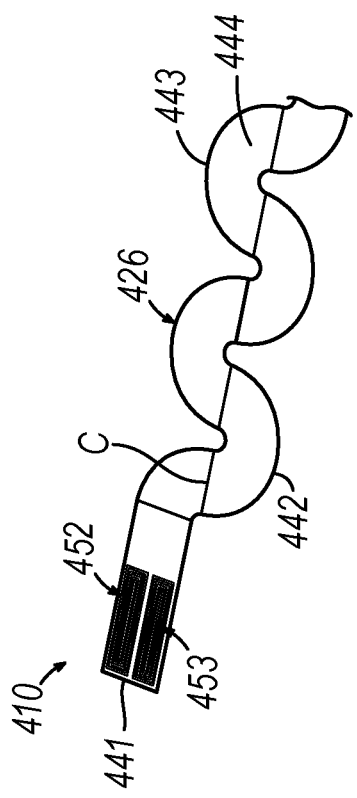
FIG. 26A depicts a perspective view of the flexible navigation sensor assembly of FIG. 25A in a flat configuration.
Figure 26C:
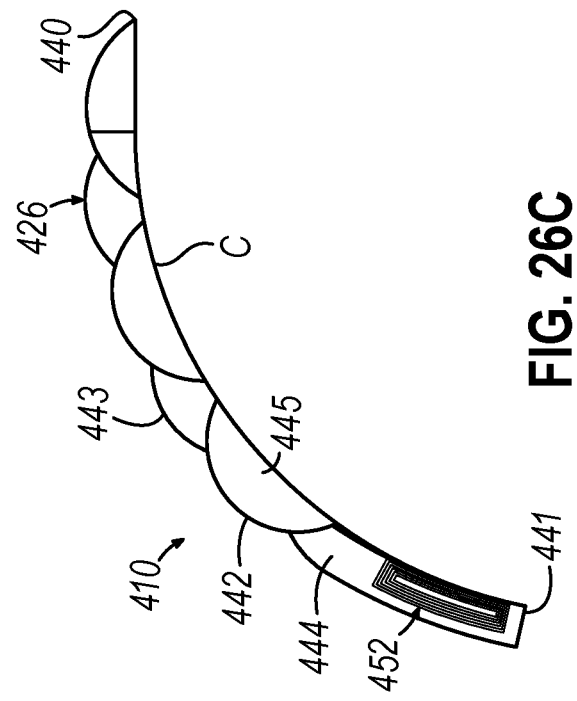
FIG. 26C depicts a side elevational view of the flexible navigation sensor assembly of FIG. 25A in a laterally curved, longitudinally bent configuration.
Figure 26B:
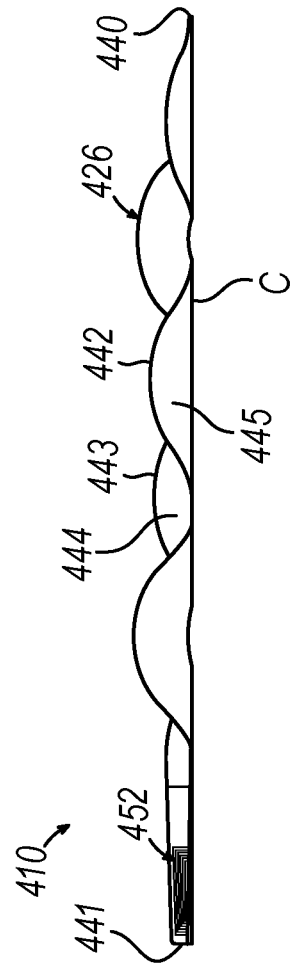
FIG. 26B depicts a side elevational view of the flexible navigation sensor assembly of FIG. 25A in a laterally curved, longitudinally straight configuration.

Referring now to FIGS. 26A-26C, navigation sensor assembly (410) of this example is provided in the form of a flexible printed circuit board (PCB) and includes a serpentine flex circuit substrate (426) with a pair of laterally-adjacent distal navigation sensors (452, 453) and corresponding leads (not shown) positioned thereon. As shown, substrate (426) extends longitudinally between proximal and distal ends (440, 441), laterally between first and second sides (442, 443), and vertically between top and bottom surfaces (444, 445).

Substrate (426) may be formed of an electrically-insulative, flexible plastic material such as polyimide or liquid crystal polymer (LCP). For example, substrate (426) may be formed of polyimide in cases where maintaining a relatively flat configuration of substrate (426) is desired since such a substrate (426) formed of polyimide may be resiliently biased toward a naturally flat configuration. Alternatively, substrate (426) may be formed of LCP in cases where a more complex geometrical configuration and/or increased flexibility of substrate (426) is desired since a substrate (426) formed of LCP may be thermoformed to accommodate such complex geometries and/or provide increased flexibility, such as for allowing navigation sensor assembly (410) to bend together with flexible portion (118) of shaft assembly (104) between the straight and bent configurations. In any event, distal navigation sensors (452, 453) may be defined by concentric loop portions of respective electrically-conductive traces (not shown) formed on top surface (444) of substrate (426) and may be operable to generate signals indicative of the position of the respective navigation sensor (452, 453) as described above. Navigation sensor assembly (410) is suitably sized to fit within shaft assembly (104) while still permitting space for a working channel (449) to extend along shaft assembly (104) (e.g., above navigation sensor assembly (410)), thereby permitting additional instrumentation (e.g., a dilation catheter and/or an energy catheter), suction, fluids, etc. to pass through open distal end (120) adjacent to navigation sensor assembly (410). In this regard, navigation sensor assembly (410) may have a relatively low profile, at least by comparison to traditional coil sensors. In some versions, navigation sensor assembly (410) may have a thickness of approximately 50 microns.

It will be appreciated that the serpentine configuration of substrate (426) may provide navigation sensor assembly (410) with reduced geometrical constraints and improved flexibility as compared to the generally rectangular configuration of substrate (126) of navigation sensor assembly (110). Thus, substrate (426) may be used in cases where a more complex geometrical configuration and/or increased flexibility of substrate (426) is desired, such as for malleable or directable devices like flexible portion (118) of shaft assembly (104).

As best seen in FIG. 26A, navigation sensor assembly (410) may initially have a generally flat configuration, such as when substrate (426) is initially formed and/or during the initial positioning of distal navigation sensors (452, 453) thereon. As shown, a longitudinal centerline (C) extends along substrate (426). As best seen in FIG. 26B, navigation sensor assembly (410) may assume a laterally curved, longitudinally straight configuration in which sides (442, 443) of substrate (426) are curved upwardly from longitudinal centerline (C) with navigation sensor assembly (410) extending in a longitudinal direction. Thus, navigation sensor assembly (410) may be curved about the longitudinal axis of flexible portion (118) of shaft assembly (104) with a radius of curvature corresponding to that of the cylindrical inner surface of flexible portion (118) when disposed within flexible portion (118) to thereby conform to the inner circumference of flexible portion (118). As best seen in FIG. 26C, navigation sensor assembly (410) may assume a laterally curved, longitudinally bent configuration in which sides (442, 443) of substrate (426) are curved upwardly from longitudinal centerline (C) with navigation sensor assembly (410) at least partially deflecting from the longitudinal direction. Navigation sensor assembly (410) may be in its laterally curved, longitudinally straight configuration when flexible portion (118) of shaft assembly (104) is in its straight configuration, and navigation sensor assembly (410) may be in its laterally curved, longitudinally bent configuration when flexible portion (118) of shaft assembly (104) is in its bent configuration. In this manner, navigation sensor assembly (410) may accommodate the bending of flexible portion (118) between its straight and bent configurations, such that navigation of flexible portion (118) may be performed irrespective of whether flexible portion (118) is in its straight or bent configurations.

In the example shown, distal navigation sensors (452, 453) are positioned at or near distal end (120) of shaft assembly (104) for facilitating navigation of distal end (120). However, it will be appreciated that navigation sensors (452, 453) may be positioned at any other suitable locations relative to components of instrument (400) for which navigation is desired. It will also be appreciated that one distal navigation sensor (452, 453) may be disposed on a first lateral side of flexible portion (118) of shaft assembly (104) and the other distal navigation sensor (452, 453) may be disposed on a second lateral side of flexible portion (118) of shaft assembly (104). In this manner, the distal navigation sensors (452, 453) may provide position related signals indicative of locations of both lateral sides of flexible portion (118), which may improve the accuracy of the location coordinates calculated by processor (52), such as when flexible portion (118) is in a bent configuration. In some versions, only a single distal navigation sensor (452, 453) may be provided. In other versions, one or more proximal top navigation sensors (not shown) may be provided. In still other versions, distal and/or proximal bottom navigation sensors (not shown) may be provided on bottom surface (445) of substrate (426) opposite corresponding top navigation sensors (452, 453), such as for reducing or eliminating electromagnetic noise as described above. Some variations may also provide a combination of one or more navigation sensors (452, 453) distal to flexible portion (118) and another one or more navigation sensors (452, 453) proximal to flexible portion (118).

While navigation sensor assembly (410) of the present example is disposed along a generally cylindrical inner surface of flexible portion (118) of shaft assembly (104), navigation sensor assembly (410) may alternatively be disposed along a generally cylindrical outer surface of flexible portion (118) of shaft assembly (104) in at least one generally curved configuration in which navigation sensor assembly (110) is curved about the longitudinal axis of flexible portion (118) of shaft assembly (104) with a radius of curvature corresponding to that of the cylindrical outer surface of flexible portion (118) to thereby conform to an outer circumference of flexible portion (118). In any event, navigation sensor assembly (410) may permit space for working channel (449) to extend along shaft assembly (104) as described above, such that navigation sensor assembly (410) may continuously communicate position related signals to processor (52) during advancement of a catheter (e.g., a dilation catheter or an energy catheter) distally through working channel (449) and/or while such a catheter remains positioned within working channel (449), such as during inflation of a balloon of a dilation catheter to dilate an anatomical passageway and/or during delivery of RF energy to tissue via electrodes of an energy catheter. In other words, navigation of flexible portion (118) may be performed concurrently with dilation of an anatomical passageway and/or concurrently with delivery of RF energy to tissue, without interfering with each other.

Figure 27C:
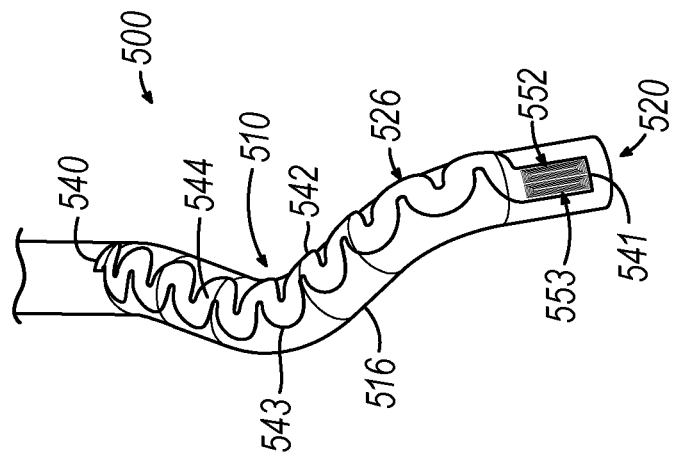
FIG. 27C depicts a perspective view of the distal portion of the suction instrument of FIG. 27A, showing the malleable shaft of the suction instrument in a dual bent configuration, and further showing the flexible navigation sensor assembly disposed along the outer cylindrical surface of the malleable shaft in a third curved configuration.
Figure 27B:
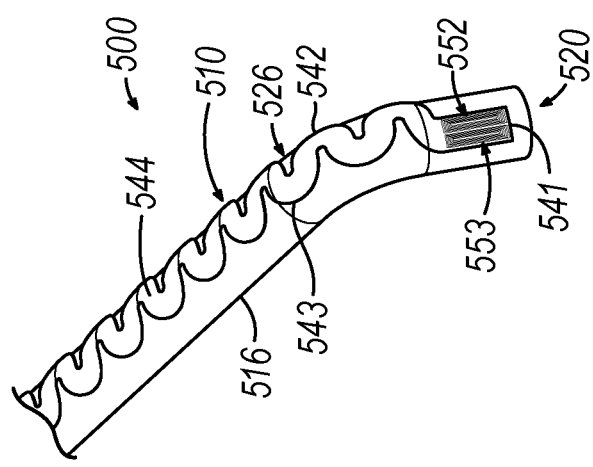
FIG. 27B depicts a perspective view of the distal portion of the suction instrument of FIG. 27A, showing the malleable shaft of the suction instrument in a bent configuration, and further showing the flexible navigation sensor assembly disposed along the outer cylindrical surface of the malleable shaft in a second curved configuration.
Figure 27A:
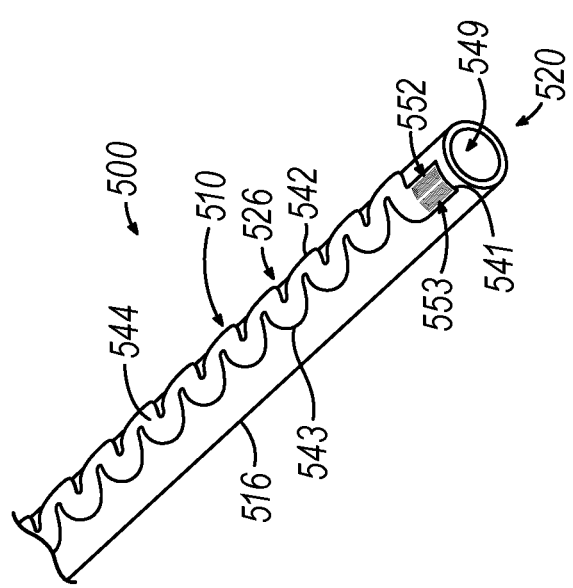
FIG. 27A depicts a perspective view of a distal portion of an exemplary suction instrument having a flexible navigation sensor assembly, showing a malleable shaft of the suction instrument in a straight configuration, and further showing the flexible navigation sensor assembly disposed along an outer cylindrical surface of the malleable shaft in a first curved configuration.
Figure 28:
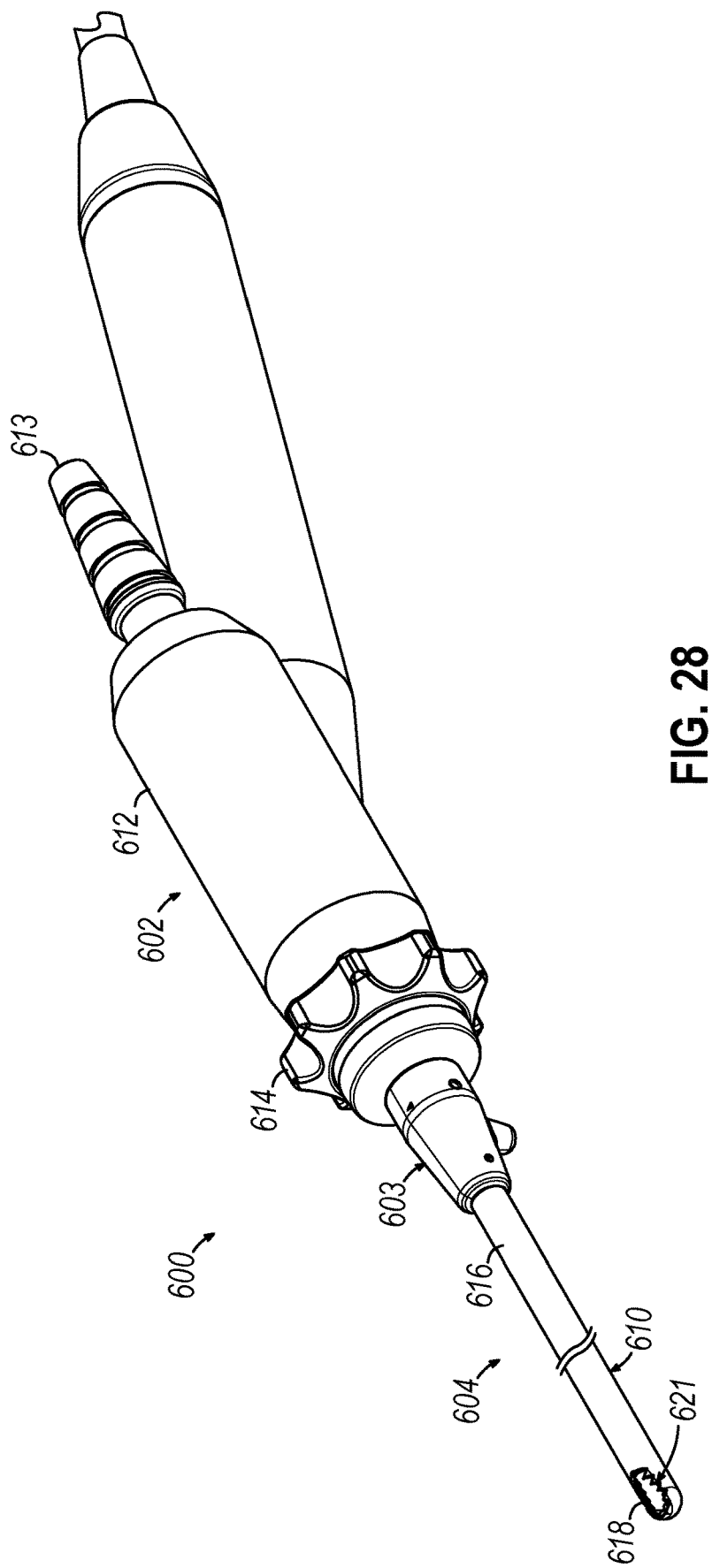
FIG. 28 depicts a perspective view of an exemplary tissue shaving instrument having a flexible navigation sensor assembly.

D. Exemplary Suction Instrument with Serpentine Flexible Navigation Sensor Assembly FIGS. 27A-27C show an example of an instrument (500) that may be used to provide suction during surgical procedures for facilitating removal of extraneous and/or undesired matter (e.g., fluids and/or debris) near or within an anatomical passageway. For instance, instrument (500) may be used to clear fluids and/or debris from paranasal sinuses, the larynx, the Eustachian tube, other passageways within the ear, nose, or throat, etc. during FESS procedures, sinuplasty procedures, and/or in various other ENT procedures. Instrument (500) of this example includes an elongate malleable shaft (516) extending distally from a handle (not shown) to an open distal suction tip (520), and a navigation sensor assembly (510) which may be similar to navigation sensor assembly (410) except as otherwise described. Instrument (500) may be coupled with a suction source (not shown), which may be operable to selectively provide enough suction at a surgical site to pull excess fluid and/or debris proximally through instrument (500). The transition from FIG. 27A to FIG. 27C shows malleable shaft (516) bending from a straight configuration (FIG. 27A) to bent and dual bent configurations (FIGS. 27B and 27C, respectively) and thereby deflecting distal suction tip (520) laterally away from a proximal longitudinal axis of malleable shaft (516).

As shown, navigation sensor assembly (510) is disposed on an exterior of malleable shaft (516) and is operable to provide navigation capabilities to malleable shaft (516). More particularly, navigation sensor assembly (510) is disposed along a generally cylindrical outer surface of malleable shaft (516) in at least one generally curved configuration in which navigation sensor assembly (510) is curved about the longitudinal axis of malleable shaft (516) with a radius of curvature corresponding to that of the cylindrical outer surface of malleable shaft (516)) to thereby conform to an outer circumference of malleable shaft (516).

Navigation sensor assembly (510) of this example is provided in the form of a flexible printed circuit board (PCB) and includes a serpentine flex circuit substrate (526) with a pair of laterally-adjacent distal navigation sensors (552, 553) and corresponding leads (not shown) positioned thereon. As shown, substrate (526) extends longitudinally between proximal and distal ends (540, 541), laterally between first and second sides (542, 543), and vertically between a top surface (544) and a bottom surface (not shown).

Substrate (526) may be formed of an electrically-insulative, flexible plastic material such as polyimide or liquid crystal polymer (LCP). For example, substrate (526) may be formed of polyimide in cases where maintaining a relatively flat configuration of substrate (526) is desired since such a substrate (526) formed of polyimide may be resiliently biased toward a naturally flat configuration. Alternatively, substrate (526) may be formed of LCP in cases where a more complex geometrical configuration and/or increased flexibility of substrate (526) is desired since a substrate (526) formed of LCP may be thermoformed to accommodate such complex geometries and/or provide increased flexibility, such as for allowing navigation sensor assembly (510) to bend together with malleable shaft (516)) between the straight, bent, and dual bent configurations. In any event, distal navigation sensors (552, 553) may be defined by concentric loop portions of respective electrically-conductive traces (not shown) formed on top surface (544) of substrate (526) and may be operable to generate signals indicative of the position of the respective navigation sensor (552, 553) as described above. Navigation sensor assembly (510) is suitably sized to fit on an exterior of malleable shaft (516) without obstructing a working channel (549) extending along malleable shaft (516), thereby permitting additional instrumentation, suction, fluids, etc. to pass through open distal suction tip (520), while also remaining generally flush with the exterior of malleable shaft (516) to minimize the risk of snagging tissue. In this regard, navigation sensor assembly (510) may have a relatively low profile, at least by comparison to traditional coil sensors. In some versions, navigation sensor assembly (510) may have a thickness of approximately 50 microns.

In some versions, navigation sensor assembly (510) may initially have a generally flat configuration (not shown) similar to that of navigation sensor assembly (410), such as when substrate (526) is initially formed and/or during the initial positioning of distal navigation sensors (552, 553) thereon. As best seen in FIG. 27A, navigation sensor assembly (510) may assume a laterally curved, longitudinally straight configuration in which sides (542, 543) of substrate (526) are curved downwardly from a longitudinal centerline (not shown) of substrate (526) with navigation sensor assembly (510) extending in a longitudinal direction. Thus, navigation sensor assembly (510) may be curved about the longitudinal axis of malleable shaft (516) with a radius of curvature corresponding to that of the cylindrical outer surface of malleable shaft (516) when disposed on an exterior of malleable shaft (516) to thereby conform to the outer circumference of malleable shaft (516).

As best seen in FIG. 27B, navigation sensor assembly (510) may assume a laterally curved, longitudinally bent configuration in which sides (542, 543) of substrate (526) are curved downwardly from the longitudinal centerline of substrate (526) with navigation sensor assembly (510) at least partially deflecting from the longitudinal direction at a first location along its length.

As best seen in FIG. 27C, navigation sensor assembly (510) may assume a laterally curved, longitudinally dual bent configuration in which sides (542, 543) of substrate (526) are curved downwardly from the longitudinal centerline of substrate (526) with navigation sensor assembly (510) at least partially deflecting from the longitudinal direction at first and second locations along its length. Navigation sensor assembly (510) may be in its laterally curved, longitudinally straight configuration when malleable shaft (516) is in its straight configuration, navigation sensor assembly (510) may be in its laterally curved, longitudinally bent configuration when malleable shaft (516) is in its bent configuration, and navigation sensor assembly (510) may be in its laterally curved, longitudinally dual bent configuration when malleable shaft (516) is in its dual bent configuration. In this manner, navigation sensor assembly (510) may accommodate the bending of malleable shaft (516) between its straight, bent, and dual bent configurations, such that navigation of malleable shaft (516) may be performed irrespective of whether malleable shaft (516) is in its straight, bent, or dual bent configurations.

In the example shown, distal navigation sensors (552, 553) are positioned at or near distal suction tip (520) of malleable shaft (516) for facilitating navigation of distal suction tip (520). However, it will be appreciated that navigation sensors (552, 553) may be positioned at any other suitable locations relative to components of instrument (500) for which navigation is desired. It will also appreciated that one distal navigation sensor (552, 553) may be disposed on a first lateral side of malleable shaft (516) and the other distal navigation sensor (552, 553) may be disposed on a second lateral side of malleable shaft (516). In this manner, the distal navigation sensors (552, 553) may provide position related signals indicative of locations of both lateral sides of malleable shaft (516), which may improve the accuracy of the location coordinates calculated by processor (52), such as when malleable shaft (516) is in a bent and/or dual bent configuration. In some versions, only a single distal navigation sensor (552, 553) may be provided. In other versions, one or more proximal top navigation sensors (not shown) may be provided. In still other versions, distal and/or proximal bottom navigation sensors (not shown) may be provided on bottom surface (545) of substrate (526) opposite corresponding top navigation sensors (552, 553), such as for reducing or eliminating electromagnetic noise as described above. Some versions may also provide several navigation sensors (552, 553) located at various longitudinal positions along the length of malleable shaft (516). Such positioning may enable IGS navigation system (50) to determine the position and orientation of the entire length of malleable shaft (516) within the patient (P), regardless of whatever ad hoc bent configuration the operator has applied to malleable shaft (516).

While navigation sensor assembly (510) of the present example is disposed along a generally cylindrical outer surface of malleable shaft (516), navigation sensor assembly (510) may alternatively be disposed along a generally cylindrical inner surface of malleable shaft (516) in at least one generally curved configuration in which navigation sensor assembly (510) is curved about the longitudinal axis of malleable shaft (516) with a radius of curvature corresponding to that of the cylindrical inner surface of malleable shaft (516) to thereby conform to an inner circumference of malleable shaft (516). In any event, navigation sensor assembly (510) may permit space for working channel (549) to extend along malleable shaft (516) as described above, such that navigation sensor assembly (510) may continuously communicate position related signals to processor (52) during suction of fluids and/or debris proximally through working channel (549) to clear such fluids and/or debris from near or within an anatomical passageway. In other words, removal of fluids and/or debris from the anatomical passageway and navigation of malleable shaft (516) may be performed concurrently without interfering with each other.

While navigation sensor assembly (510) is shown incorporated into instrument (500) for providing suction, it will be appreciated that navigation sensor assembly (510) may be incorporated into any other suitable surgical instrument, such as an instrument for performing other functions during ENT procedures including, for example, a probing instrument or a curette instrument having a malleable shaft.

E. Exemplary Shaving Instrument with Straight Flexible Navigation Sensor Assembly FIGS. 28-37 show an example of an instrument (600) that may be used to sever and remove tissue, such as bone tissue, from an anatomical passageway. For instance, instrument (600) may be used to sever and remove bone tissue and adjacent mucosal tissue from the nasal cavity, as well as from any other suitable location. Instrument (600) of this example includes a handle assembly (602), a hub (603), a shaft assembly (604), and a navigation sensor assembly (610) which may be similar to navigation sensor assembly (110) except as otherwise described. Instrument (600) may be coupled with a suction source (not shown), which may be operable to selectively provide enough suction at a surgical site to pull severed tissue proximally through instrument (600).

Handle assembly (602) of this example includes a body (612) that is sized and configured to be grasped and operated by a single hand of an operator, such as via a power grip, a pencil grip, or any other suitable kind of grip. Handle assembly (602) may include controls for the operation of instrument (600), or the controls may be located remotely. Instrument (600) further includes a suction port (613) which may be operatively connected to the suction source and configured to enable aspiration of tissue, such as a bone tissue, from a surgical site. Rotational motion may be delivered by a motorized drive assembly (not shown) within handle assembly (602) to shaft assembly (604), although any suitable rotational or oscillatory motion source may be utilized. For example, such motion source may be housed within handle assembly (602) or may be external and connectable to handle assembly (602). A power source (not shown) may connect to the motorized drive assembly to power instrument (600) for use. In addition, or alternatively, handle assembly (602) may house a battery (not shown).

Shaft assembly (604) generally includes a longitudinally straight, rigid outer shaft (616) and an inner cutting member (618) collectively configured to receive and remove tissue from the surgical site. Cutting member (618), which may include a tube, is disposed within a longitudinally extending lumen of outer shaft (616) and is configured to be rotated about a longitudinal axis of shaft assembly (604) at a distal portion. Cutting member (618) defines a lumen and extends proximally to handle assembly (612) and connects to the motorized drive assembly, which rotatably drives cutting member (618) relative to outer shaft (616). Outer shaft (616) includes a lateral shaft window opening (621) configured to cooperate with a cutting window opening (not shown) of inner cutting member (618). Such a configuration may be configured and operable in accordance with any of the teachings of U.S. Pub. No. 2019/0388117, entitled "Surgical Shaver with Feature to Detect Window State," published Dec. 26, 2019, the disclosure of which is incorporated by reference herein, in its entirety.

Shaft assembly (604) is also rotatable relative to handle assembly (610), about the longitudinal axis of shaft assembly (604). Such rotation may be driven via rotation control knob (614), which is rotatably coupled with body (612) of handle assembly (610). Alternatively, shaft assembly (604) may be rotated via some other form of user input; or may be non-rotatable relative to handle assembly (610). It should also be understood that the example of handle assembly (610) described herein is merely an illustrative example. Shaft assembly (604) may instead be coupled with any other suitable kind of handle assembly or other supporting body.

Figure 29:
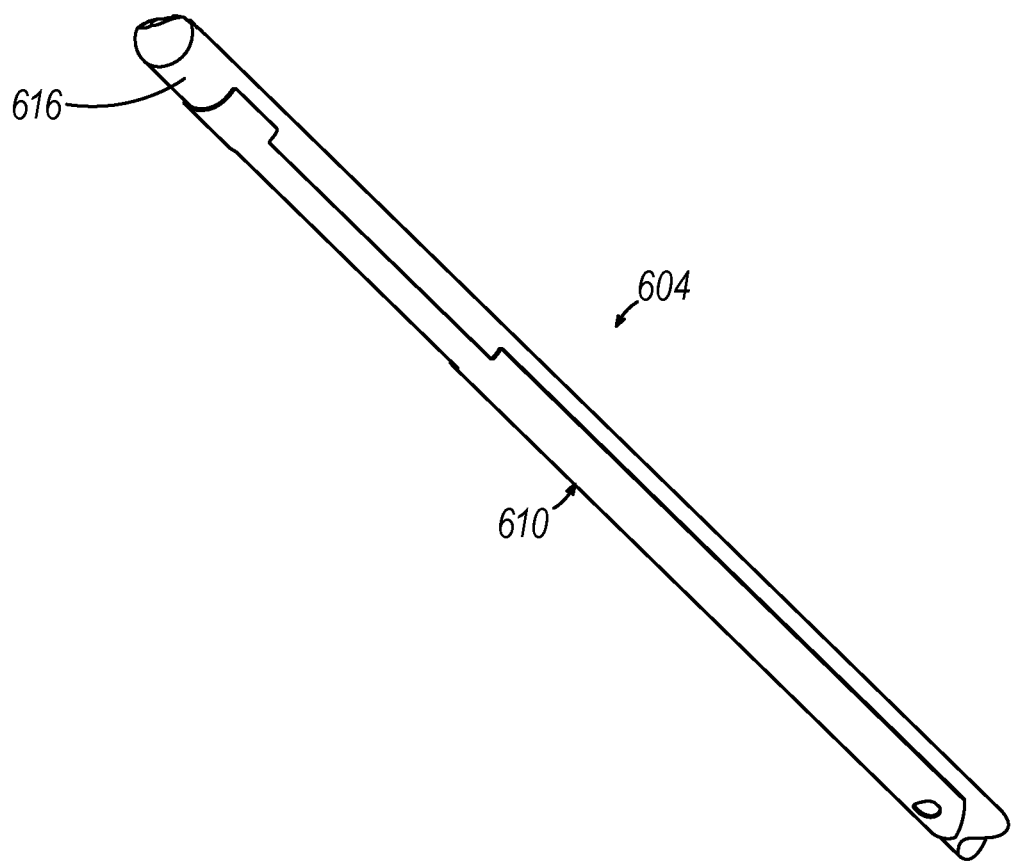
FIG. 29 depicts a perspective view of an outer tube of the tissue shaving instrument of FIG. 28, showing the flexible navigation sensor assembly disposed along an outer cylindrical surface of the outer tube in a first curved configuration.
Figure 34:
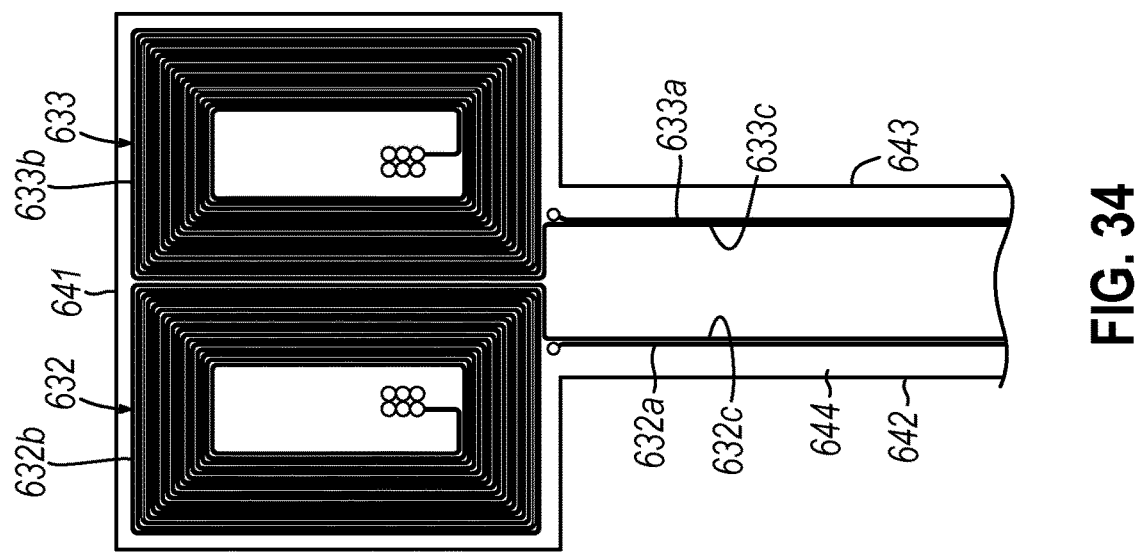
FIG. 34 depicts a top plan view of a distal portion of the flexible navigation sensor assembly of FIG. 29 in the flat configuration.
Figure 33:
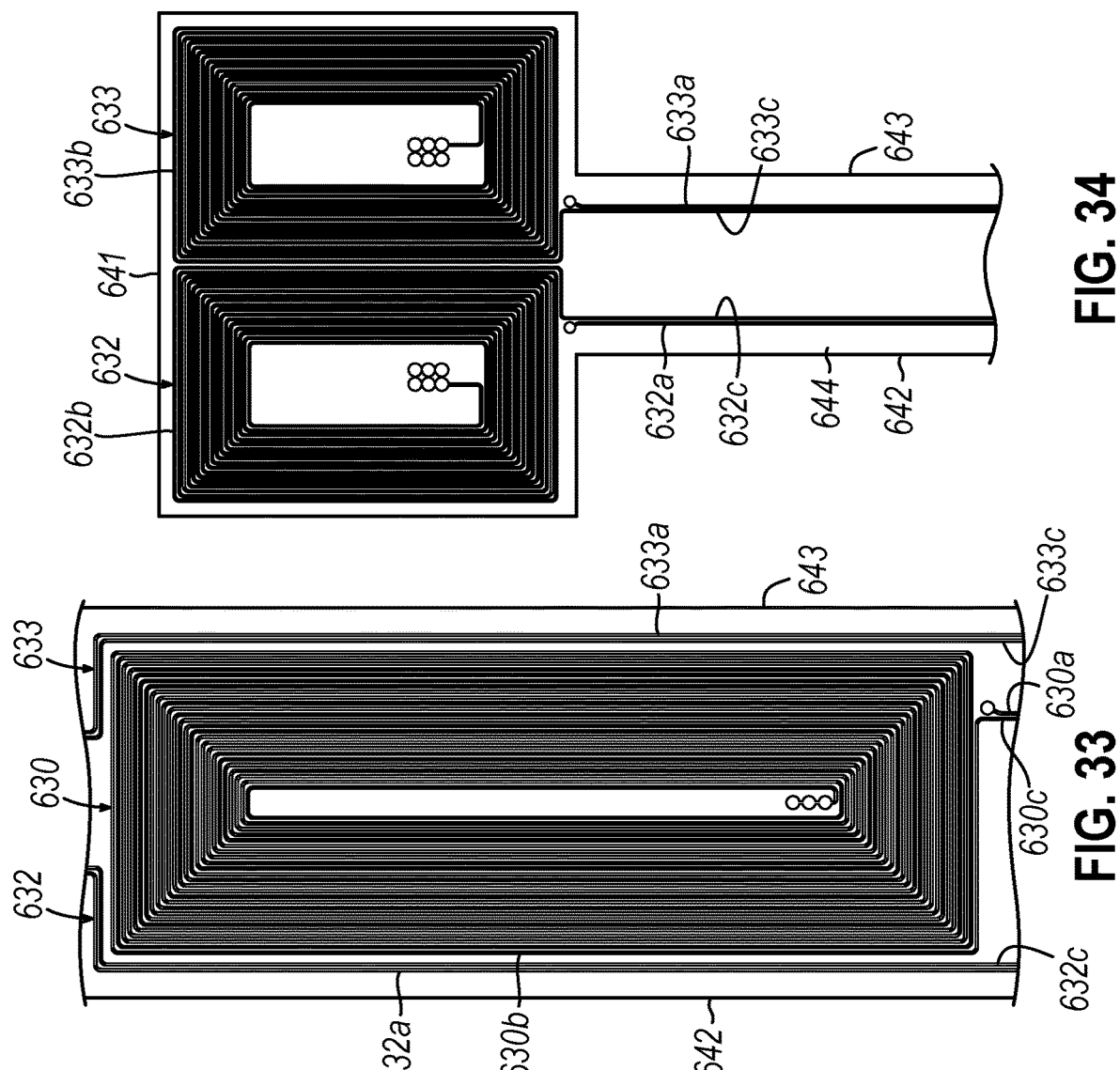
FIG. 33 depicts a top plan view of an intermediate portion of the flexible navigation sensor assembly of FIG. 29 in the flat configuration.
Figure 32:
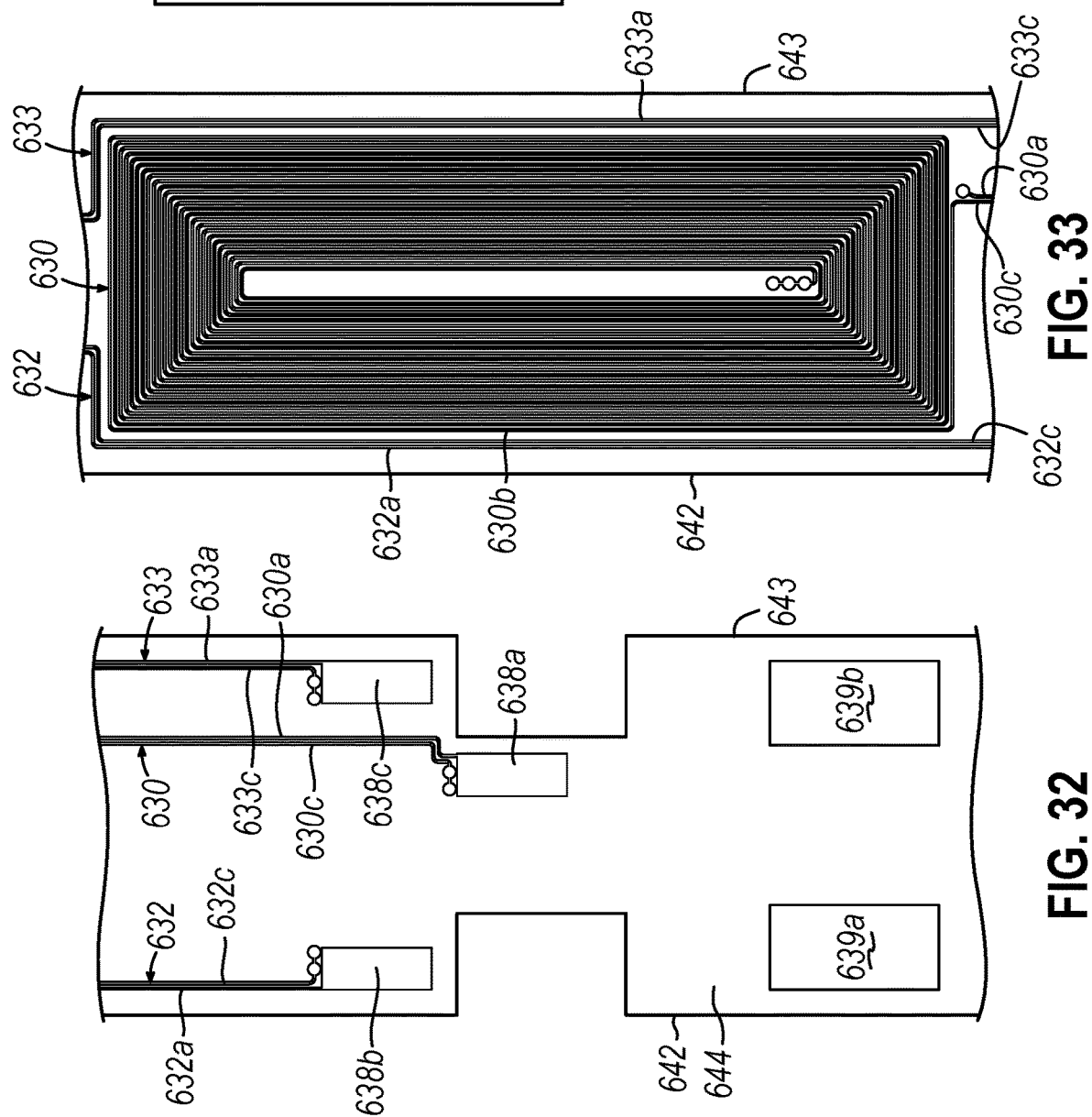
FIG. 32 depicts a top plan view of a proximal portion of the flexible navigation sensor assembly of FIG. 29 in the flat configuration.

As best shown in FIG. 29, navigation sensor assembly (610) is disposed on an exterior of outer shaft (616) and is operable to provide navigation capabilities to outer shaft (616). More particularly, navigation sensor assembly (610) is disposed along a generally cylindrical outer surface of outer shaft (616) in a generally curved configuration in which navigation sensor assembly (610) is curved about the longitudinal axis of outer shaft (616) with a radius of curvature corresponding to that of the cylindrical outer surface of outer shaft (616) to thereby conform to an outer circumference of outer shaft (616). In some versions, instrument (600) may include a sheath (not shown) positioned coaxially about at least a portion of outer shaft (616) radially outwardly of navigation sensor assembly (610), such that navigation sensor assembly (610) may be sandwiched between the sheath and outer shaft (616).

Referring now to FIGS. 30-37, navigation sensor assembly (610) of this example is provided in the form of a flexible printed circuit board (PCB) and includes an elongate, generally rectangular flex circuit substrate (626) with a plurality of traces (630, 632, 633, 634, 636, 637), a plurality of corresponding trace leads (638a, 638b, 638c, 638d, 638e, 638f), and a plurality of ground leads (639a, 639b) formed (e.g., printed and/or embedded) thereon. As shown, substrate (626) extends longitudinally between proximal and distal ends (640, 641), laterally between first and second sides (642, 643), and vertically between top and bottom surfaces (644, 645). Substrate (626) of the present example includes a plurality of through bores (646) extending between top and bottom surfaces (644, 645). Through bores (646) may be configured to receive respective pins (not shown) or other suitable fasteners for securing navigation sensor assembly (610) to flexible outer shaft (616) and/or to any other component of instrument (600). In the version shown, substrate (626) also includes a proximal bevel (648) extending between proximal end (640) and first side (642). Proximal bevel (648) may be configured to assist in locating proximal end (640) at a desired position relative to outer shaft (616) and/or relative to any other component of instrument (600).

Substrate (626) may be formed of an electrically-insulative, flexible plastic material such as polyimide or liquid crystal polymer (LCP). For example, substrate (626) may be formed of polyimide in cases where maintaining a relatively flat configuration of substrate (626) is desired since such a substrate (626) formed of polyimide may be resiliently biased toward a naturally flat configuration. Alternatively, substrate (626) may be formed of LCP in cases where a more complex geometrical configuration and/or increased flexibility of substrate (626) is desired since a substrate (626) formed of LCP may be thermoformed to accommodate such complex geometries and/or provide increased flexibility. In any event, traces (630, 632, 633, 634, 636, 637) and leads (638a, 638b, 638c, 638d, 638e, 638f) may each be formed of an electrically-conductive, metallic material such as copper. Navigation sensor assembly (610) is suitably sized to fit on an exterior of outer shaft (616) without obstructing the lumen of outer shaft (616), thereby permitting inner cutting member (618) to be rotatable disposed therein, while also remaining generally flush with the exterior of outer shaft (616) to minimize the risk of snagging tissue. In this regard, navigation sensor assembly (610) may have a relatively low profile, at least by comparison to traditional coil sensors. In some versions, navigation sensor assembly (610) may have a thickness of approximately 50 microns.

As shown in FIGS. 30 and 31, traces (630, 632, 633, 634, 636, 637) include a proximal top trace (630), a first distal top trace (632), and a second distal top trace (633) each formed on top surface (644) of substrate (626), and a proximal bottom trace (634), a first distal bottom trace (636), and a second distal bottom trace (637) each formed on bottom surface (645) of substrate (626) opposite and/or parallel to a corresponding top trace (630, 632, 633). Similarly, leads (638a, 638b, 638c, 638d, 638e, 638f) include a proximal top lead (638a) and first and second distal top leads (638b, 638c) each formed on top surface (644) of substrate (626), and a proximal bottom lead (638d) and first and second distal bottom leads (638e, 638f) each formed on bottom surface (645) of substrate (626) opposite and/or parallel to a corresponding top lead (638a, 638b, 638c). Ground leads (639a, 639b) include first and second ground leads (639a, 639b) each formed on top surface (644) of substrate (626). Top traces (630, 632, 633), top leads (638a, 638b, 638c), and ground leads (639a, 639b) collectively define a top flex circuit layer of navigation sensor assembly (610), while bottom traces (634, 636, 637) and bottom leads (638d, 638e, 638f) collectively define a bottom flex circuit layer of navigation sensor assembly (610).

Referring now to FIGS. 32-37, traces (630, 632, 633, 634, 636, 637) each include a respective first longitudinal portion (630a, 632a, 633a, 634a, 636a, 637a), concentric loop portion (630b, 632b, 633b, 634b, 636b, 637b), and second longitudinal portion (630c, 632c, 633c, 634c, 636c, 637c). As shown, concentric loop portions (632b, 633b, 636b, 637b) of distal traces (632, 633, 636, 637) are positioned distally relative to concentric loop portions (630b, 634b) of the respective proximal traces (630, 634).

Proximal top lead (638a) is electrically coupled to a proximal end of first longitudinal portion (630a) of proximal top trace (630). First longitudinal portion (630a) of proximal top trace (630) extends distally from its proximal end and is electrically coupled at its distal end to a distal end of first longitudinal portion (634a) of proximal bottom trace (634). First longitudinal portion (634a) of proximal bottom trace (634) extends proximally from its distal end toward proximal bottom lead (638d) and is electrically coupled at its proximal end to a proximal end of second longitudinal portion (634c) of proximal bottom trace (634). Second longitudinal portion (634c) of proximal bottom trace (634) extends distally from its proximal end and is electrically coupled at its distal end to a radially outer end of concentric loop portion (634b) of proximal bottom trace (634). Concentric loop portion (634b) of proximal bottom trace (634) spirals radially inwardly from its radially outer end and is electrically coupled at its radially inner end to a radially inner end of concentric loop portion (630b) of proximal top trace (630). Concentric loop portion (630b) of proximal top trace (630) spirals radially outwardly from its radially inner end and is electrically coupled at its radially outer end to a distal end of second longitudinal portion (630c) of proximal top trace (630). Second longitudinal portion (630c) of proximal top trace (630) extends proximally from its distal end toward proximal top lead (638a) and is electrically coupled at its proximal end to proximal bottom lead (638d).

First distal top lead (638b) is electrically coupled to a proximal end of first longitudinal portion (632a) of first distal top trace (632). First longitudinal portion (632a) of first distal top trace (632) extends distally from its proximal end and is electrically coupled at its distal end to a distal end of first longitudinal portion (636a) of first distal bottom trace (636). First longitudinal portion (636a) of first distal bottom trace (636) extends proximally from its distal end toward first distal bottom lead (638e) and is electrically coupled at its proximal end to a proximal end of second longitudinal portion (636c) of first distal bottom trace (636). Second longitudinal portion (636c) of first distal bottom trace (636) extends distally from its proximal end and is electrically coupled at its distal end to a radially outer end of concentric loop portion (636b) of first distal bottom trace (636). Concentric loop portion (636b) of first distal bottom trace (636) spirals radially inwardly from its radially outer end and is electrically coupled at its radially inner end to a radially inner end of concentric loop portion (632b) of first distal top trace (632). Concentric loop portion (632b) of first distal top trace (632) spirals radially outwardly from its radially inner end and is electrically coupled at its radially outer end to a distal end of second longitudinal portion (632c) of first distal top trace (632). Second longitudinal portion (632c) of first distal top trace (632) extends proximally from its distal end toward first distal top lead (638b) and is electrically coupled at its proximal end to first distal bottom lead (638e).

Second distal top lead (638c) is electrically coupled to a proximal end of first longitudinal portion (633a) of second distal top trace (633). First longitudinal portion (633a) of second distal top trace (633) extends distally from its proximal end and is electrically coupled at its distal end to a distal end of first longitudinal portion (637a) of second distal bottom trace (637). First longitudinal portion (637a) of second distal bottom trace (637) extends proximally from its distal end toward second distal bottom lead (638f) and is electrically coupled at its proximal end to a proximal end of second longitudinal portion (637c) of second distal bottom trace (637). Second longitudinal portion (637c) of second distal bottom trace (637) extends distally from its proximal end and is electrically coupled at its distal end to a radially outer end of concentric loop portion (637b) of second distal bottom trace (637). Concentric loop portion (637b) of second distal bottom trace (637) spirals radially inwardly from its radially outer end and is electrically coupled at its radially inner end to a radially inner end of concentric loop portion (633b) of second distal top trace (633). Concentric loop portion (633b) of second distal top trace (633) spirals radially outwardly from its radially inner end and is electrically coupled at its radially outer end to a distal end of second longitudinal portion (633c) of second distal top trace (633). Second longitudinal portion (633c) of second distal top trace (633) extends proximally from its distal end toward second distal top lead (638c) and is electrically coupled at its proximal end to second distal bottom lead (638f).

In a manner similar to that described above, each concentric loop portion (630b, 632b, 633b, 634b, 636b, 637b) defines a respective navigation sensor (650, 652, 653, 654, 656, 657) that is operable to generate signals indicative of the position of the respective navigation sensor (650, 652, 653, 654, 656, 657) and thereby indicative of the position of at least a portion (e.g., outer shaft (616)) of instrument (500) in three-dimensional space. The position data generated by such position related signals may be processed by processor (52) for providing a visual indication to the operator to show the operator where outer shaft (616) of instrument (600) is located within the patient (P) in real time. Such a visual indication may be provided as an overlay on one or more preoperatively obtained images (e.g., CT scans) of the patient's anatomy.

In the example shown, distal navigation sensors (652, 653, 656, 657) are positioned at or near lateral shaft window opening (621) of outer shaft (616) for facilitating navigation of lateral shaft window opening (621), while proximal navigation sensors (650, 654) may be positioned at any suitable location along outer shaft (616) for assisting in identifying the direction and/or orientation of outer shaft (616)), for example. However, it will be appreciated that navigation sensors (650, 652, 653, 654, 656, 657) may be positioned at any other suitable locations relative to components of instrument (600) for which navigation is desired. Also in the example shown, navigation sensor assembly (610) includes a pair of laterally-adjacent distal top navigation sensors (652, 653) and a pair of laterally-adjacent distal bottom navigation sensors (656, 657). Such pairs of distal top navigation sensors (652, 653) and distal bottom navigation sensors (656, 657) may assist in improving the accuracy of location coordinates of outer shaft (616)) calculated by processor (52) from the position related signals of navigation sensors (650, 652, 653, 654, 656, 657). In this regard, navigation sensor assembly (610) of the present version is disposed along a generally cylindrical outer surface of outer shaft (616), such that one distal top navigation sensor (652, 653) and one distal bottom navigation sensor (656, 657) may be disposed on a first lateral side of outer shaft (616) and the other distal top navigation sensor (652, 653) and other distal bottom navigation sensor (656, 657) may be disposed on a second lateral side of outer shaft (616). In this manner, the pairs of distal top and bottom navigation sensors (652, 653, 656, 657) may provide position related signals indicative of locations of both lateral sides of outer shaft (616), which may improve the accuracy of the location coordinates calculated by processor (52).

In some versions, a length of navigation sensor assembly (610) defined between proximal and distal ends (640, 641) of substrate (626) may be sufficiently great to position distal navigation sensors (652, 653, 656, 657) at or near lateral shaft window opening (621) of outer shaft (616) for facilitating navigation of lateral shaft window opening (621) while also positioning leads (638a, 638b, 638c, 638d, 638e, 638f) at a sufficiently proximal location whereat leads (638a, 638b, 638c, 638d, 638e, 638f) may be directly electrically coupled to the coupling unit (e.g., without intervening electrical wires or cables). In this regard, navigation sensor assembly (610) may have a length substantially equal to or greater than a length of shaft assembly (604), such that leads (638a, 638b, 638c, 638d, 638e, 638f) may be positioned within or even proximally relative to body (612) of handle assembly (610). For example, navigation sensor assembly (610) may have a length on the order of multiple meters. In this manner, navigation sensor assembly (610) may both generate the position related signals and transmit the position related signals to the coupling unit without requiring electrical wires or cables to be routed therebetween.

While navigation sensor assembly (610) of the present example is disposed along a generally cylindrical outer surface of outer shaft (616), navigation sensor assembly (610) may alternatively be disposed along a generally cylindrical inner surface of outer shaft (616) in a generally curved configuration in which navigation sensor assembly (610) is curved about the longitudinal axis of outer shaft (616) with a radius of curvature corresponding to that of the cylindrical inner surface of outer shaft (616) to thereby conform to an inner circumference of outer shaft (616). In any event, navigation sensor assembly (610) may permit space for a lumen to extend along outer shaft (616) as described above, such that navigation sensor assembly (610) may continuously communicate position related signals to processor (52) during severing and/or suctioning of tissue. In other words, severing/suctioning of tissue and navigation of outer shaft (616) may be performed concurrently without interfering with each other.

While not shown, navigation sensor assembly (610) may include at least one temperature sensor formed (e.g., printed and/or embedded) on substrate (626) for detecting a temperature of substrate (626) and/or the surrounding environment at or near at least one navigation sensor (650, 652, 653, 654, 656, 657) and generating signals indicative of the detected temperature which may be processed by processor (52) for improving the accuracy of the location coordinates calculated by processor (52) from the position related signals of navigation sensors (650, 652, 653, 654, 656, 657) in a manner similar to that described above. In this regard, it will be appreciated that the operation of the motorized drive assembly to rotatably drive cutting member (618) relative to outer shaft (616) may cause an increase in temperature of shaft assembly (604), which may in turn cause temperature change-induced resistance changes in navigation sensors (650, 652, 653, 654, 656, 657). In other versions, changes in the temperatures of navigation sensors (650, 652, 653, 654, 656, 657) may be determined by detecting changes in the impedances of the respective concentric loop portions (630b, 632b, 633b, 634b, 636b, 637b). In any event, processor (52) may adjust the calculation of the location coordinates based on the temperature data to correct for any resistance changes caused by changes in temperature.

F. Exemplary Shaving Instrument with Bent Flexible Navigation Sensor Assembly

Figure 38:
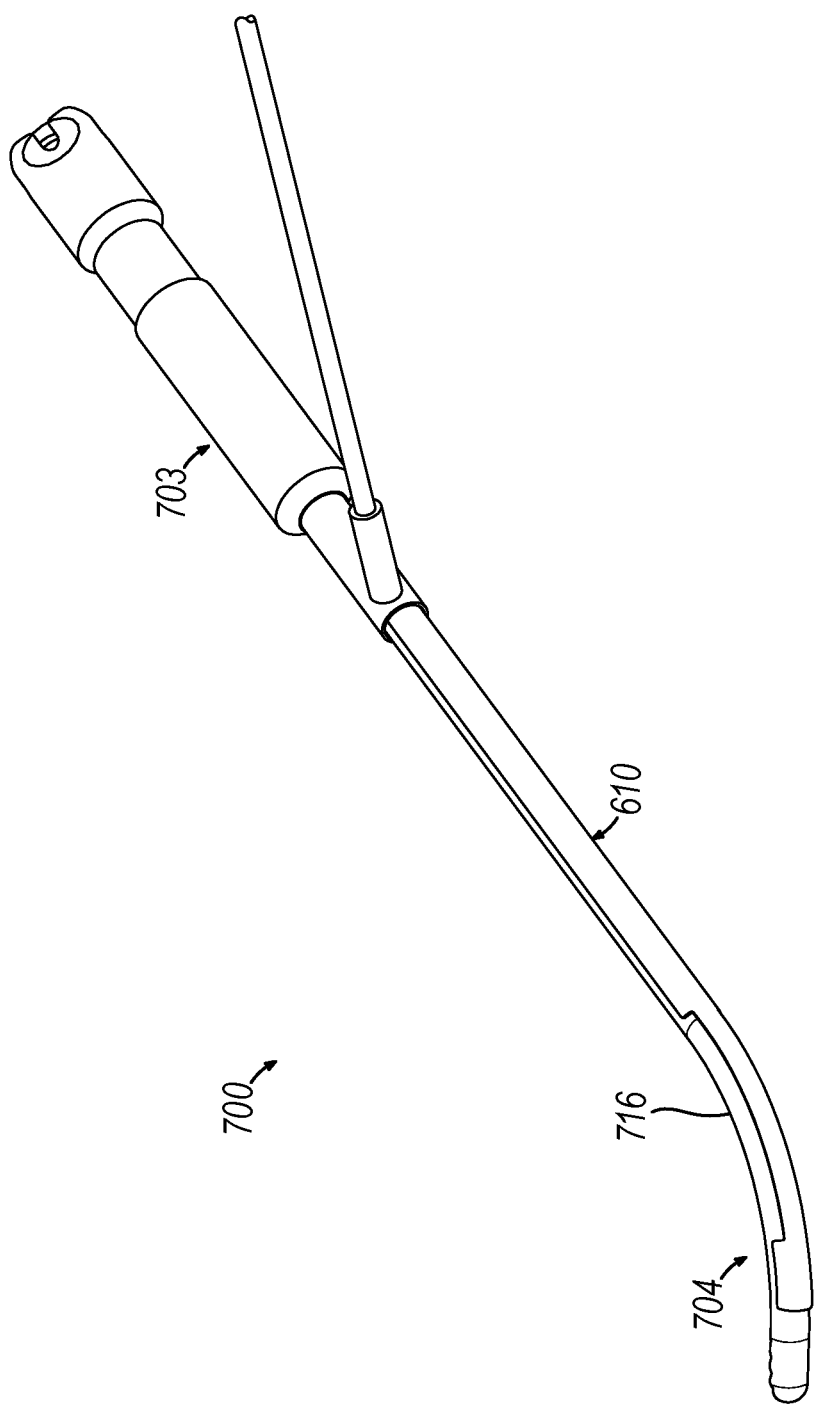
FIG. 38 depicts a perspective view of another exemplary tissue shaving instrument having the flexible navigation sensor assembly of FIG. 29, showing the flexible navigation sensor assembly disposed along an outer cylindrical surface of the outer tube in a second curved configuration.

FIG. 38 shows another example of an instrument (700) that may be used to sever and remove tissue, such as bone tissue, from an anatomical passageway. For instance, instrument (700) may be used to sever and remove bone tissue from the nasal cavity, as well as from any other suitable location. Instrument (700) of this example includes a handle assembly (not shown), a hub (703), a shaft assembly (704), and navigation sensor assembly (610), and may be similar to instrument (600) except as otherwise described. Instrument (700) may be coupled with a suction source (not shown), which may be operable to selectively provide enough suction at a surgical site to pull severed tissue proximally through instrument (700).

Shaft assembly (704) generally includes a longitudinally bent, rigid outer shaft (716) and an inner cutting member (not shown) collectively configured to receive and remove tissue from the surgical site. In some versions, a distal portion of outer shaft (716) may be oriented at an angle of approximately 60° relative to a proximal portion of outer shaft (716). In any event, outer shaft (716) includes a lateral shaft window opening (not shown) configured to cooperate with a cutting window opening (not shown) of the inner cutting member.

As shown, navigation sensor assembly (610) is disposed on an exterior of outer shaft (716) and is operable to provide navigation capabilities to outer shaft (716). More particularly, navigation sensor assembly (610) is disposed along a generally cylindrical outer surface of outer shaft (716) in a generally curved configuration in which navigation sensor assembly (610) is curved about the longitudinal axis of outer shaft (716) with a radius of curvature corresponding to that of the cylindrical outer surface of outer shaft (716) to thereby conform to an outer circumference of outer shaft (716). Navigation sensor assembly (610) is also longitudinally bent to conform to the longitudinal bend of outer shaft (716).

III. EXEMPLARY NAVIGATION ADAPTER SHEATH

As noted above, it may be desirable to provide an instrument with a flex circuit having integral navigation sensors. It may also be desirable to provide an adapter with a flex circuit having one or more integral navigation sensors, where such an adapter may be readily coupled with an instrument that otherwise lacks any navigation sensors. In such a scenario, the adapter may impart navigation capabilities to the instrument. Similarly, it may be desirable to use an adapter with a flex circuit having one or more integral navigation sensors in combination with an instrument that already has one or more navigation sensors, where the position data from the one or more navigation sensors of the adapter may supplement the position data from the one or more navigation sensors of the instrument. In such a scenario, the adapter may enhance navigation capabilities to the instrument. In either of the above scenarios, the adapter may be configured to avoid adding bulk to the instrument; and to be easily assembled with the instrument in the surgical field.

FIGS. 39-43 show an example of an adapter, that may provide the above-described benefits and functionality, in the form of an adapter sheath (1100). In the present example, adapter sheath (1100) is coupled with a tissue shaving instrument (1000). Tissue shaving instrument (1000) of this example includes a body (1002), a suction port (1004), a rotation control knob (1006), a power connector (1008), a hub (1010), and a shaft assembly (1020). Body (1002) is configured for grasping by an operator. Suction port (1004) is configured to couple with a suction source, such that suction may be applied to draw tissue and fluids during operation of tissue shaving instrument (1000). Rotation control knob (1006) is rotatable relative to body (1002) to reorient shaft assembly (1020) about the longitudinal axis of shaft assembly (1020). Power connector (1008) is configured to couple with a power source to provide power to a motor (not shown) in body (1002). The motor is operable to drive a cutting shaft (not shown) of shaft assembly (1020) in a manner as is known in the art.

Figure 43:
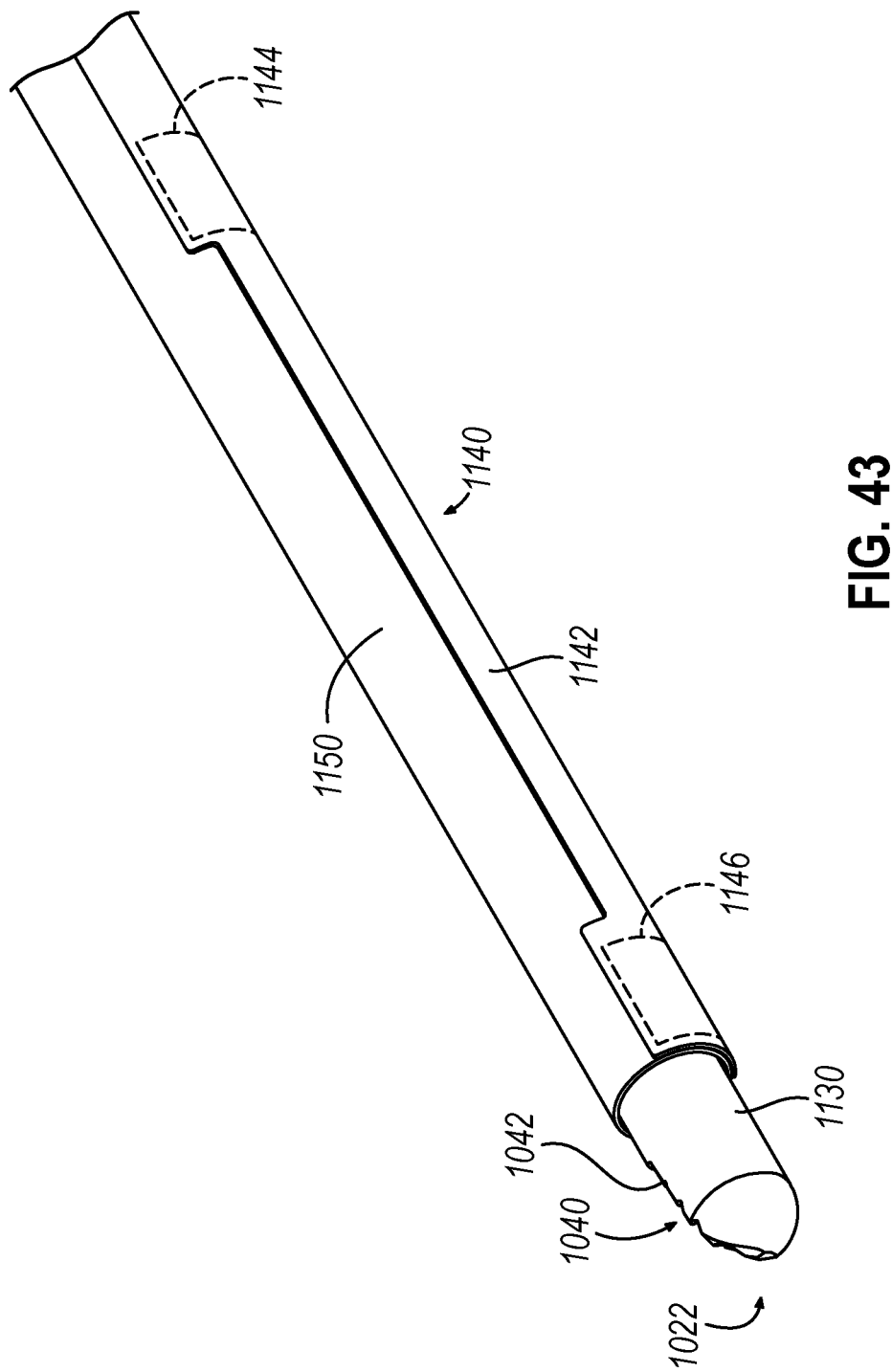
FIG. 43 depicts a perspective view of a distal portion of the tissue shaving instrument and navigation adapter sheath of FIG. 39, with the navigation adapter sheath secured to the tissue shaving instrument, and with an outer shaft of the shaft assembly omitted to reveal positioning of a flex circuit.

In addition to including a cutting shaft, shaft assembly (1020) includes an outer shaft (1030) and an end effector (1022). End effector (1022) is at the distal end of shaft assembly (1020). As best seen in FIG. 43, end effector (1022) includes a transverse opening (1040) formed at the distal end of outer shaft (1030), with a serrated cutting edge (1042) extending along the perimeter of opening (1040). The cutting shaft is positioned inside outer shaft (1030) and includes a similar transverse opening and cutting edge that complement transverse opening (1040) and cutting edge (1042). The motor in body (1002) drives rotation of the cutting shaft relative to outer shaft (1030), about the longitudinal axis of shaft assembly (1020). During such rotation, suction is applied via the lumen defined by the cutting shaft to draw tissue into opening (1040), the cutting edge of the cutting shaft cooperates with cutting edge (1042) of outer shaft (1030) to shear the tissue, and the sheared tissue is drawn proximally through the lumen of the cutting shaft under the influence of the suction. Those of ordinary skill in the art will understand that it may be beneficial to have data from navigation sensors indicating the real-time location of end effector (1022) within the patient during operation of tissue shaving instrument (1000).

Figure 39:
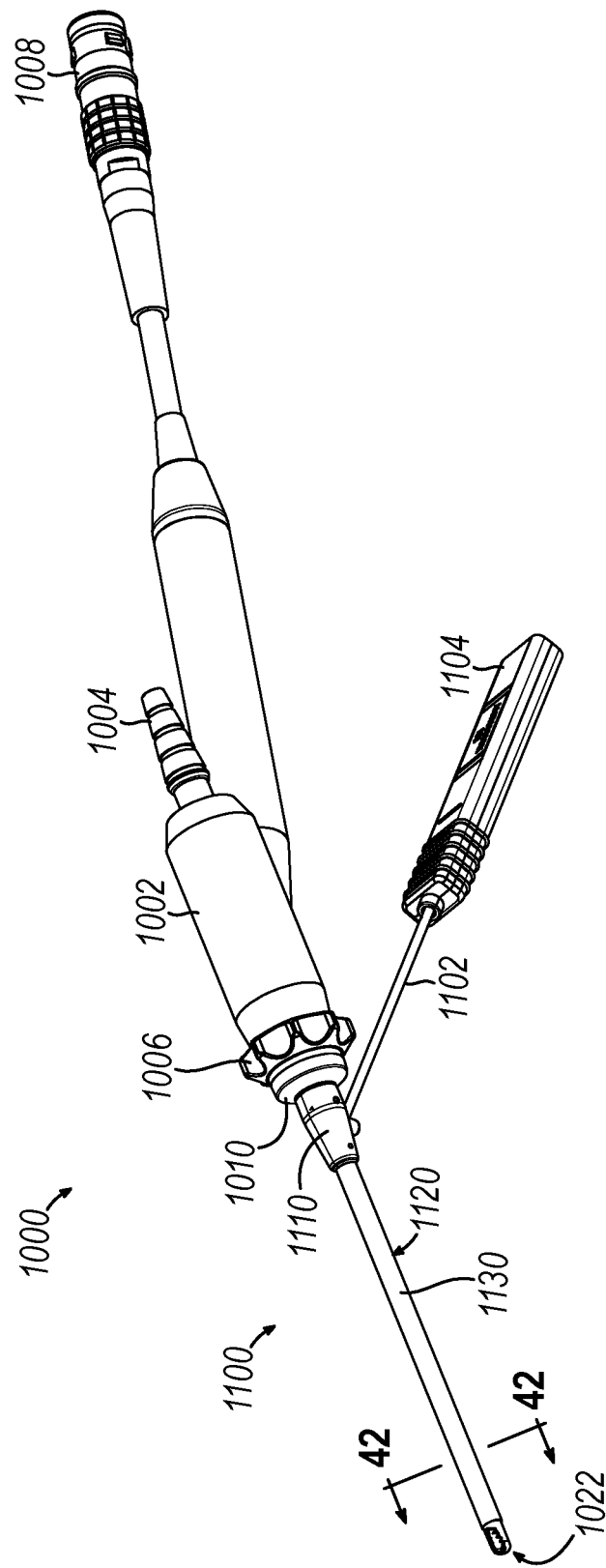
FIG. 39 depicts a perspective view of another exemplary tissue shaving instrument with a navigation adapter sheath removably secured to the tissue shaving instrument.
Figure 40:
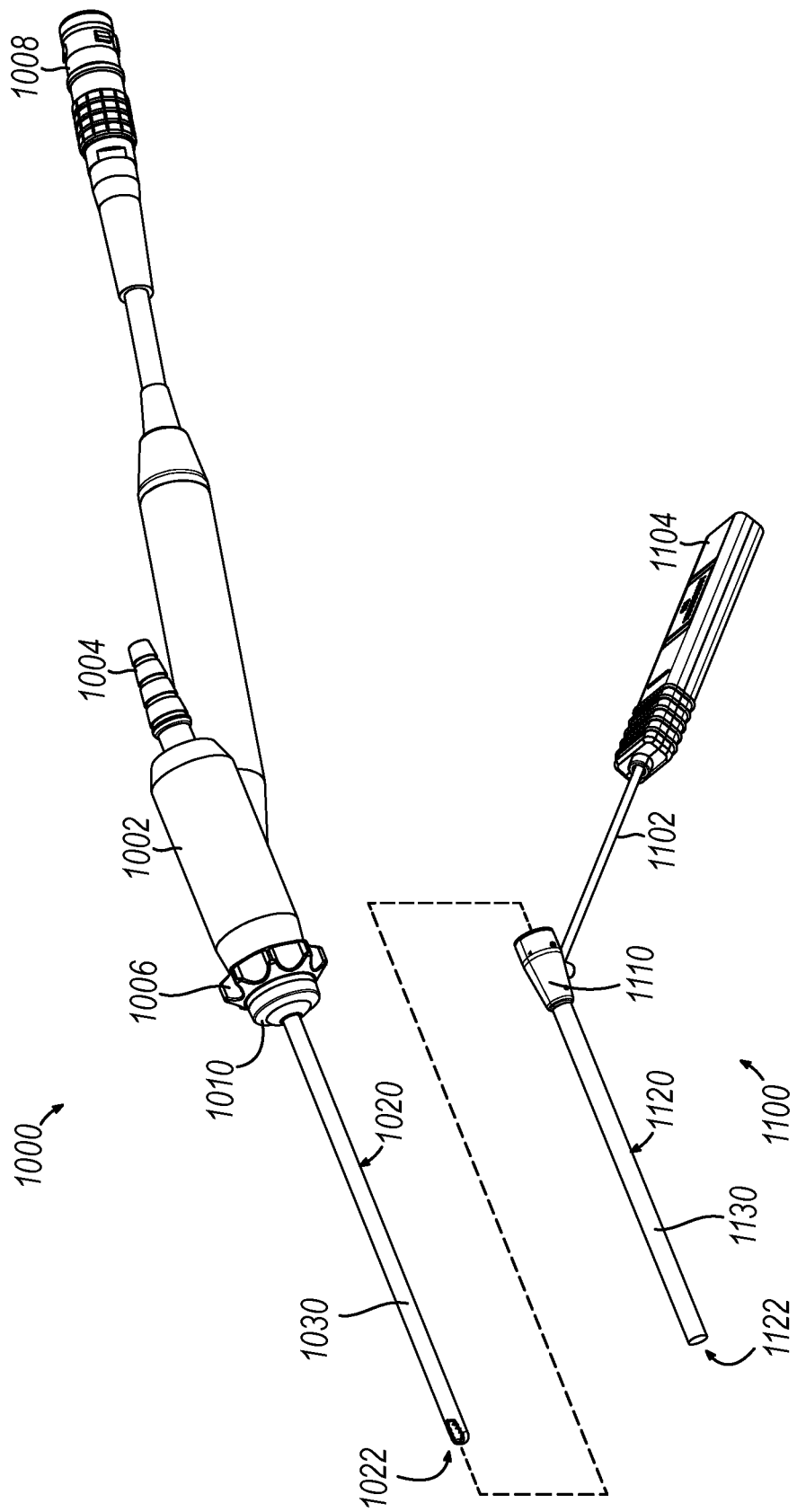
FIG. 40 depicts a perspective view of the tissue shaving instrument and navigation adapter sheath of FIG. 39, with the navigation adapter sheath removed from the tissue shaving instrument.
Figure 41:
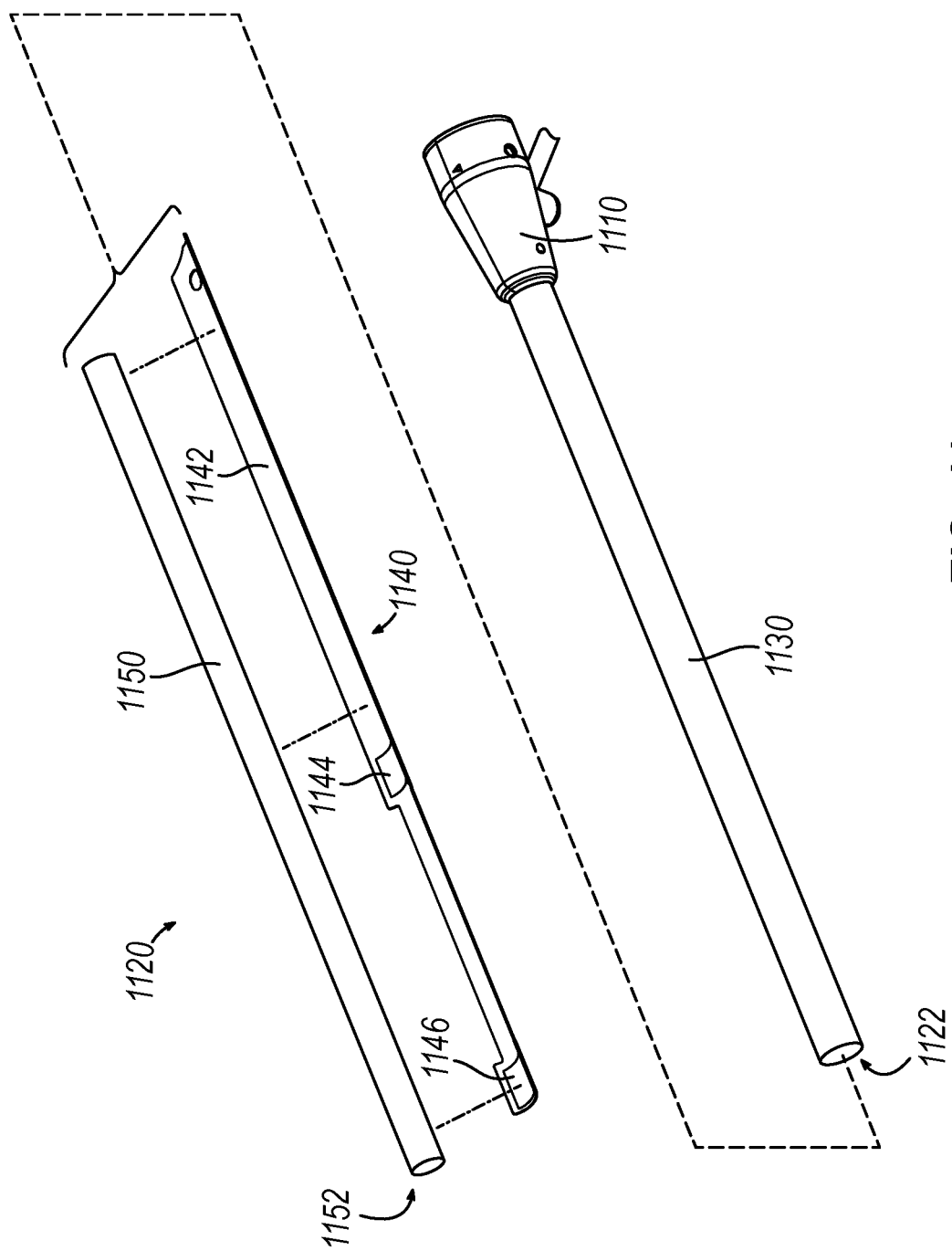
FIG. 41 depicts an exploded perspective view of a shaft assembly of the navigation adapter sheath of FIG. 39.

As shown in FIG. 39-40, adapter sheath (1100) of the present example includes a hub (1110), a shaft assembly (1120) extending distally from hub (1110), a cable (1102), and a connector (1104). As best seen in FIG. 41, shaft assembly (1120) includes a hollow outer shaft (1130), a flex circuit (1140), and a hollow inner shaft (1150). Hub (1110) is fixedly secured to the proximal end of outer shaft (1130). Flex circuit (1140) includes a flexible substrate (1142), a pair of navigation sensors (1144, 1146), and traces (not shown). Flexible substrate (1142), navigation sensors (1144, 1146), and the traces may be configured an operable like any of the various flexible substrates, navigation sensors, and traces described above. Flex circuit (1140) may have just one single layer or a plurality of layers.

Figure 42:
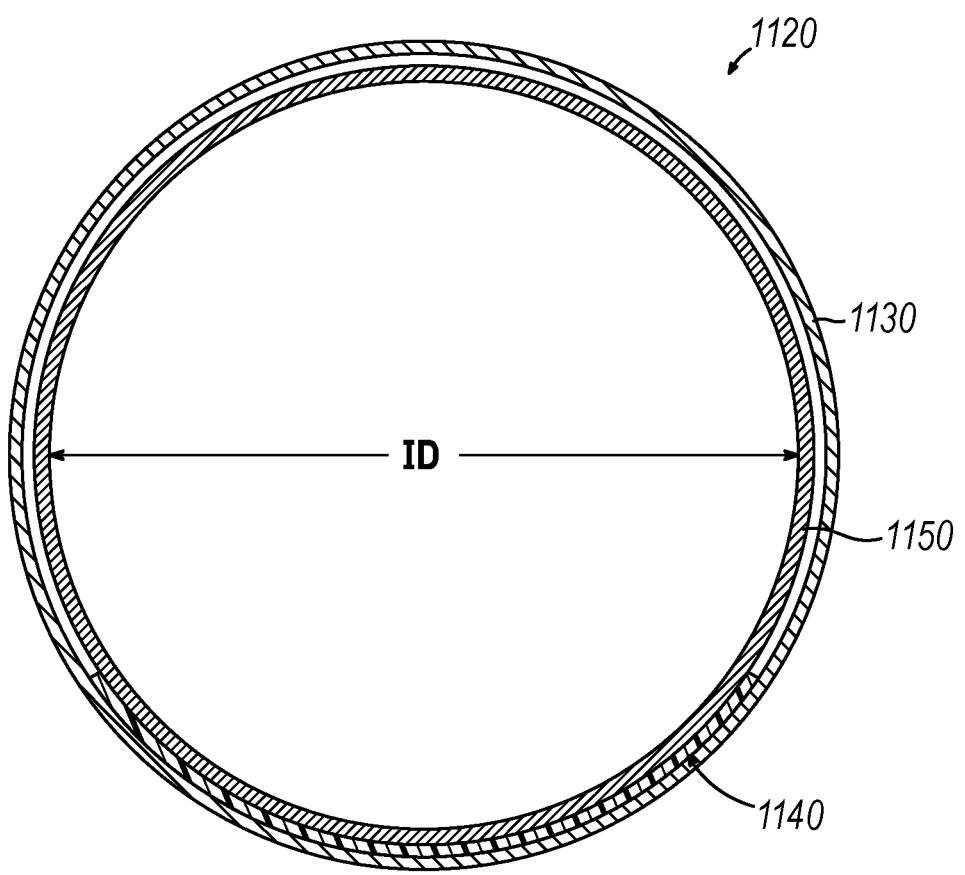
FIG. 42 depicts a cross-sectional end view of the shaft assembly of FIG. 41, taken along line 42-42 of FIG. 39.

As shown in FIG. 42, shaft assembly (1120) is configured such that inner shaft (1150) is coaxially nested within outer shaft (1130), with flex circuit (1140) being radially interposed between the exterior of inner shaft (1150) and the interior of outer shaft (1130). In some versions, shaft assembly (1120) is configured such that flex circuit (1140) is embedded within or otherwise coupled with inner shaft (1150) and/or outer shaft (1130). In some versions, distal end (1132) of outer shaft (1130) is welded to our otherwise secured to distal end (1152) of inner shaft (1150). In addition, or in the alternative, proximal portions of shafts (1130, 1150) may be welded or otherwise secured together. The relationship between shafts (1130, 1150) and flex circuit (1140) may provide protection to flex circuit (1140), such that shaft assembly (1120) may be subjected to various kinds of sterilization procedures that might otherwise damage one or more features of flex circuit (1140) if such features were exposed. While flex circuit (1140) is interposed between shafts (1130, 1150) in this example, flex circuit (1140) may be interposed between, or otherwise positioned in relation to, any other suitable kind(s) of tubular member(s).

Inner shaft (1150) defines an inner diameter (ID) that corresponds with the outer diameter of outer shaft (1030) of tissue shaving instrument (1000), such that shaft assembly (1020) may be readily inserted into shaft assembly (1120), with shaft assembly (1120) closely corresponding to shaft assembly (1020). With such close correspondence, shaft assembly (1120) may not substantially add to the outer diameter of shaft assembly (1020), such that the addition of adapter sheath (1100) may not undesirably bulk up the profile of tissue shaving instrument (1000). In other words, the presence of adapter sheath (1100) may not undesirably interfere with normal use of tissue shaving instrument (1000).

Hub (1110) of adapter sheath (1100) is configured to engage with hub (1010) of tissue shaving instrument (1000) to thereby removably secure adapter sheath (1100) relative to tissue shaving instrument (1000). By way of example only, hub (1110) may provide a snap fit, and interference fit, or any other suitable kind of relationship with hub (1010). As shown in FIGS. 39 and 43, the length of shaft assembly (1120) is such that distal ends (1132, 1152) are just proximal to end effector (1022) when adapter sheath (1100) is fully seated on tissue shaving instrument (1000). As also shown in FIG. 43, in which outer shaft (1130) is omitted, a distal navigation sensor (1146) of adapter sheath (1100) is positioned adjacent to end effector (1022). Such a location of distal navigation sensor (1146) may thus allow distal navigation sensor (1146) to readily indicate the real-time position of end effector (1022). Proximal navigation sensor (1146) of adapter sheath (1100) is positioned further proximal from end effector (1022), such that proximal navigation sensor (1146) may readily indicate the real-time position of a corresponding proximal portion of shaft assembly (1020). In some versions, proximal navigation sensor (1146) is omitted.

While only one navigation sensor (1144) is shown at the distal end of flex circuit (1140) in this example, some variations may provide two or more navigation sensors (1144) at the distal end of flex circuit (1140). Similarly, while only one navigation sensor (1146) is shown on flex circuit (1140) proximal to navigation sensor (1144), two or more navigation sensors (1146) may be provided proximal to navigation sensor (1144).

The traces of flex circuit (1140) are configured to communicate position-indicative signals from navigation sensors (1144, 1146) to cable (1102). Cable (1102) is configured to communicate these position-indicative signals to connector (1104). Connector (1104) is configured to couple with IGS navigation system (50) and thereby communicate the position-indicative signals to IGS navigation system (50). In some versions, connector (1104) is configured to plug into a corresponding socket of IGS navigation system (50). In some other versions, connector (1104) includes a wireless transmitter that is operable to wirelessly transmit the position-indicative signals IGS navigation system (50). In still other versions, cable (1102) and connector (1104) are omitted, and some other component of adapter sheath (1100) is configured to wirelessly transmit the position-indicative signals IGS navigation system (50). By way of example only, one or more wireless transmitters may be integrated into hub (1110). Alternatively, the position-indicative signals may be communicated to IGS navigation system (50) in any other suitable fashion.

In some versions, outer shaft (1130) and inner shaft (1150) each comprise a metallic material. In some other versions, outer shaft (1130) and inner shaft (1150) each comprise a polymeric material. In some other versions, outer shaft (1130) comprises a metallic material while inner shaft (1150) comprises a polymeric material. In some other versions, outer shaft (1130) comprises a polymeric material while inner shaft (1150) comprises a metallic material. Regardless of the kind or kinds of materials used to form shafts (1130, 1150), either or both of shafts (1130, 1150) may be rigid, malleable, flexible, and/or have any other suitable properties. Thus, while shafts (1130, 1150) are shown as being straight in the present example, shafts (1130, 1150) may alternatively be bent or have any other kind of non-straight configuration. In versions where shafts (1130, 1150) are bent or have any other kind of non-straight configuration, shafts (1130, 1150) may be rigidly configured in such a fashion; or may be bent by the operator to achieve such a configuration in cases where shafts (1130, 1150) are malleable or otherwise flexible.

While adapter sheath (1100) is shown and described in the context of a tissue shaving instrument (1000), adapter sheath (1100) may be readily used with any other suitable kind of instrument. Adapter sheath (1100) need not necessarily be limited to the context of tissue shaving instruments like tissue shaving instrument (1000). By way of example only, adapter sheath (1100) may be configured to fit over endoscopes, various kinds of ENT instruments, and/or any other kind of instrument as will be apparent to those skilled in the art in view of the teachings herein. The length of adapter sheath (1100) may vary based on the kind of instrument with which adapter sheath (1100) will be coupled. Regardless of the kind of instrument with which adapter sheath (1100) is coupled, adapter sheath (1100) may be readily coupled with the instrument right before the medical procedure in which the instrument will be used with adapter sheath (1100). After the medical procedure is complete, adapter sheath (1100) may be removed from the instrument. The removed adapter sheath (1100) may be disposed of or be sterilized for subsequent reuse.

IV. EXEMPLARY METHODS FOR CALIBRATING NAVIGATION SENSORS

In some instances, it may be desirable to provide one or more methods for accurately and reliably calibrating navigation sensors (150, 152, 154, 156, 250, 252, 254, 256, 452, 453, 552, 553, 650, 652, 653, 654, 656, 657, 1144, 1146), which may include calibrating the location and/or orientation of each navigation sensor (150, 152, 154, 156, 250, 252, 254, 256, 452, 453, 552, 553, 650, 652, 653, 654, 656, 657, 1144, 1146) based on a distance between the navigation sensor (150, 152, 154, 156, 250, 252, 254, 256, 452, 453, 552, 553, 650, 652, 653, 654, 656, 657, 1144, 1146) and a distal tip of the respective instrument (100, 400, 500, 600, 700, 1000). In addition, or alternatively, calibrating navigation sensors (150, 152, 154, 156, 250, 252, 254, 256, 452, 453, 552, 553, 650, 652, 653, 654, 656, 657, 1144, 1146) may include calibrating a sensitivity of each navigation sensor (150, 152, 154, 156, 250, 252, 254, 256, 452, 453, 552, 553, 650, 652, 653, 654, 656, 657, 1144, 1146) to the electromagnetic field generated by field generators (64).

The calibration of navigation sensors (150, 152, 154, 156, 250, 252, 254, 256, 452, 453, 552, 553, 650, 652, 653, 654, 656, 657, 1144, 1146) may be at least partially integrated directly into the manufacturing of the respective navigation sensor assemblies (110, 210, 410, 510, 610, 1100) and/or the application of the respective navigation sensor assemblies (110, 210, 410, 510, 610, 1100) onto the corresponding instrument (100, 400, 500, 600, 700). For example, once a sensitivity of a navigation sensor (150, 152, 154, 156, 250, 252, 254, 256, 452, 453, 552, 553, 650, 652, 653, 654, 656, 657, 1144, 1146) is determined, repeatable manufacturing techniques may be used to accurately and reliably recreate identical navigation sensors (150, 152, 154, 156, 250, 252, 254, 256, 452, 453, 552, 553, 650, 652, 653, 654, 656, 657, 1144, 1146) having the same sensitivity. For example, forming navigation sensor assemblies (110, 210, 410, 510, 610, 1144, 1146) as flexible printed circuit boards (PCBs) by printing the respective traces (130, 132, 134, 136, 230, 232, 234, 236, 630, 632, 633, 634, 636, 637) on the corresponding substrates (126, 226, 426, 526, 626, 1142) may assist in ensuring that identical navigation sensors (150, 152, 154, 156, 250, 252, 254, 256, 452, 453, 552, 553, 650, 652, 653, 654, 656, 657, 1144, 1146) having the same sensitivity may be accurately and reliably recreated. Similarly, once a distance between a navigation sensor (150, 152, 154, 156, 250, 252, 254, 256, 452, 453, 552, 553, 650, 652, 653, 654, 656, 657, 1144, 1146) and a distal tip of the respective instrument (100, 400, 500, 600, 700, 1000) is determined, repeatable application techniques may be used to accurately and reliable position identical navigation sensors (150, 152, 154, 156, 250, 252, 254, 256, 452, 453, 552, 553, 650, 652, 653, 654, 656, 657, 1144, 1146) at the same distance from the distal tips of respective identical instruments (100, 400, 500, 600, 700, 1000). For example, through bores (146, 246, 646) and/or bevels (148, 248, 648) of the corresponding navigation sensor assembly (110, 210, 410, 510, 610, 1100) may assist in ensuring that identical navigation sensors (150, 152, 154, 156, 250, 252, 254, 256, 452, 453, 552, 553, 650, 652, 653, 654, 656, 657, 1144, 1146) are accurately and reliably positioned at a predetermined distance from the distal tips of respective identical instruments (100, 400, 500, 600, 700, 1000).

Figure 44:
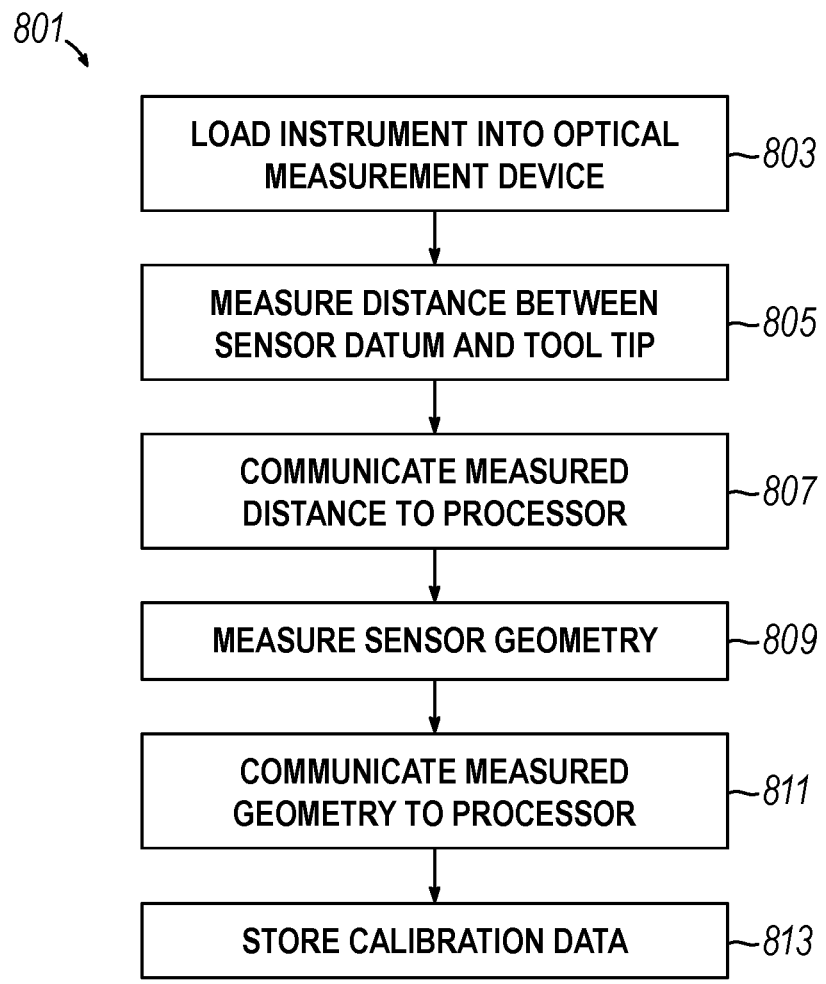
FIG. 44 depicts a flow diagram of an exemplary method for calibrating a flexible navigation sensor assembly.
Figure 45:
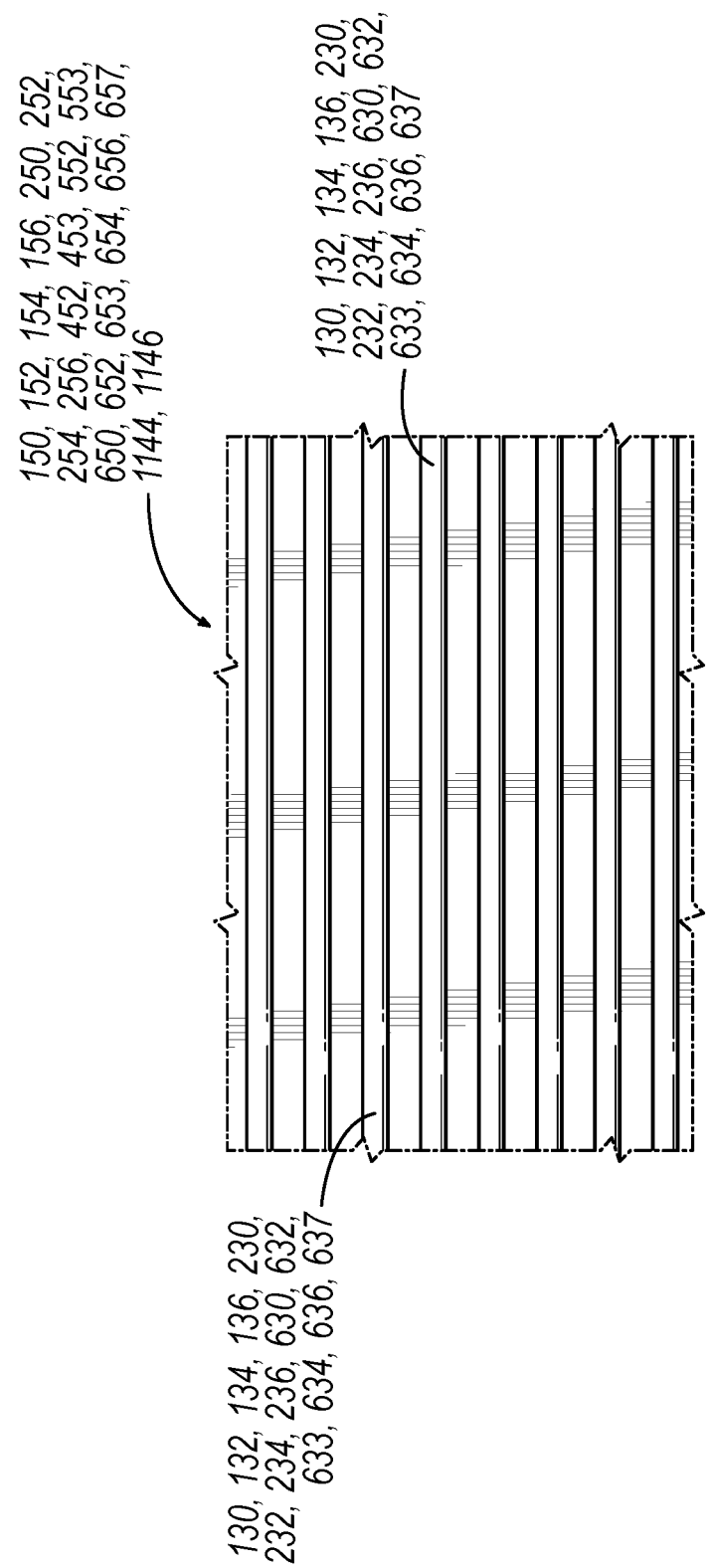
FIG. 45 depicts a photograph of an exemplary geometrical measurement acquired using the method of FIG. 44.

FIGS. 44 and 45 show an example of an optical calibration method (801) that may be used to determine a distance between a navigation sensor (150, 152, 154, 156, 250, 252, 254, 256, 452, 453, 552, 553, 650, 652, 653, 654, 656, 657, 1144, 1146) and a distal tip of the respective instrument (100, 400, 500, 600, 700, 1000). Referring to FIG. 44, method (801) begins with step (803), at which an instrument (100, 400, 500, 600, 700) having at least one navigation sensor (150, 152, 154, 156, 250, 252, 254, 256, 452, 453, 552, 553, 650, 652, 653, 654, 656, 657, 1144, 1146) applied thereto is positioned within an optical measurement device. Method (801) proceeds from step (803) to step (805), at which optical measurement device measures a distance between a centerpoint or other datum feature of navigation sensor (150, 152, 154, 156, 250, 252, 254, 256, 452, 453, 552, 553, 650, 652, 653, 654, 656, 657, 1144, 1146) and a distal tip of instrument (100, 400, 500, 600, 700, 1000). Method (801) proceeds from step (805) to step (807), at which optical measurement device communicates the measured distance to a processor. Method (801) proceeds from step (807) to step (809), at which optical measurement device measures a geometry of navigation sensor (150, 152, 154, 156, 250, 252, 254, 256, 452, 453, 552, 553, 650, 652, 653, 654, 656, 657, 1144, 1146). Method (801) proceeds from step (809) to step (811), at which optical measurement device communicates the measured geometry to the processor. It will be appreciated that the geometry of navigation sensor (150, 152, 154, 156, 250, 252, 254, 256, 452, 453, 552, 553, 650, 652, 653, 654, 656, 657, 1144, 1146) may be directly correlated to its sensitivity, such that the processor may in some versions determine a the sensitivity of navigation sensor (150, 152, 154, 156, 250, 252, 254, 256, 452, 453, 552, 553, 650, 652, 653, 654, 656, 657, 1144, 1146) based on the measured geometry. In some versions, one or more of steps (809, 811) may be performed prior to and/or concurrently with one or more of steps (805, 807). In any event, method (801) proceeds to step (813), at which the processor stores the calibration data (e.g., the measured distance, the measured geometry, and/or the determined sensitivity) on a memory device (e.g., EPROM) which may be operatively coupled to instrument (100, 400, 500, 600, 700, 1000) for facilitating subsequent retrieval of the calibration data.

Referring to FIG. 45, a photograph of an exemplary geometrical measurement of a navigation sensor (150, 152, 154, 156, 250, 252, 254, 256, 452, 453, 552, 553, 650, 652, 653, 654, 656, 657, 1144, 1146) using method (801) is shown. The geometrical measurement may include measuring the thicknesses of each segment of the respective trace (130, 132, 134, 136, 230, 232, 234, 236, 630, 632, 633, 634, 636, 637) forming the navigation sensor (150, 152, 154, 156, 250, 252, 254, 256, 452, 453, 552, 553, 650, 652, 653, 654, 656, 657, 1144, 1146) and/or measuring the distances between adjacent segments of the respective trace (130, 132, 134, 136, 230, 232, 234, 236, 630, 632, 633, 634, 636, 637) forming the navigation sensor (150, 152, 154, 156, 250, 252, 254, 256, 452, 453, 552, 553, 650, 652, 653, 654, 656, 657, 1144, 1146).

V. EXEMPLARY FLEX CIRCUIT WITH ABLATION ELECTRODES

In some scenarios, it may be desirable to provide RF ablation or cautery functionality to an instrument such as a tissue shaving instrument. Such RF ablation or cautery may be used to stop bleeding of tissue, provide other therapeutic effects, and/or provide other kinds of tissue effects. It may be further desirable to utilize flex circuit technology to provide such RF ablation or cautery functionality to an instrument. The use of such flex circuit technology may facilitate manufacture of the instrument. For instance, the instrument may otherwise be manufactured in accordance with prior practices where the instrument would lack RF ablation or cautery functionality, and the flex circuit may be readily applied to the shaft assembly of an otherwise conventional instrument. In addition, or in the alternative, the flex circuit may provide structurally robust support to the RF ablation or cautery functionality and allow the shaft assembly of the instrument to maintain a small profile despite the addition of the RF ablation or cautery functionality. Several examples of how a flex circuit assembly may be integrated into a tissue shaving instrument to impart RF ablation or cautery functionality will be described in greater detail below. In the context of the present disclosure, the terms "ablation" and "cautery" should be read interchangeably, such that reference to ablation, alone, should not be read as excluding cautery; and such that reference to cautery, alone, should not be read as excluding ablation.

Figure 46:
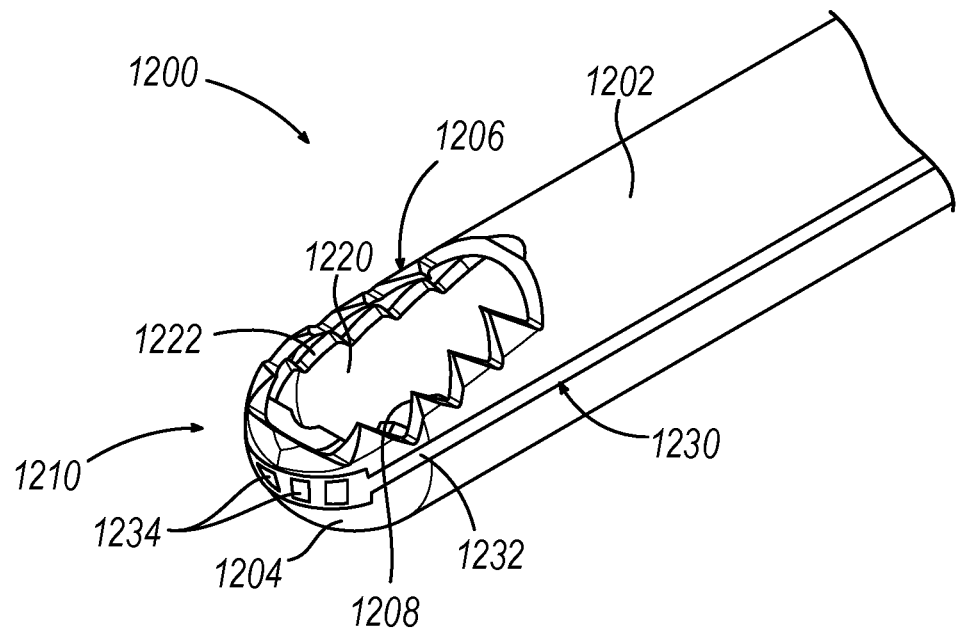
FIG. 46 depicts a perspective view of a distal portion of a shaft assembly of another exemplary tissue shaving instrument, with a first example of an incorporated ablation flex circuit.

FIG. 46 shows an example of a shaft assembly (1200) for a shaver instrument, incorporating an ablation flex circuit (1230). Only the shaft assembly (1200) of the shaver instrument is shown in FIG. 46. Shaft assembly (1200) includes an outer shaft (1202) and an inner cutting shaft (1220). Shaft assembly (1200) defines an end effector (1210) formed by a transverse opening (1206) formed at the distal end (1204) of outer shaft (1202), with a serrated cutting edge (1208) extending along the perimeter of opening (1206). Cutting shaft (1220) is positioned inside outer shaft (1202) and includes a similar transverse opening and cutting edge (1222) that complement transverse opening (1206) and cutting edge (1208). A motor (not shown) is operable to drive inner cutting shaft (1220) to rotate relative to outer shaft (1202) about the longitudinal axis defined by shaft assembly (1200). A suction source (not shown) is operable to apply suction to the lumen formed through cutting shaft (1220), to thereby draw tissue into transverse opening (1206). As cutting shaft (1220) rotates relative to outer shaft (1202), cutting edges (1208, 1222) cooperate to shear the tissue, and the sheared tissue is drawn proximally through the lumen of the cutting shaft under the influence of the suction.

Flex circuit (1230) of the present example includes a flexible substrate (1232) and a plurality of electrodes (1234). Flex circuit (1230) may have just one single layer or a plurality of layers. Flexible substrate (1232) may be formed of an electrically-insulative, flexible plastic material such as polyimide or LCP. Flexible substrate (1232) of the present example extends longitudinally along the length of shaft assembly (1200) and wraps at least partially around distal end (1204) of outer shaft (1202). In some versions, flexible substrate (1232) is secured to an exterior surface of outer shaft (1202) via an adhesive. Alternatively, flexible substrate (1232) may be secured to outer shaft (1202) in any other suitable fashion.

Electrodes (1234) are positioned along the region of flexible substrate (1232) that wraps at least partially around distal end (1204) of outer shaft (1202), such that electrodes (1234) are positioned at distal end (1204) of outer shaft (1202). Electrodes (1234) may be vapor deposited on substrate (1232) or may be applied to substrate (1232) in any other suitable fashion. Flexible substrate (1232) provides electrical insulation between electrodes (1234) and outer shaft (1202), such that flexible substrate (1232) prevents electrodes (1234) from electrically energizing outer shaft (1202). Electrodes (1234) are coupled with an RF generator (e.g., similar to RF generator (101) described above) via traces (not shown) that are formed along flexible substrate (1232). In some versions, electrodes (1234) are operable to apply bipolar RF energy to tissue in contact with electrodes (1234). In some other versions, electrodes (1234) are operable to apply monopolar RF energy to tissue in contact with electrodes (1234). In such versions, a ground pad (not shown) may be contact the patient in any suitable location. Regardless of whether bipolar or monopolar RF energy is used, the RF energy may ablate tissue during a tissue shaving operation. Such RF energy may be applied while and/or after cutting shaft (1220) shaves tissue, such that the RF energy may stanch bleeding that is otherwise caused by the tissue shaving operation. To this end, it may be advantageous to position electrodes (1234) at distal end (1204) of outer shaft (1202) since this location would be close to the tissue shaving site.

While not shown in FIG. 46, flex circuit (1230) may also include one or more integral navigation sensors. Such navigation sensors may be configured and operable like any of the other various navigation sensors (150, 152, 154, 156, 250, 252, 254, 256, 452, 453, 552, 553, 650, 652, 653, 654, 656, 657, 1144, 1146) described herein. A version of flex circuit (1230) including one or more integral navigation sensors may thus facilitate determining the real-time position of end effector (1210) within a patient. Flex circuit (1230) may also include one or more integral temperature sensors (e.g., thermocouples, etc.). Such temperature sensors may sense the temperature of electrodes (1234) and/or tissue adjacent to electrodes (1234). The temperature data may be used as real-time feedback to regulate the delivery of RF to tissue (e.g., to avoid overheating the tissue). Flex circuit (1230) may include any other suitable features, in addition to or in lieu of those described above. As yet another example of a variation, electrodes (1234) may be integrated into shaft assembly (1200) without the use of flex circuit (1230), such that a flexible substrate (1232) is not necessarily required in order to integrate electrodes (1234) into shaft assembly (1200).

Figure 47:
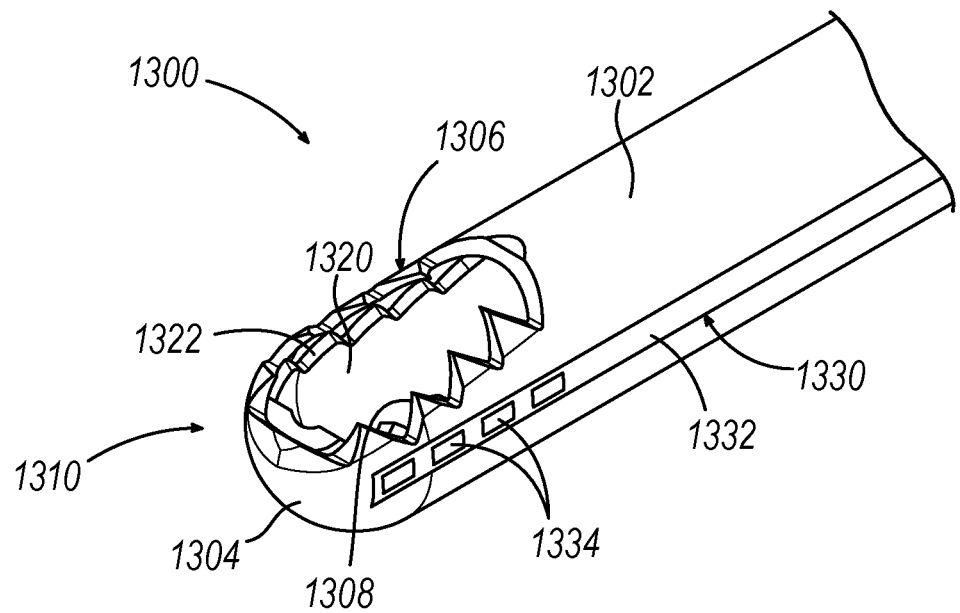
FIG. 47 depicts a perspective view of a distal portion of a shaft assembly of another exemplary tissue shaving instrument, with a second example of an incorporated ablation flex circuit.

FIG. 47 shows an example of a shaft assembly (1300) for a shaver instrument, incorporating an ablation flex circuit (1330). Only the shaft assembly (1300) of the shaver instrument is shown in FIG. 47. Shaft assembly (1300) includes an outer shaft (1302) and an inner cutting shaft (1320), which is driven to rotate relative to outer shaft (1302) about the longitudinal axis defined by shaft assembly (1300). Shaft assembly (1300) defines an end effector (1310) formed by a transverse opening (1306) formed at the distal end (1304) of outer shaft (1302), with a serrated cutting edge (1308) extending along the perimeter of opening (1306). Cutting shaft (1320) is positioned inside outer shaft (1302) and includes a similar transverse opening and cutting edge (1322) that complement transverse opening (1306) and cutting edge (1308). A motor (not shown) is operable to drive inner cutting shaft (1320) to rotate relative to outer shaft (1302) about the longitudinal axis defined by shaft assembly (1300). A suction source (not shown) is operable to apply suction to the lumen formed through cutting shaft (1320), to thereby draw tissue into transverse opening (1306). As cutting shaft (1320) rotates relative to outer shaft (1302), cutting edges (1308, 1322) cooperate to shear the tissue, and the sheared tissue is drawn proximally through the lumen of the cutting shaft under the influence of the suction.

Flex circuit (1330) of the present example includes a flexible substrate (1332) and a plurality of electrodes (1334). Flex circuit (1330) may have just one single layer or a plurality of layers. Flexible substrate (1332) may be formed of an electrically-insulative, flexible plastic material such as polyimide or LCP. Flexible substrate (1332) of the present example extends longitudinally along the length of shaft assembly (1300) distally terminates at distal end (1304) of outer shaft (1302). In some versions, flexible substrate (1332) is secured to an exterior surface of outer shaft (1302) via an adhesive. Alternatively, flexible substrate (1332) may be secured to outer shaft (1302) in any other suitable fashion. While flexible substrate (1332) is shown as only extending along one side of outer shaft (1302), another flexible substrate (1332) may extend along the other side of outer shaft (1302). In addition, some versions of flexible substrate (1332) may wrap around distal end (1304) of outer shaft (1302).

Electrodes (1334) are positioned along the region of flexible substrate (1332) that extends alongside the longitudinally extending region of transverse opening (1306) of outer shaft (1302), such that electrodes (1334) are positioned alongside transverse opening (1306). While electrodes (1334) are shown as being positioned alongside only one longitudinally extending region of transverse opening (1306), some versions may also provide electrodes (1334) alongside the other longitudinally extending region of transverse opening (1306). In addition, or in the alternative, some versions may provide electrodes (1334) along distal end (1304) (e.g., similar to electrodes (1234)) in addition to providing electrodes (1334) alongside either or both of longitudinally extending region(s) of transverse opening (1306).

Electrodes (1334) may be vapor deposited on substrate (1332) or may be applied to substrate (1332) in any other suitable fashion. Flexible substrate (1332) provides electrical insulation between electrodes (1334) and outer shaft (1302), such that flexible substrate (1332) prevents electrodes (1334) from electrically energizing outer shaft (1302). Electrodes (1334) are coupled with an RF generator (e.g., similar to RF generator (101) described above) via traces (not shown) that are formed along flexible substrate (1332). In some versions, electrodes (1334) are operable to apply bipolar RF energy to tissue in contact with electrodes (1334). In some other versions, electrodes (1334) are operable to apply monopolar RF energy to tissue in contact with electrodes (1334). In such versions, a ground pad (not shown) may be contact the patient in any suitable location. Regardless of whether bipolar or monopolar RF energy is used, the RF energy may ablate tissue during a tissue shaving operation. Such RF energy may be applied while and/or after cutting shaft (1320) shaves tissue, such that the RF energy may stanch bleeding that is otherwise caused by the tissue shaving operation. To this end, it may be advantageous to position electrodes (1334) alongside either or both of longitudinally extending region(s) of transverse opening (1306) since this/these location(s) would be close to the tissue shaving site.

While not shown in FIG. 47, flex circuit (1330) may also include one or more integral navigation sensors. Such navigation sensors may be configured and operable like any of the other various navigation sensors (150, 152, 154, 156, 250, 252, 254, 256, 452, 453, 552, 553, 650, 652, 653, 654, 656, 657, 1144, 1146) described herein. A version of flex circuit (1330) including one or more integral navigation sensors may thus facilitate determining the real-time position of end effector (1310) within a patient. Flex circuit (1330) may also include one or more integral temperature sensors (e.g., thermocouples, etc.). Such temperature sensors may sense the temperature of electrodes (1334) and/or tissue adjacent to electrodes (1334). The temperature data may be used as real-time feedback to regulate the delivery of RF to tissue (e.g., to avoid overheating the tissue). Flex circuit (1330) may include any other suitable features, in addition to or in lieu of those described above. As yet another example of a variation, electrodes (1334) may be integrated into shaft assembly (1300) without the use of flex circuit (1330), such that a flexible substrate (1332) is not necessarily required in order to integrate electrodes (1334) into shaft assembly (1300).

Figure 48:
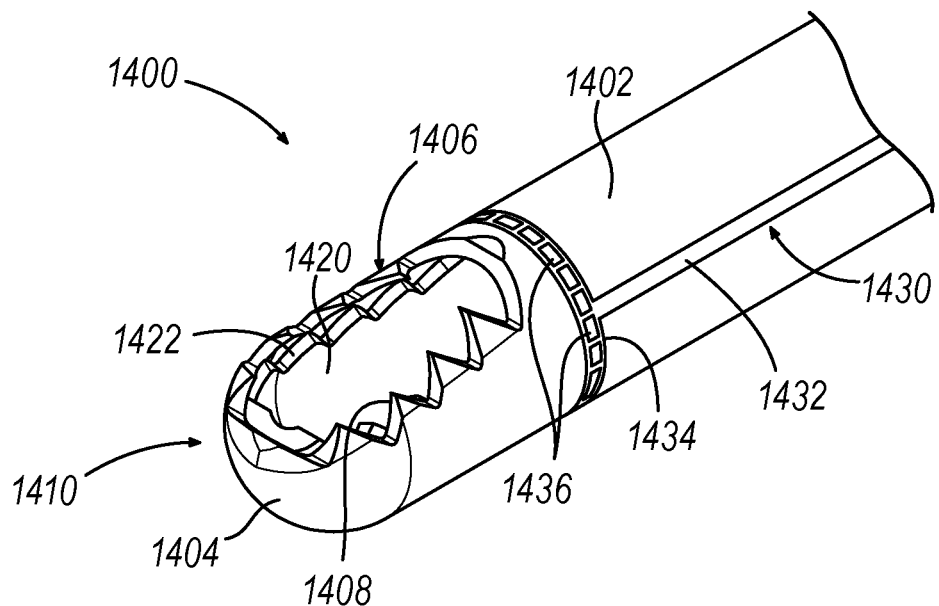
FIG. 48 depicts a perspective view of a distal portion of a shaft assembly of another exemplary tissue shaving instrument, with a third example of an incorporated ablation flex circuit.

FIG. 48 shows an example of a shaft assembly (1400) for a shaver instrument, incorporating an ablation flex circuit (1430). Only the shaft assembly (1400) of the shaver instrument is shown in FIG. 48. Shaft assembly (1400) includes an outer shaft (1402) and an inner cutting shaft (1420), which is driven to rotate relative to outer shaft (1402) about the longitudinal axis defined by shaft assembly (1400). Shaft assembly (1400) defines an end effector (1410) formed by a transverse opening (1406) formed at the distal end (1404) of outer shaft (1402), with a serrated cutting edge (1408) extending along the perimeter of opening (1406). Cutting shaft (1420) is positioned inside outer shaft (1402) and includes a similar transverse opening and cutting edge (1422) that complement transverse opening (1406) and cutting edge (1408). A motor (not shown) is operable to drive inner cutting shaft (1420) to rotate relative to outer shaft (1402) about the longitudinal axis defined by shaft assembly (1400). A suction source (not shown) is operable to apply suction to the lumen formed through cutting shaft (1420), to thereby draw tissue into transverse opening (1406). As cutting shaft (1420) rotates relative to outer shaft (1402), cutting edges (1408, 1422) cooperate to shear the tissue, and the sheared tissue is drawn proximally through the lumen of the cutting shaft under the influence of the suction.

Flex circuit (1430) of the present example includes a longitudinally extending flexible substrate portion (1432), a circumferentially extending flexible substrate portion (1434), and a plurality of electrodes (1436). Flex circuit (1430) may have just one single layer or a plurality of layers. Flexible substrate portions (1432, 1434) are integrally formed together, with circumferentially extending flexible substrate portion (1434) being positioned just proximal of transverse opening (1406). Flexible substrate portions (1432, 1434) are each formed of an electrically-insulative, flexible plastic material such as polyimide or LCP. In some versions, substrate portions (1432, 1434) are secured to an exterior surface of outer shaft (1402) via an adhesive. Alternatively, flexible substrate portions (1432, 1434) may be secured to outer shaft (1402) in any other suitable fashion. While longitudinally extending flexible substrate portion (1432) is shown as only extending along one side of outer shaft (1402), another longitudinally extending flexible substrate portion (1432) may extend along the other side of outer shaft (1402). In addition, some versions of flex circuit (1430) may include a flexible substrate portion that wraps around distal end (1404) of outer shaft (1402).

Electrodes (1436) are positioned along circumferentially extending flexible substrate portion (1434), such that electrodes (1436) are positioned just proximal of transverse opening (1406). In the present example, electrodes (1436)

are formed as discrete squares or rectangles arranged in an array that spans about the full circumference of outer shaft (1402). In some variations, in addition to the circumferential array of electrodes (1436), flex circuit (1430) includes one or more electrodes extending longitudinally alongside one or both longitudinally extending regions of transverse opening (1406) (e.g., similar to electrodes (1336)). In addition, or in the alternative, some variations of flex circuit (1430) may include one or more electrodes at distal end (1404) of outer shaft (1402) (e.g., similar to electrodes (1236)), in addition to the circumferential array of electrodes (1436).

Electrodes (1434) may be vapor deposited on substrate (1432) or may be applied to substrate (1432) in any other suitable fashion. Flexible substrate (1432) provides electrical insulation between electrodes (1434) and outer shaft (1402), such that flexible substrate (1432) prevents electrodes (1434) from electrically energizing outer shaft (1402). Electrodes (1434) are coupled with an RF generator (e.g., similar to RF generator (101) described above) via traces (not shown) that are formed along flexible substrate (1432). In some versions, electrodes (1434) are operable to apply bipolar RF energy to tissue in contact with electrodes (1434). In some other versions, electrodes (1434) are operable to apply monopolar RF energy to tissue in contact with electrodes (1434). In such versions, a ground pad (not shown) may be contact the patient in any suitable location. Regardless of whether bipolar or monopolar RF energy is used, the RF energy may ablate tissue during a tissue shaving operation. Such RF energy may be applied while and/or after cutting shaft (1420) shaves tissue, such that the RF energy may stanch bleeding that is otherwise caused by the tissue shaving operation. To this end, it may be advantageous to position electrodes (1434) just proximal to transverse opening (1406) since this location would be close to the tissue shaving site.

While not shown in FIG. 48, flex circuit (1430) may also include one or more integral navigation sensors. Such navigation sensors may be configured and operable like any of the other various navigation sensors (150, 152, 154, 156, 250, 252, 254, 256, 452, 453, 552, 553, 650, 652, 653, 654, 656, 657, 1144, 1146) described herein. A version of flex circuit (1430) including one or more integral navigation sensors may thus facilitate determining the real-time position of end effector (1410) within a patient. Flex circuit (1430) may also include one or more integral temperature sensors (e.g., thermocouples, etc.). Such temperature sensors may sense the temperature of electrodes (1434) and/or tissue adjacent to electrodes (1434). The temperature data may be used as real-time feedback to regulate the delivery of RF to tissue (e.g., to avoid overheating the tissue). Flex circuit (1430) may include any other suitable features, in addition to or in lieu of those described above. As yet another example of a variation, electrodes (1434) may be integrated into shaft assembly (1400) without the use of flex circuit (1430), such that a flexible substrate (1432) is not necessarily required in order to integrate electrodes (1434) into shaft assembly (1400).

Figure 49:
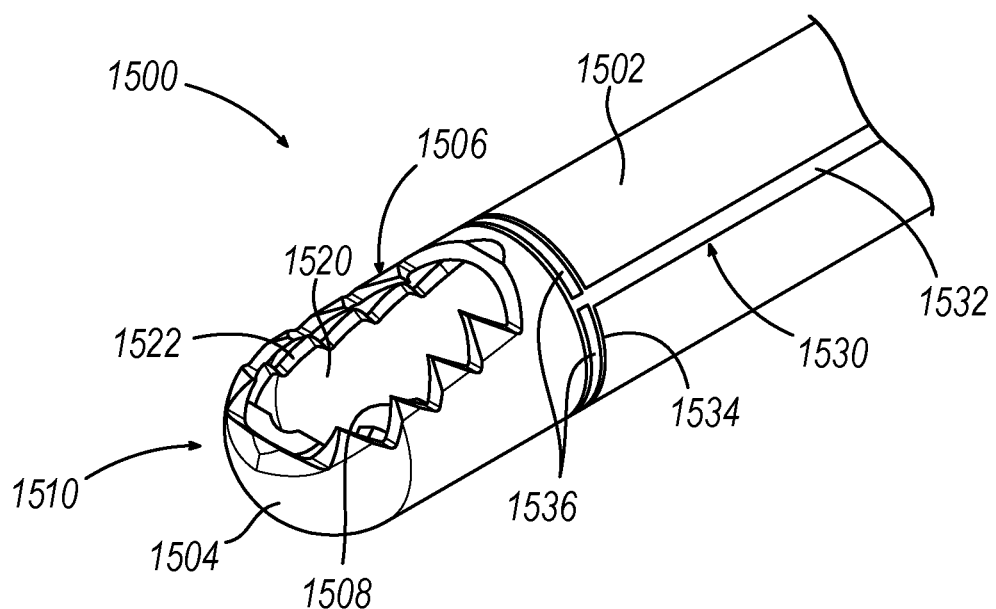
FIG. 49 depicts a perspective view of a distal portion of a shaft assembly of another exemplary tissue shaving instrument, with a fourth example of an incorporated ablation flex circuit.

FIG. 49 shows an example of a shaft assembly (1500) for a shaver instrument, incorporating an ablation flex circuit (1530). Only the shaft assembly (1500) of the shaver instrument is shown in FIG. 49. Shaft assembly (1500) includes an outer shaft (1502) and an inner cutting shaft (1520), which is driven to rotate relative to outer shaft (1502) about the longitudinal axis defined by shaft assembly (1500). Shaft assembly (1500) defines an end effector (1510) formed by a transverse opening (1506) formed at the distal end (1504) of outer shaft (1502), with a serrated cutting edge (1508) extending along the perimeter of opening (1506). Cutting shaft (1520) is positioned inside outer shaft (1502) and includes a similar transverse opening and cutting edge (1522) that complement transverse opening (1506) and cutting edge (1508). A motor (not shown) is operable to drive inner cutting shaft (1520) to rotate relative to outer shaft (1502) about the longitudinal axis defined by shaft assembly (1500). A suction source (not shown) is operable to apply suction to the lumen formed through cutting shaft (1520), to thereby draw tissue into transverse opening (1506). As cutting shaft (1520) rotates relative to outer shaft (1502), cutting edges (1508, 1522) cooperate to shear the tissue, and the sheared tissue is drawn proximally through the lumen of the cutting shaft under the influence of the suction.

Flex circuit (1530) of the present example includes a longitudinally extending flexible substrate portion (1532), a circumferentially extending flexible substrate portion (1534), and a pair of electrodes (1536). Flex circuit (1530) may have just one single layer or a plurality of layers. Flexible substrate portions (1532, 1534) are integrally formed together, with circumferentially extending flexible substrate portion (1534) being positioned just proximal of transverse opening (1506). Flexible substrate portions (1532, 1534) are each formed of an electrically-insulative, flexible plastic material such as polyimide or LCP. In some versions, substrate portions (1532, 1534) are secured to an exterior surface of outer shaft (1502) via an adhesive. Alternatively, flexible substrate portions (1532, 1534) may be secured to outer shaft (1502) in any other suitable fashion. While longitudinally extending flexible substrate portion (1532) is shown as only extending along one side of outer shaft (1502), another longitudinally extending flexible substrate portion (1532) may extend along the other side of outer shaft (1502). In addition, some versions of flex circuit (1530) may include a flexible substrate portion that wraps around distal end (1504) of outer shaft (1502).

Electrodes (1536) are positioned along circumferentially extending flexible substrate portion (1534), such that electrodes (1536) are positioned just proximal of transverse opening (1506). In the present example, electrodes (1536) are formed as two discrete strips that together span about the circumference of outer shaft (1502), with small gaps being defined between the free ends of electrodes (1536). Electrodes (1536) are thus substantially semicircular. In some variations, in addition to the circumferential arrangement of electrodes (1536), flex circuit (1530) includes one or more electrodes extending longitudinally alongside one or both longitudinally extending regions of transverse opening (1506) (e.g., similar to electrodes (1336)). In addition, or in the alternative, some variations of flex circuit (1530) may include one or more electrodes at distal end (1504) of outer shaft (1502) (e.g., similar to electrodes (1236)), in addition to the circumferential arrangement of electrodes (1536).

Electrodes (1534) may be vapor deposited on substrate (1532) or may be applied to substrate (1532) in any other suitable fashion. Flexible substrate (1532) provides electrical insulation between electrodes (1534) and outer shaft (1502), such that flexible substrate (1532) prevents electrodes (1534) from electrically energizing outer shaft (1502). Electrodes (1534) are coupled with an RF generator (e.g., similar to RF generator (101) described above) via traces (not shown) that are formed along flexible substrate (1532). In some versions, electrodes (1534) are operable to apply bipolar RF energy to tissue in contact with electrodes (1534). In some other versions, electrodes (1534) are operable to apply monopolar RF energy to tissue in contact with electrodes (1534). In such versions, a ground pad (not shown) may be contact the patient in any suitable location. Regardless of whether bipolar or monopolar RF energy is used, the RF energy may ablate tissue during a tissue shaving operation. Such RF energy may be applied while and/or after cutting shaft (1520) shaves tissue, such that the RF energy may stanch bleeding that is otherwise caused by the tissue shaving operation. To this end, it may be advantageous to position electrodes (1534) just proximal to transverse opening (1506) since this location would be close to the tissue shaving site.

While not shown in FIG. 49, flex circuit (1530) may also include one or more integral navigation sensors. Such navigation sensors may be configured and operable like any of the other various navigation sensors (150, 152, 154, 156, 250, 252, 254, 256, 452, 453, 552, 553, 650, 652, 653, 654, 656, 657, 1144, 1146) described herein. A version of flex circuit (1530) including one or more integral navigation sensors may thus facilitate determining the real-time position of end effector (1510) within a patient. Flex circuit (1530) may also include one or more integral temperature sensors (e.g., thermocouples, etc.). Such temperature sensors may sense the temperature of electrodes (1534) and/or tissue adjacent to electrodes (1534). The temperature data may be used as real-time feedback to regulate the delivery of RF to tissue (e.g., to avoid overheating the tissue). Flex circuit (1530) may include any other suitable features, in addition to or in lieu of those described above. As yet another example of a variation, electrodes (1534) may be integrated into shaft assembly (1400) without the use of flex circuit (1530), such that a flexible substrate (1532) is not necessarily required in order to integrate electrodes (1534) into shaft assembly (1500).

While the flex circuits (1230, 1330, 1430, 1530) are shown and described in the context of a tissue shaving instrument shaft assemblies (1200, 1300, 1400, 1500), flex circuit assemblies like flex circuits (1230, 1330, 1430, 1530) may be readily used with any other suitable kind of instrument. Flex circuit assemblies like flex circuits (1230, 1330, 1430, 1530) need not necessarily be limited to the context of tissue shaving instruments. By way of example only, flex circuit assemblies like flex circuits (1230, 1330, 1430, 1530) may be integrated with endoscopes, various kinds of ENT instruments, and/or any other kind of instrument as will be apparent to those skilled in the art in view of the teachings herein.

VI. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An ENT surgical instrument, comprising: (a) a shaft assembly having a distal end sized and configured to fit in an anatomical passageway in an ear, nose, or throat of a patient; (b) a flexible substrate extending along at least a portion of the shaft; and (c) at least one electrically-conductive sensor trace formed on the flexible substrate, wherein the at least one sensor trace includes at least one concentric loop portion, wherein the at least one concentric loop portion defines at least one navigation sensor.

Example 2

The ENT surgical instrument of Example 1, wherein the at least one navigation sensor includes a proximal navigation sensor and at least one distal navigation sensor.

Example 3

The ENT surgical instrument of Example 2, wherein the at least one distal navigation sensor includes a pair of laterally-adjacent distal navigation sensors.

Example 4

The ENT surgical instrument of any of Examples 2 through 3, wherein the proximal navigation sensor and the distal navigation sensor are electrically isolated from each other.

Example 5

The ENT surgical instrument of any of Examples 1 through 4, wherein the flexible substrate includes a top surface and a bottom surface, wherein the at least one navigation sensor includes a top navigation sensor positioned on the top surface and a bottom navigation sensor positioned on the bottom surface opposite the top navigation sensor.

Example 6

The ENT surgical instrument of Example 5, wherein the top navigation sensor and the bottom navigation sensor are electrically coupled to each other.

Example 7

The ENT surgical instrument of any of Examples 1 through 6, further comprising at least one sensor lead electrically coupled to a proximal end of the at least one sensor trace, wherein the at least one sensor lead is configured to be operatively coupled to a processor.

Example 8

The ENT surgical instrument of Example 7, wherein the at least one sensor lead is positioned proximally relative to the at least one navigation sensor.

Example 9

The ENT surgical instrument of any of Examples 1 through 8, wherein the flexible substrate is at least one of rectangular or serpentine.

Example 10

The ENT surgical instrument of any of Examples 1 through 9, wherein the flexible substrate is configured to transition between a flat configuration and at least one curved configuration.

Example 11

The ENT surgical instrument of any of Examples 1 through 10, the shaft assembly including a shaft member, wherein the flexible substrate is secured to the shaft member.

Example 12

The ENT surgical instrument of Example 11, wherein the shaft member includes an inner chord, wherein the flexible substrate is disposed along the inner chord in a flat configuration.

Example 13

The ENT surgical instrument of Example 11, wherein the shaft member includes a cylindrical inner surface, wherein the flexible substrate is disposed along the cylindrical inner surface in at least one curved configuration.

Example 14

The ENT surgical instrument of Example 11, wherein the shaft member includes a cylindrical outer surface, wherein the flexible substrate is disposed along the cylindrical outer surface in at least one curved configuration.

Example 15

The ENT surgical instrument of any of Examples 1 through 14, wherein the shaft assembly includes a flexible portion, wherein the flexible substrate extends along the flexible portion.

Example 16

An ENT surgical instrument, comprising: (a) a shaft assembly having a distal end sized and configured to fit in an anatomical passageway in an ear, nose, or throat of a patient; (b) a flexible substrate extending along at least a portion of the shaft, the flexible substrate having a top surface and a bottom surface; (c) a proximal top electrically-conductive sensor trace formed on the top surface, wherein the proximal top sensor trace includes a proximal top concentric loop portion, wherein the proximal top concentric loop portion defines a proximal top navigation sensor; (d) at least one distal top electrically-conductive sensor trace formed on the top surface, wherein the at least one distal top sensor trace includes at least one distal top concentric loop portion, wherein the at least one distal top concentric loop portion defines at least one distal top navigation sensor; (e) a proximal bottom electrically-conductive sensor trace formed on the bottom surface, wherein the proximal bottom sensor trace includes a proximal bottom concentric loop portion, wherein the proximal bottom concentric loop portion defines a proximal bottom navigation sensor; and (f) at least one distal bottom electrically-conductive sensor trace formed on the bottom surface, wherein the at least one distal bottom sensor trace includes at least one distal bottom concentric loop portion, wherein the at least one distal bottom concentric loop portion defines at least one distal bottom navigation sensor.

Example 17

The ENT surgical instrument of Example 16, wherein the proximal bottom sensor trace is positioned opposite the proximal top sensor trace, wherein the at least one distal bottom sensor trace is positioned opposite the at least one distal top sensor trace.

Example 18

The ENT surgical instrument of any of Examples 16 through 17, wherein the at least one distal top sensor trace includes a pair of laterally-adjacent distal top sensor traces, wherein the at least one distal bottom sensor trace includes a pair of laterally-adjacent distal bottom sensor traces.

Example 19

A method of using an ENT surgical instrument having (i) a flexible substrate, and (ii) at least one electrically-conductive sensor trace formed on the flexible substrate, wherein the at least one sensor trace includes at least one concentric loop portion, wherein the at least one concentric loop portion defines at least one navigation sensor, the method comprising: (a) inserting the flexible substrate into an anatomical passageway within at least one of an ear, nose, or throat of a patient; (b) exposing the at least one navigation sensor to an electromagnetic field; (c) generating a signal via the at least one navigation sensor in response to the act of exposing the at least one navigation sensor to the electromagnetic field; (d) navigating a distal portion of the ENT surgical instrument through the anatomical passageway based on the generated signal; and (e) treating the anatomical passageway via the ENT surgical instrument.

Example 20

The method of Example 19, wherein the act of treating the anatomical passageway via the ENT surgical instrument includes at least one of dilating the anatomical passageway, applying RF energy to tissue within the anatomical passageway, severing tissue within the anatomical passageway, or removing debris from the anatomical passageway.

Example 21

An apparatus, comprising: (a) a shaft assembly having a distal end sized and configured to fit in an anatomical passageway in an ear, nose, or throat of a patient; (b) a flexible substrate extending along at least a portion of the shaft; (c) at least one navigation sensor positioned on the flexible substrate; and (d) at least one electrically-conductive camera trace formed on the flexible substrate, wherein the at least one camera trace is configured to operatively couple a camera to at least one of a processor or a power source.

Example 22

The apparatus of Example 21, further comprising at least one electrically-conductive sensor trace formed on the flexible substrate, wherein the at least one sensor trace includes at least one concentric loop portion, wherein the at least one concentric loop portion defines the at least one navigation sensor.

Example 23

The apparatus of any of Examples 21 through 22, wherein the at least one navigation sensor includes a proximal navigation sensor and a distal navigation sensor.

Example 24

The apparatus of any of Examples 21 through 23, wherein the flexible substrate includes a top surface and a bottom surface, wherein the at least one navigation sensor includes a top navigation sensor positioned on the top surface and a bottom navigation sensor positioned on the bottom surface opposite the top navigation sensor.

Example 25

The apparatus of any of Examples 21 through 24, wherein the flexible substrate includes a surface, wherein the at least one navigation sensor is positioned on the surface, wherein the at least one camera trace is formed on the surface.

Example 26

The apparatus of any of Examples 21 through 25, further comprising at least one proximal camera lead electrically coupled to a proximal end of the at least one camera trace, wherein the at least one proximal camera lead is configured to be operatively coupled to the at least one of a processor or a power source.

Example 27

The apparatus of Example 26, wherein the at least one proximal camera lead is positioned proximally relative to the at least one navigation sensor.

Example 28

The apparatus of any of Examples 21 through 27, further comprising at least one distal camera lead electrically coupled to a distal end of the at least one camera trace, wherein the at least one distal camera lead is configured to be operatively coupled to the camera.

Example 29

The apparatus of Example 28, wherein the at least one distal camera lead is positioned distally relative to the at least one navigation sensor.

Example 30

The apparatus of any of Examples 21 through 29, wherein the at least one camera trace includes a plurality of camera traces.

Example 31

The apparatus of Example 30, wherein the plurality of camera traces laterally flank the at least one navigation sensor.

Example 32

The apparatus of any of Examples 21 through 31, further comprising the camera, wherein the at least one camera trace is operatively coupled to the camera.

Example 33

The apparatus of any of Examples 21 through 32, further comprising at least one of the processor or the power source, wherein the at least one camera trace is operatively coupled to the at least one of processor or the power source.

Example 34

The apparatus of any of Examples 21 through 33, the shaft assembly including a flexible portion, the flexible substrate being secured to the flexible portion, the flexible substrate being further configured to bend with the flexible portion.

Example 35

The apparatus of any of Examples 21 through 34, the shaft assembly including one or more electrodes operable to apply RF energy to tissue.

Example 36

An apparatus, comprising: (a) a camera; (b) a processor; (c) a power source; (d) a flexible substrate; (e) at least one navigation sensor positioned on the flexible substrate; and (f) first and second electrically-conductive camera traces formed on the flexible substrate, wherein the first camera trace operatively couples the camera to the processor, wherein the second camera trace operatively couples the camera to the power source.

Example 37

The apparatus of Example 36, further comprising at least one electrically-conductive sensor trace formed on the flexible substrate, wherein the at least one sensor trace includes at least one concentric loop portion, wherein the at least one concentric loop portion defines the at least one navigation sensor.

Example 38

A method of using an apparatus having (i) a flexible substrate, (ii) at least one navigation sensor positioned on the flexible substrate, and (iii) at least one electrically-conductive camera trace formed on the flexible substrate, the method comprising: (a) operatively coupling a camera to at least one of a processor or a power source via the at least one camera trace; (b) inserting the flexible substrate into an anatomical passageway of a patient; (c) exposing the at least one navigation sensor to an electromagnetic field; (d) generating a signal via the at least one navigation sensor in response to the act of exposing the at least one navigation sensor to the electromagnetic field; (e) navigating a distal portion of the apparatus through the anatomical passageway based on the generated signal; and (f) visualizing a portion of the anatomical passageway distal to the distal portion of the apparatus via the camera.

Example 39

The method of Example 38, wherein the act of navigating the distal portion of the apparatus through the anatomical passageway includes bending the flexible substrate.

Example 40

The method of any of Examples 38 through 39, further comprising applying RF energy to tissue within the anatomical passageway.

Example 41

An apparatus, comprising: (a) a shaft assembly having a distal end sized and configured to fit in an anatomical passageway in an ear, nose, or throat of a patient; (b) a substrate positioned along at least a portion of the shaft; (c) at least one electrically-conductive sensor trace formed on the substrate, wherein the at least one sensor trace includes at least one concentric loop portion, wherein the at least one concentric loop portion defines at least one navigation sensor; and (d) at least one temperature sensor positioned on the substrate.

Example 42

The apparatus of Example 41, wherein the at least one temperature sensor is configured to detect a temperature of the at least one sensor trace.

Example 43

The apparatus of Example 42, wherein the at least one temperature sensor includes at least one of a thermocouple or a thermistor.

Example 44

The apparatus of any of Examples 42 through 43, further comprising a processor, wherein the processor is operatively coupled to the at least one navigation sensor and the at least one temperature sensor such that the at least one navigation sensor is operable to communicate position signals to the processor, and such that the at least one temperature sensor is operable to communicate temperature signals to the processor.

Example 45

The apparatus of Example 44, wherein the processor is configured to determine location coordinates based on the position signals communicated to the processor by the at least one navigation sensor and based on the temperature signals communicated to the processor by the at least one temperature sensor.

Example 46

The apparatus of Example 45, wherein the processor is configured to apply a correction factor to the location coordinates in response to the temperature signals indicating a change in the detected temperature.

Example 47

The apparatus of any of Examples 45 through 46, wherein the processor is configured to correlate a change in the detected temperature to a change in an electrical resistance of the at least one sensor trace.

Example 48

The apparatus of any of Examples 41 through 47, wherein the substrate includes a surface, wherein the at least one navigation sensor is positioned on the surface, wherein the at least one temperature sensor is positioned on the surface.

Example 49

The apparatus of any of Examples 41 through 48, wherein the substrate is flexible.

Example 50

The apparatus of any of Examples 41 through 49, wherein the at least one navigation sensor includes a proximal navigation sensor and a distal navigation sensor.

Example 51

The apparatus of Example 50, wherein the at least one temperature sensor includes at least one proximal temperature sensor positioned near the proximal navigation sensor, and at least one distal temperature sensor positioned near the distal navigation sensor.

Example 52

The apparatus of Example 51, wherein the at least one proximal temperature sensor is positioned proximally relative to the proximal navigation sensor, wherein the at least one distal temperature sensor is positioned proximally relative to the distal navigation sensor and distally relative to the proximal navigation sensor.

Example 53

The apparatus of any of Examples 41 through 52, wherein the at least one temperature sensor includes a pair of laterally-adjacent temperature sensors.

Example 54

An ENT surgical instrument, comprising: (a) a powered component configured to generate heat; and (b) the apparatus of any of Examples 41 through 53, wherein the at least one navigation sensor is exposed to the heat generated by the powered component.

Example 55

The ENT surgical instrument of Example 54, wherein the powered component includes at least one of (i) an electrode configured to deliver RF energy to tissue, or (ii) a motor configured to drive a cutting member for severing tissue.

Example 56

An apparatus, comprising: (a) a shaft assembly having a distal end sized and configured to fit in an anatomical passageway in an ear, nose, or throat of a patient; (b) a substrate extending along at least a portion of the shaft; (c) at least one electrically-conductive sensor trace formed on the substrate, wherein the at least one sensor trace includes at least one concentric loop portion, wherein the at least one concentric loop portion defines at least one navigation sensor; and (d) a processor, wherein the processor is operatively coupled to the at least one navigation sensor, wherein the processor is configured to monitor a temperature of the at least one sensor trace.

Example 57

A method of using an apparatus having (i) a substrate, and (ii) at least one electrically-conductive sensor trace formed on the substrate, wherein the at least one sensor trace includes at least one concentric loop portion, wherein the at least one concentric loop portion defines at least one navigation sensor, the method comprising: (a) inserting the flexible substrate into an anatomical passageway of a patient; (b) exposing the at least one navigation sensor to an electromagnetic field; (c) generating a signal via the at least one navigation sensor in response to the act of exposing the at least one navigation sensor to the electromagnetic field; (d) determining location coordinates based on the generated signal; (e) detecting a temperature change of the at least one sensor trace; and (f) adjusting the location coordinates in response to the act of detecting a temperature change of the at least one sensor trace.

Example 58

The method of Example 57, wherein the act of adjusting the location coordinates includes applying a correction factor to the location coordinates, wherein the correction factor corresponds to the detected temperature change.

Example 59

The method of any of Examples 57 through 58, wherein the act of detecting a temperature change of the at least one sensor trace is performed via a temperature sensor.

Example 60

The method of any of Examples 57 through 58, wherein the act of detecting a temperature change of the at least one sensor trace includes detecting an electrical impedance change of the at least one sensor trace.

Example 61

An apparatus comprising: (a) an inner shaft, the inner shaft defining a lumen sized to receive an instrument; (b) an outer shaft fixedly secured relative to the inner shaft, the outer shaft being arranged coaxially with the inner shaft; and (c) a first navigation sensor radially interposed between the inner shaft and the outer shaft, the first navigation sensor being operable to generate a signal indicating a position of the first navigation sensor in three-dimensional space.

Example 62

The apparatus of Example 61, the lumen being sized to receive a shaft assembly of a tissue shaving instrument.

Example 63

The apparatus of Example 62, further comprising a tissue shaving instrument having a shaft assembly, the lumen being sized to receive the shaft assembly of the tissue shaving instrument.

Example 64

The apparatus of Example 63, the shaft assembly of the tissue shaving instrument having a transverse opening configured to receive tissue, the inner shaft and the outer shaft each having a length sized to provide exposure of the transverse opening when the shaft assembly of the tissue shaving instrument is fully inserted in the lumen.

Example 65

The apparatus of Example 64, the first navigation sensor being configured for positioning proximate and proximal to the transverse opening when the shaft assembly of the tissue shaving instrument is fully inserted in the lumen.

Example 66

The apparatus of any of Examples 61 through 65, further comprising a flexible substrate radially interposed between the inner shaft and the outer shaft, the first navigation sensor being positioned on the flexible substrate as part of a flex circuit.

Example 67

The apparatus of Example 66, the flexible substrate extending along a length of the inner shaft and along a length of the outer shaft.

Example 68

The apparatus of Example 67, the flexible substrate having a distal end, the first navigation sensor being positioned at the distal end of the flexible substrate.

Example 69

The apparatus of any of Examples 61 through 68, further comprising a second navigation sensor radially interposed between the inner shaft and the outer shaft, the second navigation sensor being operable to generate a signal indicating a position of the second navigation sensor in three-dimensional space.

Example 70

The apparatus of Example 69, the second navigation sensor being positioned proximal to the first navigation sensor.

Example 71

The apparatus of any of Examples 69 through 70, further comprising a flexible substrate radially interposed between the inner shaft and the outer shaft, the first navigation sensor and the second navigation sensor each being positioned on the flexible substrate as part of a flex circuit.

Example 72

The apparatus of any of Examples 61 through 71, further comprising a hub, the hub being positioned at a proximal end of one or both of the inner shaft or the outer shaft.

Example 73

The apparatus of Example 72, the hub being configured to removably couple with an instrument received in the lumen.

Example 74

The apparatus of any of Examples 61 through 73, the inner shaft having an open distal end and an open proximal end.

Example 75

The apparatus of any of Examples 61 through 74, the outer shaft having an open distal end and an open proximal end.

Example 76

An apparatus comprising: (a) a shaft assembly including an outer shaft, the outer shaft having an exterior surface, a length, and a distal end; and (b) a flex circuit including: (i) a flexible substrate secured to the exterior surface of the outer shaft, at least a portion of the flexible substrate extending along the length of the outer shaft, and (ii) a plurality of electrodes secured to the flexible substrate, the electrodes being positioned at or near the distal end of the outer shaft, the electrodes being operable to apply RF energy to tissue to thereby ablate the tissue.

Example 77

The apparatus of Example 76, the electrodes being arranged in an array extending along the distal end of the outer shaft.

Example 78

The apparatus of any of Examples 76 through 77, the electrodes being arranged in an array extending along a portion of the length of the outer shaft along a region proximal to the distal end of the outer shaft.

Example 79

The apparatus of any of Examples 76 through 78, the outer shaft defining a circumference, the electrodes being arranged in an array extending around the circumference of the outer shaft.

Example 80

The apparatus of Example 79, the electrodes comprising two electrodes, each of the two electrodes having a generally semicircular shape.

Example 81

The apparatus of Example 79, the electrodes comprising a plurality of square or rectangular shaped electrodes.

Example 82

The apparatus of any of Examples 76 through 81, the outer shaft defining a circumference, the flexible substrate including a longitudinally extending portion and a circumferentially extending portion, the longitudinally extending portion extending along the length of the outer shaft, the circumferentially extending portion extending about the circumference of the outer shaft.

Example 83

The apparatus of Example 82, the longitudinally extending portion having a distal end, the circumferentially extending portion being located at the distal end of the longitudinally extending portion.

Example 84

The apparatus of any of Examples 82 through 83, at least some of the electrodes being positioned along the circumferentially extending portion in a circumferentially extending array.

Example 85

The apparatus of any of Examples 76 through 84, the outer shaft further defining an opening configured to receive tissue, the shaft assembly further including a cutting shaft configured to sever tissue received in the opening.

Example 86

The apparatus of Example 85, the opening having a transverse orientation on the outer shaft such that at least a portion of the opening extends longitudinally along the shaft.

Example 87

The apparatus of Example 86, at least some of the electrodes extending longitudinally in an array alongside the opening.

Example 88

The apparatus of any of Examples 85 through 86, at least some of the electrodes being positioned proximal to the opening.

Example 89

The apparatus of any of Examples 85 through 88, at least some of the electrodes being positioned distal to the opening.

VII. MISCELLANEOUS

It should be understood that any of the teachings, expressions, embodiments, examples, etc. described herein may be combined with any of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Versions of the devices described above may be designed to be disposed of after a single use, or they can be designed to be used multiple times. Versions may, in either or both cases, be reconditioned for reuse after at least one use. Reconditioning may include any combination of the steps of disassembly of the device, followed by cleaning or replacement of particular pieces, and subsequent reassembly. In particular, some versions of the device may be disassembled, and any number of the particular pieces or parts of the device may be selectively replaced or removed in any combination. Upon cleaning and/or replacement of particular parts, some versions of the device may be reassembled for subsequent use either at a reconditioning facility or by a user immediately prior to a procedure. Those skilled in the art will appreciate that reconditioning of a device may utilize a variety of techniques for disassembly, cleaning/replacement, and reassembly. Use of such techniques, and the resulting reconditioned device, are all within the scope of the present application.

By way of example only, versions described herein may be sterilized before and/or after a procedure. In one sterilization technique, the device is placed in a closed and sealed container, such as a plastic or TYVEK bag. The container and device may then be placed in a field of radiation that can penetrate the container, such as gamma radiation, x-rays, or high-energy electrons. The radiation may kill bacteria on the device and in the container. The sterilized device may then be stored in the sterile container for later use. A device may also be sterilized using any other technique known in the art, including but not limited to beta or gamma radiation, ethylene oxide, or steam.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. An ENT surgical instrument, comprising:
(a) a steerable shaft assembly having a distal end sized and configured to fit in an anatomical passageway in an ear, nose, or throat of a patient;
(b) a flexible rectangular-shaped, planar substrate extending within the shaft assembly longitudinally between a proximal and the distal end of the shaft, the flexible rectangular-shaped, planar substrate including a top surface and a bottom surface;
(c) a visualization and irrigation assembly extending within the shaft assembly alongside the flexible substrate;
(d) a top electrically-conductive sensor trace formed on the top surface of the flexible, rectangular-shaped substrate, the top sensor trace including at least one concentric loop portion, the at least one concentric loop portion of the top sensor trace defining a top navigation sensor; and
(e) a bottom electrically-conductive sensor trace formed on the bottom surface of the flexible, rectangular-shaped substrate, the bottom sensor trace including at least one concentric loop portion, the at least one concentric loop portion of the bottom sensor trace defining a bottom navigation sensor.

2. The ENT surgical instrument of claim 1, each of the top navigation sensor and the bottom navigation sensor including a proximal navigation sensor and at least one distal navigation sensor.

3. The ENT surgical instrument of claim 2, the at least one distal navigation sensor including a pair of laterally-adjacent distal navigation sensors.

4. The ENT surgical instrument of claim 2, the proximal navigation sensor and the distal navigation sensor being electrically isolated from each other.

5. The ENT surgical instrument of claim 1, the top navigation sensor and the bottom navigation sensor being electrically coupled to each other.

6. The ENT surgical instrument of claim 1, further comprising at least one sensor lead electrically coupled to a proximal end of the top sensor trace, the at least one sensor lead being configured to be operatively coupled to a processor.

7. The ENT surgical instrument of claim 6, the at least one sensor lead being positioned proximally relative to the top navigation sensor.

8. The ENT surgical instrument of claim 1, the shaft assembly including a shaft member, the flexible substrate being secured to the shaft member.

9. The ENT surgical instrument of claim 8, the shaft member including an inner chord, the flexible substrate being disposed along the inner chord.

10. The ENT surgical instrument of claim 1, the shaft assembly including a flexible portion, the flexible substrate extending along the flexible portion.

* * * * *